US011580727B2

(12) United States Patent
Wexler et al.

(10) Patent No.: US 11,580,727 B2
(45) Date of Patent: Feb. 14, 2023

(54) SYSTEMS AND METHODS FOR MATCHING AUDIO AND IMAGE INFORMATION

(71) Applicant: OrCam Technologies Ltd., Jerusalem (IL)

(72) Inventors: Yonatan Wexler, Jerusalem (IL); Amnon Shashua, Mevaseret Zion (IL)

(73) Assignee: OrCam Technologies Ltd., Jerusalem (IL)

( * ) Notice: Subject to any disclaimer, the term of this patent is extended or adjusted under 35 U.S.C. 154(b) by 132 days.

(21) Appl. No.: 17/141,985

(22) Filed: Jan. 5, 2021

(65) Prior Publication Data
US 2021/0209362 A1     Jul. 8, 2021

Related U.S. Application Data

(60) Provisional application No. 62/957,347, filed on Jan. 6, 2020.

(51) Int. Cl.
    *G06V 10/10*          (2022.01)
    *G06V 20/10*          (2022.01)
    *G06F 1/16*           (2006.01)

(52) U.S. Cl.
CPC .............. *G06V 20/10* (2022.01); *G06F 1/163* (2013.01); *G06V 10/10* (2022.01); *G06V 10/16* (2022.01)

(58) Field of Classification Search
CPC ........ G06V 20/10; G06V 10/10; G06V 10/16; G06V 40/20; G06V 40/16; G06F 1/163;
(Continued)

(56) References Cited

U.S. PATENT DOCUMENTS

2006/0193623 A1*   8/2006   Funakura ............... H04N 5/772
                                                       396/312
2014/0253701 A1*   9/2014   Wexler .................. G06V 30/40
                                                           348/62

(Continued)

FOREIGN PATENT DOCUMENTS

CN           110544479 A   *   12/2019
CN           110544491 A   *   12/2019

OTHER PUBLICATIONS

Translated version of CN110544479 (Year: 2019).*

*Primary Examiner* — Carol Wang
(74) *Attorney, Agent, or Firm* — Finnegan, Henderson, Farabow, Garrett & Dunner, LLP

(57) ABSTRACT

System and methods for processing audio signals are disclosed. In one implementation, a system may comprise a wearable camera configured to capture images from an environment of a user; a microphone configured to capture sounds from the environment of the user; and a processor. The processor may be configured to receive at least one image of the plurality of images, the at least one image comprising a plurality of image portions associated with corresponding image portion timestamps; receive at least one audio signal representative of the sounds captured by the at least one microphone; identify an audio timestamp associated with a portion of the audio signal; identify an image portion from among the plurality of image portions, the image portion having an image portion timestamp associated with the audio timestamp; and analyze the image portion to identify a voice originating from an object represented in the image.

21 Claims, 48 Drawing Sheets

(58) Field of Classification Search
CPC ........ G06K 9/00664; G06K 9/20; G06K 9/78; G06K 9/00335; G06K 9/00221; G06K 2009/2045
See application file for complete search history.

(56) References Cited

U.S. PATENT DOCUMENTS

| | | | | |
|---|---|---|---|---|
| 2015/0319540 | A1* | 11/2015 | Rubinstein | H04R 3/00 381/172 |
| 2017/0364752 | A1* | 12/2017 | Zhou | H04N 13/161 |
| 2020/0117887 | A1* | 4/2020 | Chaudhuri | G06N 5/046 |
| 2020/0218916 | A1* | 7/2020 | Wu | G06V 40/176 |

* cited by examiner

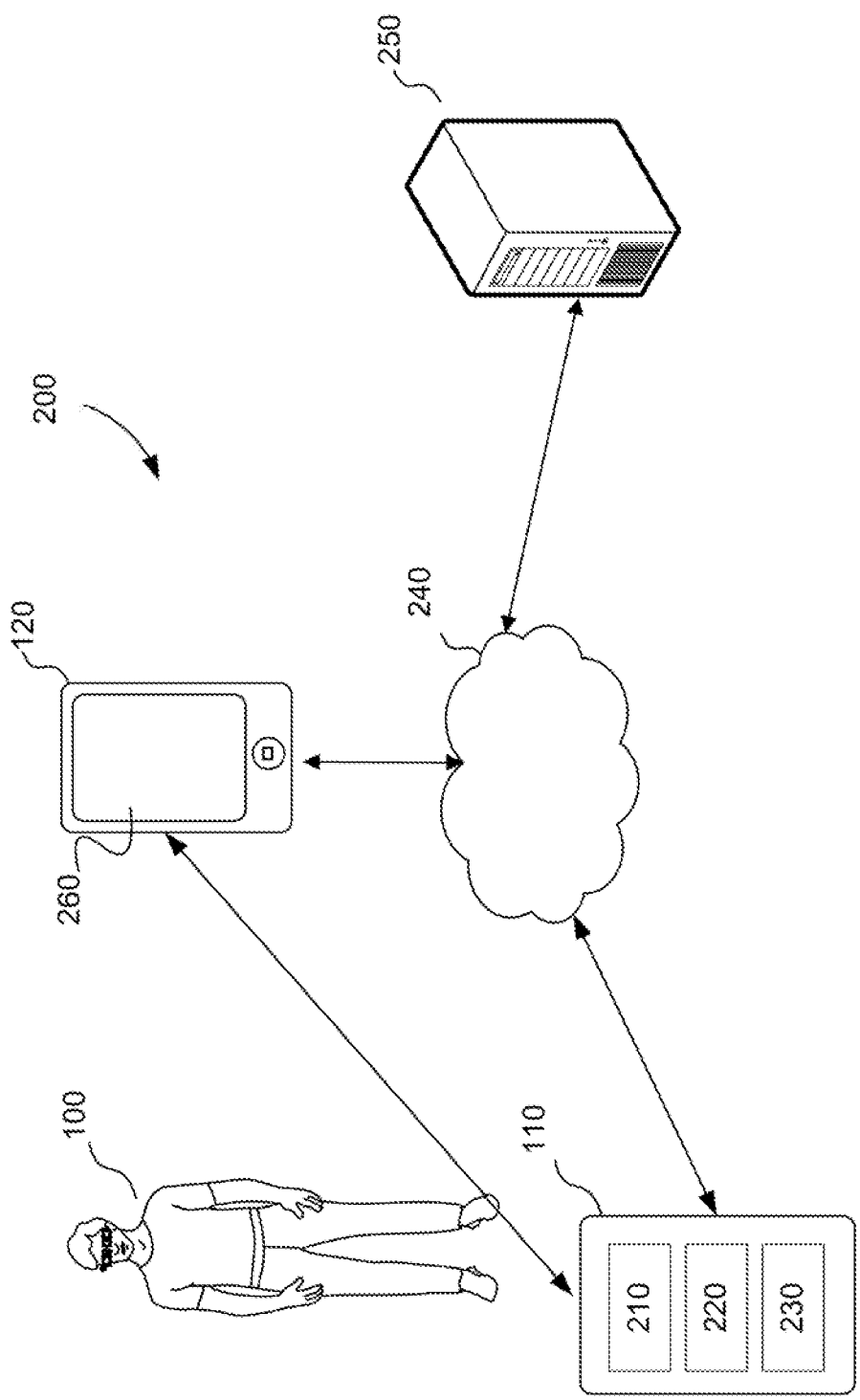

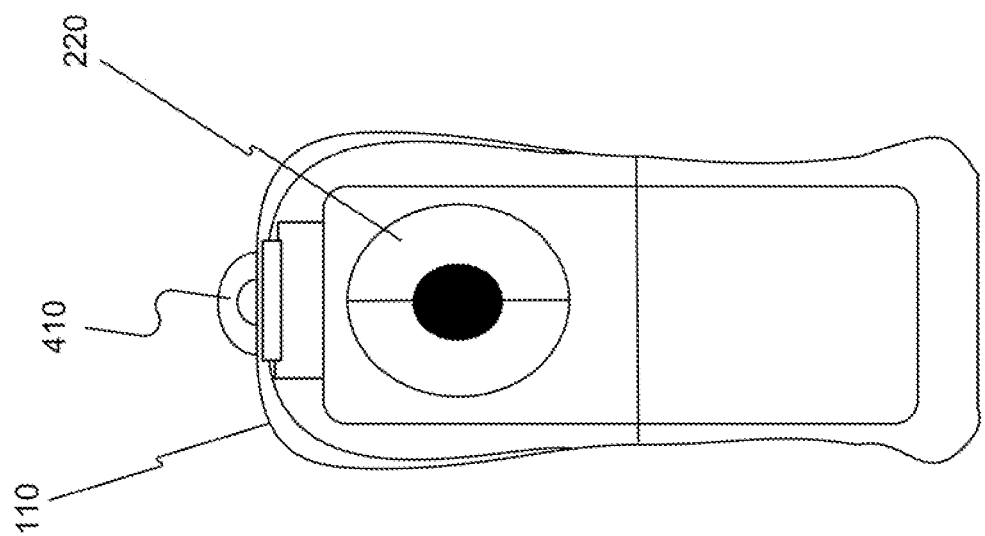

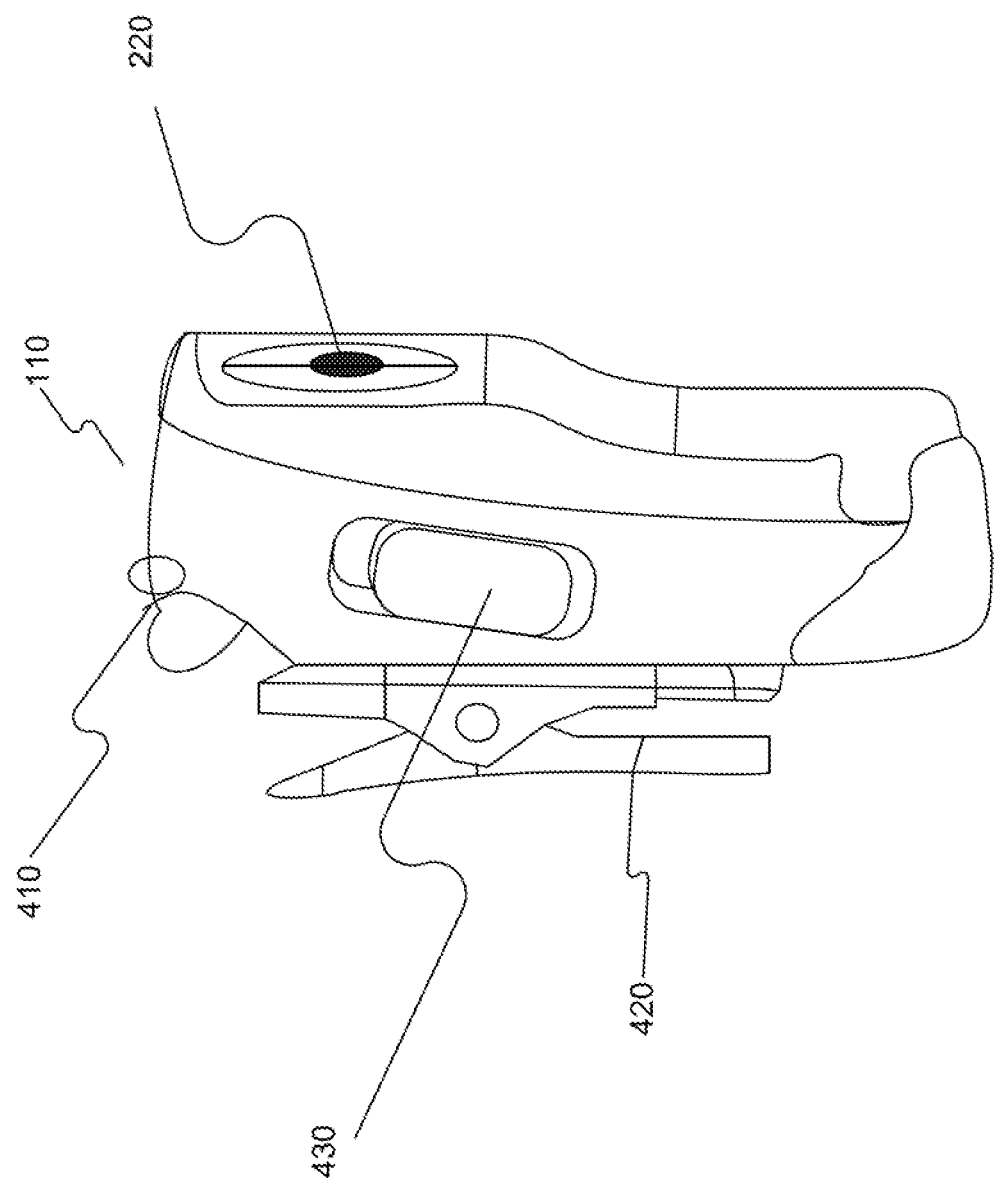

F-View

R-View

S-View

T-View

B-View

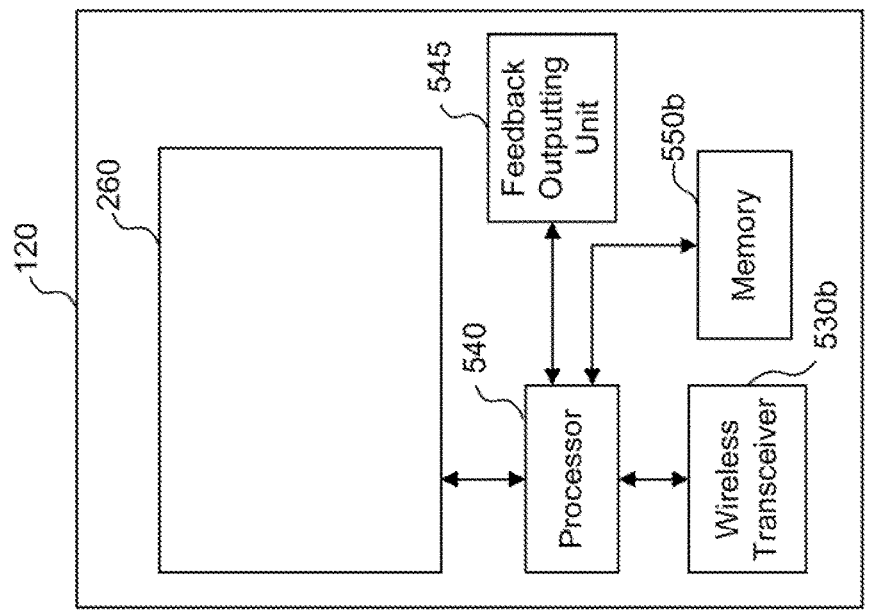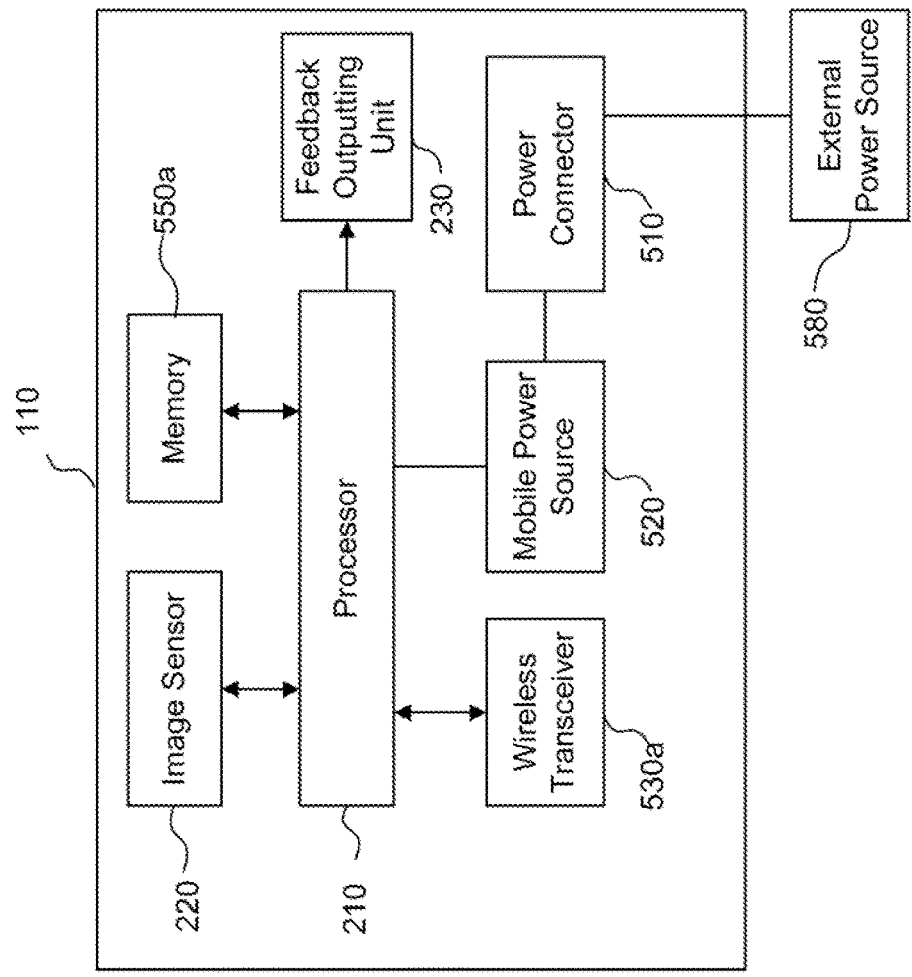
Fig. 5C

SYSTEMS AND METHODS FOR MATCHING AUDIO AND IMAGE INFORMATION

CROSS REFERENCE TO RELATED APPLICATION

This application claims the benefit of priority of United States Provisional Patent Application No. 62/957,347, filed on Jan. 6, 2020, which is incorporated herein by reference in its entirety.

BACKGROUND

Technical Field

This disclosure generally relates to devices and methods for capturing and processing images and audio from an environment of a user, and using information derived from captured images and audio.

Background Information

Today, technological advancements make it possible for wearable devices to automatically capture images and audio, and store information that is associated with the captured images and audio. Certain devices have been used to digitally record aspects and personal experiences of one's life in an exercise typically called "lifelogging." Some individuals log their life so they can retrieve moments from past activities, for example, social events, trips, etc. Lifelogging may also have significant benefits in other fields (e.g., business, fitness and healthcare, and social research). Lifelogging devices, while useful for tracking daily activities, may be improved with capability to enhance one's interaction in his environment with feedback and other advanced functionality based on the analysis of captured image and audio data.

Even though users can capture images and audio with their smartphones and some smartphone applications can process the captured information, smartphones may not be the best platform for serving as lifelogging apparatuses in view of their size and design. Lifelogging apparatuses should be small and light, so they can be easily worn. Moreover, with improvements in image capture devices, including wearable apparatuses, additional functionality may be provided to assist users in navigating in and around an environment, identifying persons and objects they encounter, and providing feedback to the users about their surroundings and activities. Therefore, there is a need for apparatuses and methods for automatically capturing and processing images and audio to provide useful information to users of the apparatuses, and for systems and methods to process and leverage information gathered by the apparatuses.

SUMMARY

Embodiments consistent with the present disclosure provide devices and methods for automatically capturing and processing images and audio from an environment of a user, and systems and methods for processing information related to images and audio captured from the environment of the user.

In an embodiment, a system for processing audio signals may comprise a wearable camera configured to capture a plurality of images from an environment of a user; at least one microphone configured to capture sounds from the environment of the user; and at least one processor. The at least one processor may be programmed to receive at least one image of the plurality of images, the at least one image comprising a plurality of image portions associated with corresponding image portion timestamps; receive at least one audio signal representative of the sounds captured by the at least one microphone; identify an audio timestamp associated with a portion of the audio signal; identify an image portion from among the plurality of image portions, the image portion having an image portion timestamp associated with the audio timestamp; and analyze the image portion to identify a voice originating from an object represented in the image.

In another embodiment, a method for processing audio signals is disclosed. The method may comprise receiving at least one image captured by a wearable camera from an environment of a user, the at least one image comprising a plurality of image portions associated with corresponding image portion timestamps; receiving at least one audio signal representative of sounds captured by at least one microphone from the environment of the user; identifying an audio timestamp associated with a portion of the audio signal; identifying an image portion from among the plurality of image portions, the image portion having an image portion timestamp associated with the audio timestamp; and analyzing the image portion to identify a voice originating from an object represented in the image.

Consistent with other disclosed embodiments, non-transitory computer-readable storage media may store program instructions, which are executed by at least one processor and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute apart of this disclosure, illustrate various disclosed embodiments. In the drawings;

FIG. 2 is a schematic illustration of an example system consistent with the disclosed embodiments.

FIG. 4A-4K are schematic illustrations of an example of the wearable apparatus shown in FIG. 1B from various viewpoints.

FIG. 5C is a block diagram illustrating an example of the components of a wearable apparatus according to a third embodiment.

DETAILED DESCRIPTION

Figure 1A:
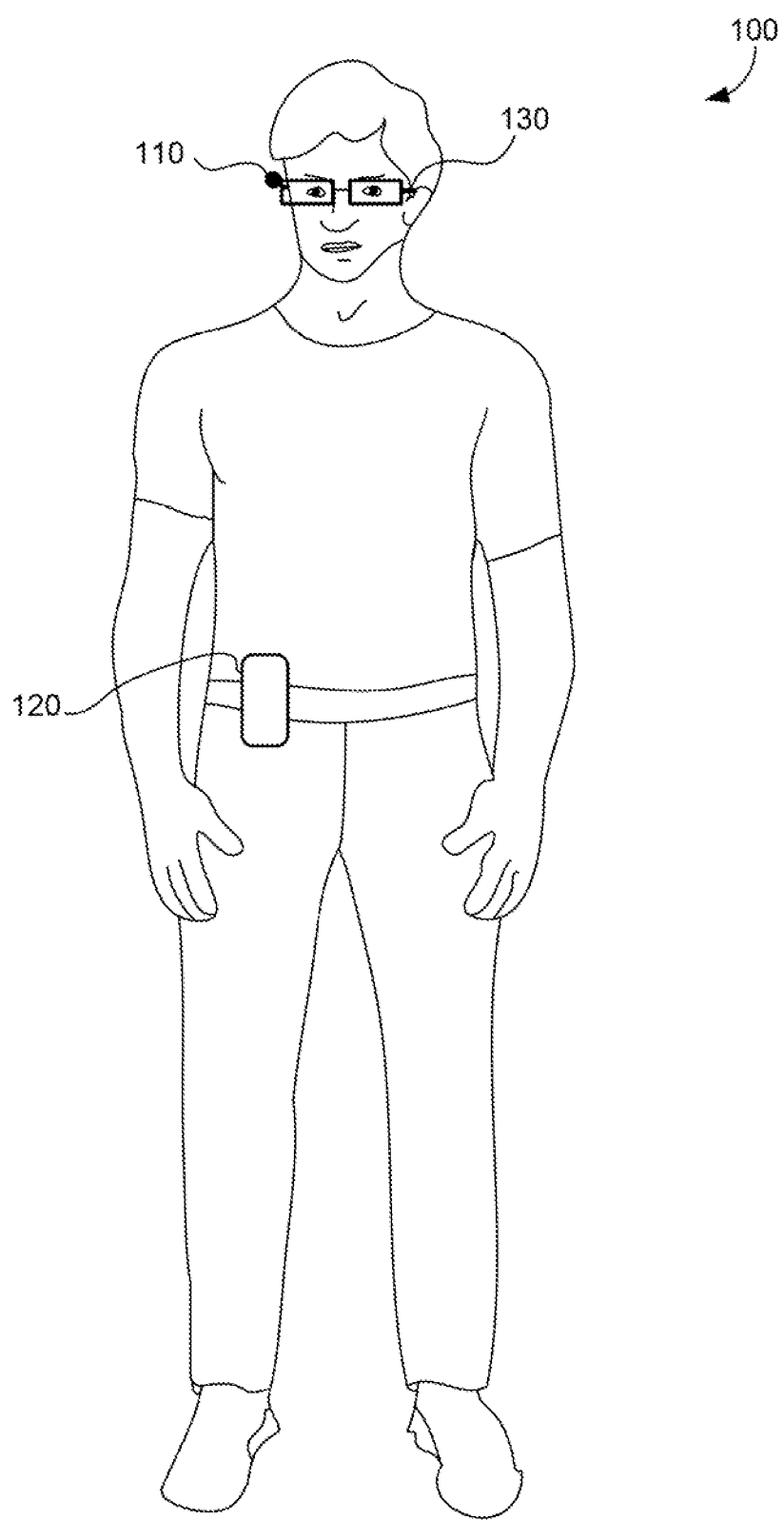
FIG. 1A is a schematic illustration of an example of a user wearing a wearable apparatus according to a disclosed embodiment.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

FIG. 1A illustrates a user 100 wearing an apparatus 110 that is physically connected (or integral) to glasses 130, consistent with the disclosed embodiments. Glasses 130 may be prescription glasses, magnifying glasses, non-prescription glasses, safety glasses, sunglasses, etc. Additionally, in some embodiments, glasses 130 may include parts of a frame and earpieces, nosepieces, etc., and one or no lenses. Thus, in some embodiments, glasses 130 may function primarily to support apparatus 110, and/or an augmented reality display device or other optical display device. In some embodiments, apparatus 110 may include an image sensor (not shown in FIG. 1A) for capturing real-time image data of the field-of-view of user 100. The term "image data" includes any form of data retrieved from optical signals in the near-infrared, infrared, visible, and ultraviolet spectrums. The image data may include video clips and/or photographs.

In some embodiments, apparatus 110 may communicate wirelessly or via a wire with a computing device 120. In some embodiments, computing device 120 may include, for example, a smartphone, or a tablet, or a dedicated processing unit, which may be portable (e.g., can be carried in a pocket of user 100). Although shown in FIG. 1A as an external device, in some embodiments, computing device 120 may be provided as part of wearable apparatus 110 or glasses 130, whether integral thereto or mounted thereon. In some embodiments, computing device 120 may be included in an augmented reality display device or optical head mounted display provided integrally or mounted to glasses 130. In other embodiments, computing device 120 may be provided as part of another wearable or portable apparatus of user 100 including a wrist-strap, a multifunctional watch, a button, a clip-on, etc. And in other embodiments, computing device 120 may be provided as part of another system, such as an on-board automobile computing or navigation system. A person skilled in the art can appreciate that different types of computing devices and arrangements of devices may implement the functionality of the disclosed embodiments. Accordingly, in other implementations, computing device 120 may include a Personal Computer (PC), laptop, an Internet server, etc.

Figure 1B:
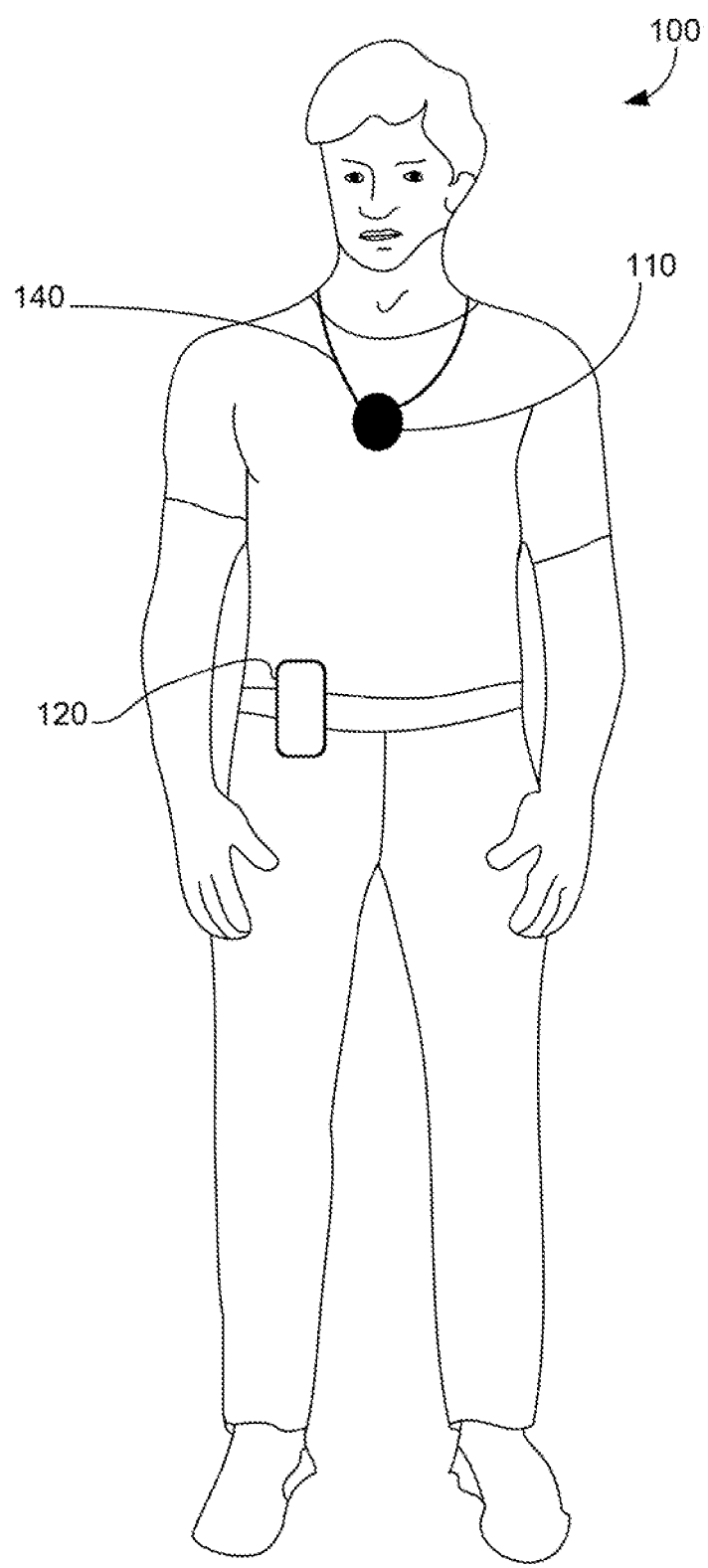
FIG. 1B is a schematic illustration of an example of the user wearing a wearable apparatus according to a disclosed embodiment.

FIG. 1B illustrates user 100 wearing apparatus 110 that is physically connected to a necklace 140, consistent with a disclosed embodiment. Such a configuration of apparatus 110 may be suitable for users that do not wear glasses some or all of the time. In this embodiment, user 100 can easily wear apparatus 110, and take it off.

Figure 1C:
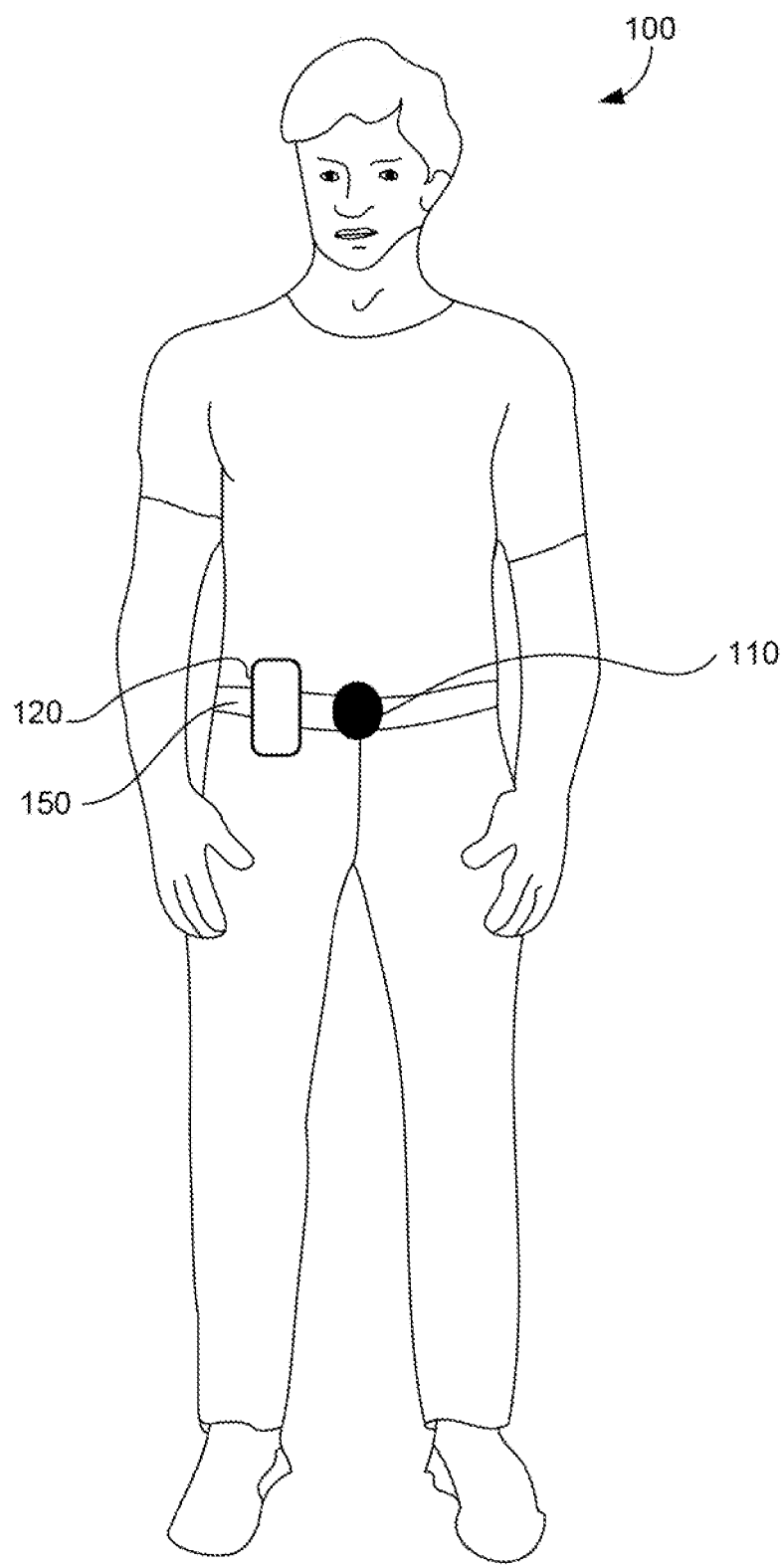
FIG. 1C is a schematic illustration of an example of the user wearing a wearable apparatus according to a disclosed embodiment.

FIG. 1C illustrates user 100 wearing apparatus 110 that is physically connected to a belt 150, consistent with a disclosed embodiment. Such a configuration of apparatus 110 may be designed as a belt buckle. Alternatively, apparatus 110 may include a clip for attaching to various clothing articles, such as belt 150, or a vest, a pocket, a collar, a cap or hat or other portion of a clothing article.

Figure 1D:
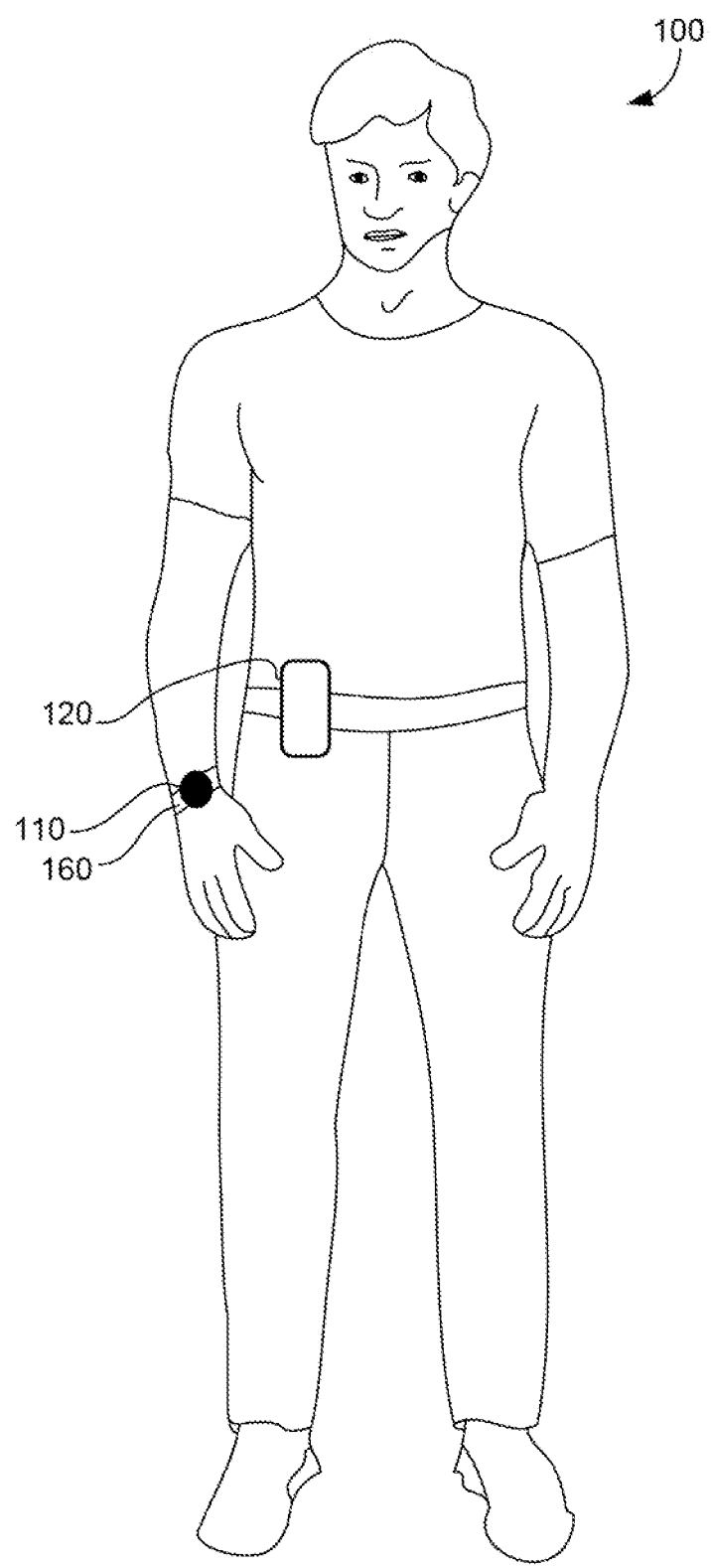
FIG. 1D is a schematic illustration of an example of the user wearing a wearable apparatus according to a disclosed embodiment.

FIG. 1D illustrates user 100 wearing apparatus 110 that is physically connected to a wrist strap 160, consistent with a disclosed embodiment. Although the aiming direction of apparatus 110, according to this embodiment, may not match the field-of-view of user 100, apparatus 110 may include the ability to identify a hand-related trigger based on the tracked eye movement of a user 100 indicating that user 100 is looking in the direction of the wrist strap 160. Wrist strap 160 may also include an accelerometer, a gyroscope, or other sensor for determining movement or orientation of a user's 100 hand for identifying a hand-related trigger.

FIG. 2 is a schematic illustration of an exemplary system 200 including a wearable apparatus 110, worn by user 100, and an optional computing device 120 and/or a server 250 capable of communicating with apparatus 110 via a network 240, consistent with disclosed embodiments. In some embodiments, apparatus 110 may capture and analyze image data, identify a hand-related trigger present in the image data, and perform an action and/or provide feedback to a user 100, based at least in part on the identification of the hand-related trigger. In some embodiments, optional computing device 120 and/or server 250 may provide additional functionality to enhance interactions of user 100 with his or her environment, as described in greater detail below.

According to the disclosed embodiments, apparatus 110 may include an image sensor system 220 for capturing real-time image data of the field-of-view of user 100. In some embodiments, apparatus 110 may also include a processing unit 210 for controlling and performing the disclosed functionality of apparatus 110, such as to control the capture of image data, analyze the image data, and perform an action and/or output a feedback based on a hand-related trigger identified in the image data. According to the disclosed embodiments, a hand-related trigger may include a gesture performed by user 100 involving a portion of a hand of user 100. Further, consistent with some embodiments, a hand-related trigger may include a wrist-related trigger. Additionally, in some embodiments, apparatus 110 may include a feedback outputting unit 230 for producing an output of information to user 100.

As discussed above, apparatus 110 may include an image sensor 220 for capturing image data. The term "image sensor" refers to a device capable of detecting and converting optical signals in the near-infrared, infrared, visible, and ultraviolet spectrums into electrical signals. The electrical signals may be used to form an image or a video stream (i.e. image data) based on the detected signal. The term "image data" includes any form of data retrieved from optical signals in the near-infrared, infrared, visible, and ultraviolet spectrums. Examples of image sensors may include semiconductor charge-coupled devices (CCD), active pixel sensors in complementary metal-oxide-semiconductor (CMOS), or N-type metal-oxide-semiconductor (NMOS, Live MOS). In some cases, image sensor 220 may be part of a camera included in apparatus 110.

Apparatus 110 may also include a processor 210 for controlling image sensor 220 to capture image data and for analyzing the image data according to the disclosed embodiments. As discussed in further detail below with respect to FIG. 5A, processor 210 may include a "processing device" for performing logic operations on one or more inputs of image data and other data according to stored or accessible software instructions providing desired functionality. In some embodiments, processor 210 may also control feedback outputting unit 230 to provide feedback to user 100 including information based on the analyzed image data and the stored software instructions. As the term is used herein, a "processing device" may access memory where executable instructions are stored or, in some embodiments, a "processing device" itself may include executable instructions (e.g., stored in memory included in the processing device).

In some embodiments, the information or feedback information provided to user 100 may include time information. The time information may include any information related to a current time of day and, as described further below, may be presented in any sensory perceptive manner. In some embodiments, time information may include a current time of day in a preconfigured format (e.g., 2:30 pm or 14:30). Time information may include the time in the user's current time zone (e.g., based on a determined location of user 100), as well as an indication of the time zone and/or a time of day in another desired location. In some embodiments, time information may include a number of hours or minutes relative to one or more predetermined times of day. For example, in some embodiments, time information may include an indication that three hours and fifteen minutes remain until a particular hour (e.g., until 6:00 pm), or some other predetermined time. Time information may also include a duration of time passed since the beginning of a particular activity, such as the start of a meeting or the start of a jog, or any other activity. In some embodiments, the activity may be determined based on analyzed image data. In other embodiments, time information may also include additional information related to a current time and one or more other routine, periodic, or scheduled events. For example, time information may include an indication of the number of minutes remaining until the next scheduled event, as may be determined from a calendar function or other information retrieved from computing device 120 or server 250, as discussed in further detail below.

Feedback outputting unit 230 may include one or more feedback systems for providing the output of information to user 100. In the disclosed embodiments, the audible or visual feedback may be provided via any type of connected audible or visual system or both. Feedback of information according to the disclosed embodiments may include audible feedback to user 100 (e.g., using a Bluetooth™ or other wired or wirelessly connected speaker, or a bone conduction headphone). Feedback outputting unit 230 of some embodiments may additionally or alternatively produce a visible output of information to user 100, for example, as part of an augmented reality display projected onto a lens of glasses 130 or provided via a separate heads up display in communication with apparatus 110, such as a display 260 provided as part of computing device 120, which may include an onboard automobile heads up display, an augmented reality device, a virtual reality device, a smartphone, PC, table, etc.

The term "computing device" refers to a device including a processing unit and having computing capabilities. Some examples of computing device 120 include a PC, laptop, tablet, or other computing systems such as an on-board computing system of an automobile, for example, each configured to communicate directly with apparatus 110 or server 250 over network 240. Another example of computing device 120 includes a smartphone having a display 260. In some embodiments, computing device 120 may be a computing system configured particularly for apparatus 110, and may be provided integral to apparatus 110 or tethered thereto. Apparatus 110 can also connect to computing device 120 over network 240 via any known wireless standard (e.g., Wi-Fi, Bluetooth®, etc.), as well as near-filed capacitive coupling, and other short range wireless techniques, or via a wired connection. In an embodiment in which computing device 120 is a smartphone, computing device 120 may have a dedicated application installed therein. For example, user 100 may view on display 260 data (e.g., images, video clips, extracted information, feedback information, etc.) that originate from or are triggered by apparatus 110. In addition, user 100 may select part of the data for storage in server 250.

Network 240 may be a shared, public, or private network, may encompass a wide area or local area, and may be implemented through any suitable combination of wired and/or wireless communication networks. Network 240 may further comprise an intranet or the Internet. In some embodiments, network 240 may include short range or near-field wireless communication systems for enabling communication between apparatus 110 and computing device 120 provided in close proximity to each other, such as on or near a user's person, for example. Apparatus 110 may establish a connection to network 240 autonomously, for example, using a wireless module (e.g., Wi-Fi, cellular). In some embodiments, apparatus 110 may use the wireless module when being connected to an external power source, to prolong battery life. Further, communication between apparatus 110 and server 250 may be accomplished through any suitable communication channels, such as, for example, a telephone network, an extranet, an intranet, the Internet, satellite communications, off-line communications, wireless communications, transponder communications, a local area network (LAN), a wide area network (WAN), and a virtual private network (VPN).

As shown in FIG. 2, apparatus 110 may transfer or receive data to/from server 250 via network 240. In the disclosed embodiments, the data being received from server 250 and/or computing device 120 may include numerous different types of information based on the analyzed image data, including information related to a commercial product, or a person's identity, an identified landmark, and any other information capable of being stored in or accessed by server 250. In some embodiments, data may be received and transferred via computing device 120. Server 250 and/or computing device 120 may retrieve information from different data sources (e.g., a user specific database or a user's social network account or other account, the Internet, and other managed or accessible databases) and provide information to apparatus 110 related to the analyzed image data and a recognized trigger according to the disclosed embodiments. In some embodiments, calendar-related information retrieved from the different data sources may be analyzed to provide certain time information or a time-based context for providing certain information based on the analyzed image data.

Figure 3A:
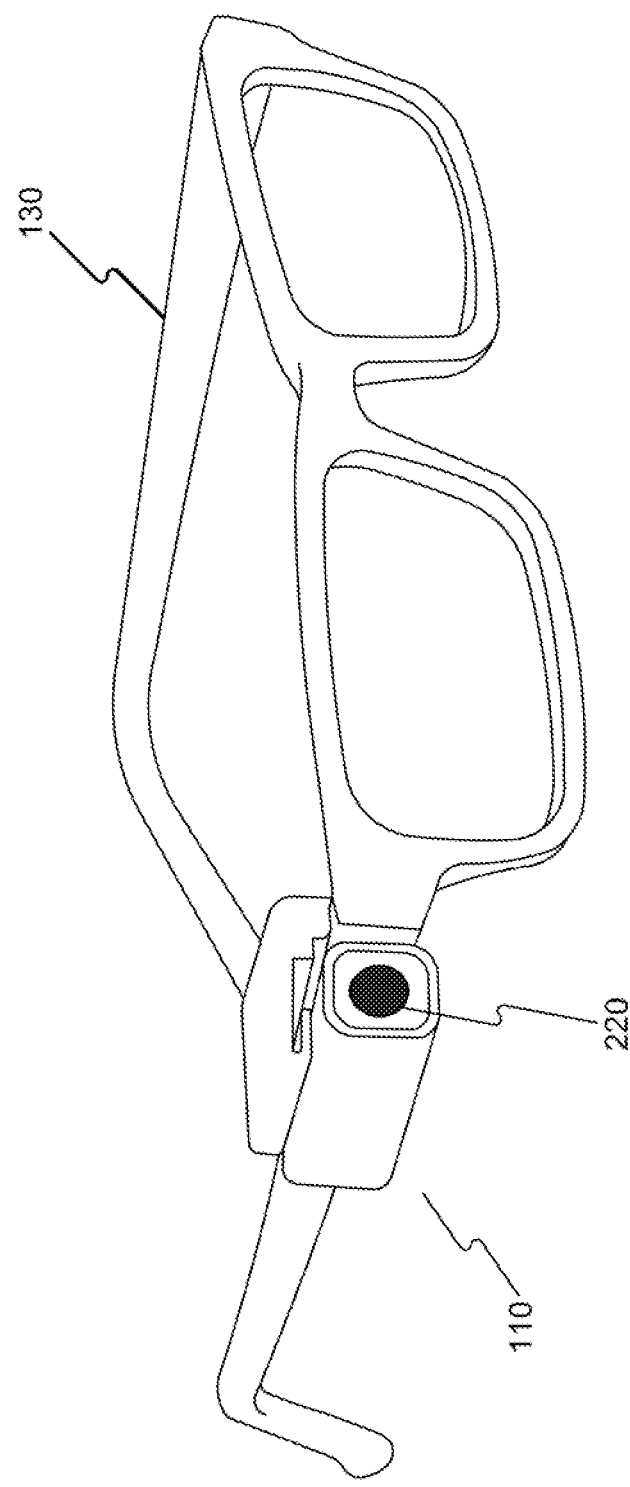
FIG. 3A is a schematic illustration of an example of the wearable apparatus shown in FIG. 1A.

An example of wearable apparatus 110 incorporated with glasses 130 according to some embodiments (as discussed in connection with FIG. 1A) is shown in greater detail in FIG. 3A. In some embodiments, apparatus 110 may be associated with a structure (not shown in FIG. 3A) that enables easy detaching and reattaching of apparatus 110 to glasses 130. In some embodiments, when apparatus 110 attaches to glasses 130, image sensor 220 acquires a set aiming direction without the need for directional calibration. The set aiming direction of image sensor 220 may substantially coincide with the field-of-view of user 100. For example, a camera associated with image sensor 220 may be installed within apparatus 110 in a predetermined angle in a position facing slightly downwards (e.g., 5-15 degrees from the horizon). Accordingly, the set aiming direction of image sensor 220 may substantially match the field-of-view of user 100.

Figure 3B:
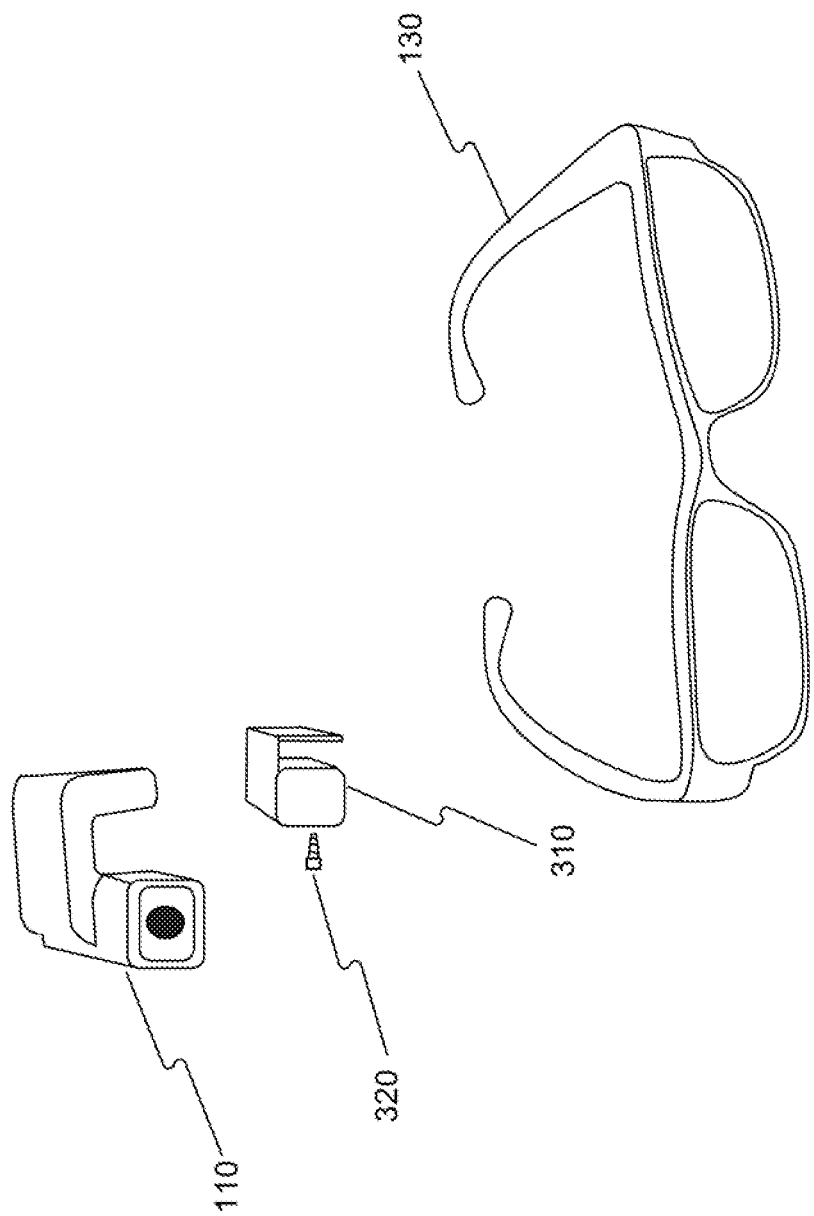
FIG. 3B is an exploded view of the example of the wearable apparatus shown in FIG. 3A.

FIG. 3B is an exploded view of the components of the embodiment discussed regarding FIG. 3A. Attaching apparatus 110 to glasses 130 may take place in the following way. Initially, a support 310 may be mounted on glasses 130 using a screw 320, in the side of support 310. Then, apparatus 110 may be clipped on support 310 such that it is aligned with the field-of-view of user 100. The term "support" includes any device or structure that enables detaching and reattaching of a device including a camera to a pair of glasses or to another object (e.g., a helmet). Support 310 may be made from plastic (e.g., polycarbonate), metal (e.g., aluminum), or a combination of plastic and metal (e.g., carbon fiber graphite). Support 310 may be mounted on any kind of glasses (e.g., eyeglasses, sunglasses, 3D glasses, safety glasses, etc.) using screws, bolts, snaps, or any fastening means used in the art.

In some embodiments, support 310 may include a quick release mechanism for disengaging and reengaging apparatus 110. For example, support 310 and apparatus 110 may include magnetic elements. As an alternative example, support 310 may include a male latch member and apparatus 110 may include a female receptacle. In other embodiments, support 310 can be an integral part of a pair of glasses, or sold separately and installed by an optometrist. For example, support 310 may be configured for mounting on the arms of glasses 130 near the frame front, but before the hinge. Alternatively, support 310 may be configured for mounting on the bridge of glasses 130.

In some embodiments, apparatus 110 may be provided as part of a glasses frame 130, with or without lenses. Additionally, in some embodiments, apparatus 110 may be configured to provide an augmented reality display projected onto a lens of glasses 130 (if provided), or alternatively, may include a display for projecting time information, for example, according to the disclosed embodiments. Apparatus 110 may include the additional display or alternatively, may be in communication with a separately provided display system that may or may not be attached to glasses 130.

In some embodiments, apparatus 110 may be implemented in a form other than wearable glasses, as described above with respect to FIGS. 1B-1D, for example. FIG. 4A is a schematic illustration of an example of an additional embodiment of apparatus 110 from a front viewpoint of apparatus 110. Apparatus 110 includes an image sensor 220, a clip (not shown), a function button (not shown) and a hanging ring 410 for attaching apparatus 110 to, for example, necklace 140, as shown in FIG. 1B. When apparatus 110 hangs on necklace 140, the aiming direction of image sensor 220 may not fully coincide with the field-of-view of user 100, but the aiming direction would still correlate with the field-of-view of user 100.

FIG. 4B is a schematic illustration of the example of a second embodiment of apparatus 110, from a side orientation of apparatus 110. In addition to hanging ring 410, as shown in FIG. 48, apparatus 110 may further include a clip 420. User 100 can use clip 420 to attach apparatus 110 to a shirt or belt 150, as illustrated in FIG. 1C. Clip 420 may provide an easy mechanism for disengaging and re-engaging apparatus 110 from different articles of clothing. In other embodiments, apparatus 110 may include a female receptacle for connecting with a male latch of a car mount or universal stand.

In some embodiments, apparatus 110 includes a function button 430 for enabling user 100 to provide input to apparatus 110. Function button 430 may accept different types of tactile input (e.g., a tap, a click, a double-click, a long press, a right-to-left slide, a left-to-right slide). In some embodiments, each type of input may be associated with a different action. For example, a tap may be associated with the function of taking a picture, while a right-to-left slide may be associated with the function of recording a video.

Figure 4C:
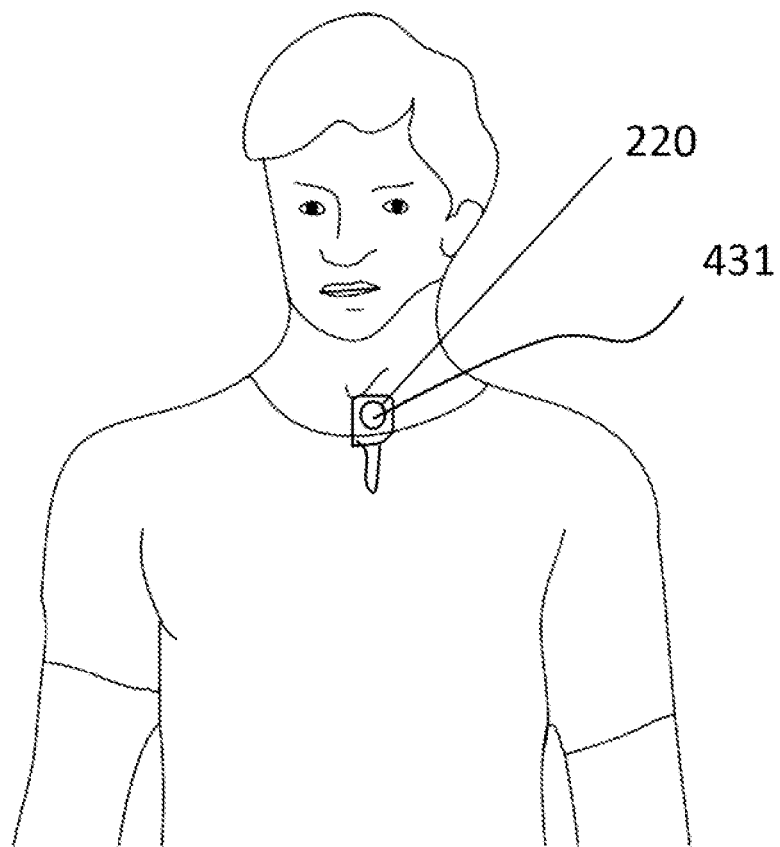

Apparatus 110 may be attached to an article of clothing (e.g., a shirt, a belt, pants, etc.), of user 100 at an edge of the clothing using a clip 431 as shown in FIG. 4C. For example, the body of apparatus 100 may reside adjacent to the inside surface of the clothing with clip 431 engaging with the outside surface of the clothing. In such an embodiment, as shown in FIG. 4C, the image sensor 220 (e.g., a camera for visible light) may be protruding beyond the edge of the clothing. Alternatively, clip 431 may be engaging with the inside surface of the clothing with the body of apparatus 110 being adjacent to the outside of the clothing. In various embodiments, the clothing may be positioned between clip 431 and the body of apparatus 110.

Figure 4D:
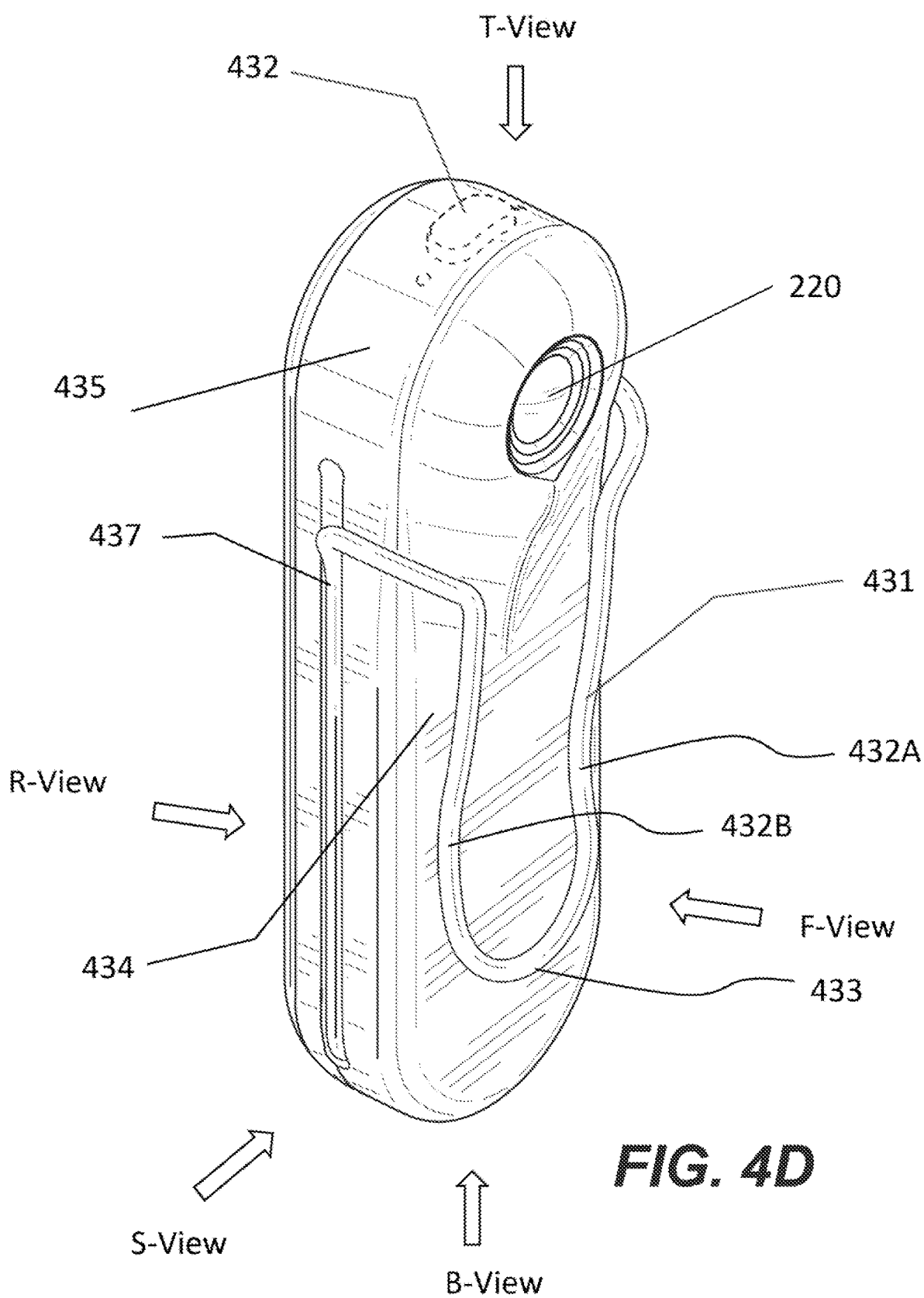

An example embodiment of apparatus 110 is shown in FIG. 4D. Apparatus 110 includes clip 431 which may include points (e.g., 432A and 432B) in close proximity to a front surface 434 of a body 435 of apparatus 110. In an example embodiment, the distance between points 432A, 432B and front surface 434 may be less than a typical thickness of a fabric of the clothing of user 100. For example, the distance between points 432A, 432B and surface 434 may be less than a thickness of a tee-shirt, e.g., less than a millimeter, less than 2 millimeters, less than 3 millimeters, etc., or, in some cases, points 432A, 432B of clip 431 may touch surface 434. In various embodiments, clip 431 may include a point 433 that does not touch surface 434, allowing the clothing to be inserted between clip 431 and surface 434.

FIG. 4D shows schematically different views of apparatus 110 defined as a front view (F-view), a rearview (R-view), a top view (T-view), a side view (S-view) and a bottom view (B-view). These views will be referred to when describing apparatus 110 in subsequent figures. FIG. 4D shows an example embodiment where clip 431 is positioned at the same side of apparatus 110 as sensor 220 (e.g., the front side of apparatus 110). Alternatively, clip 431 may be positioned at an opposite side of apparatus 110 as sensor 220 (e.g., the rear side of apparatus 110). In various embodiments, apparatus 110 may include function button 430, as shown in FIG. 4D.

Figure 4E:
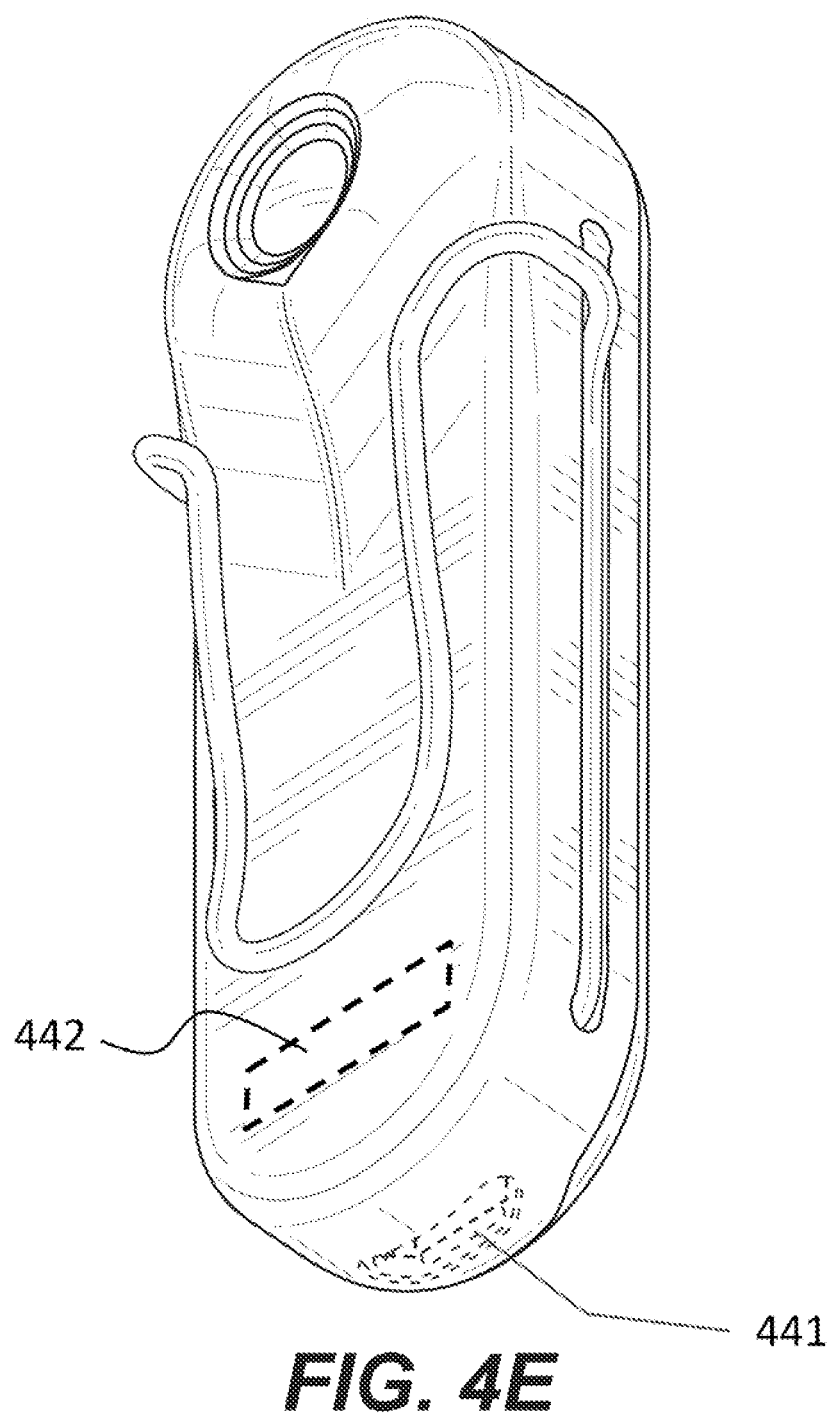
Figure 4F:
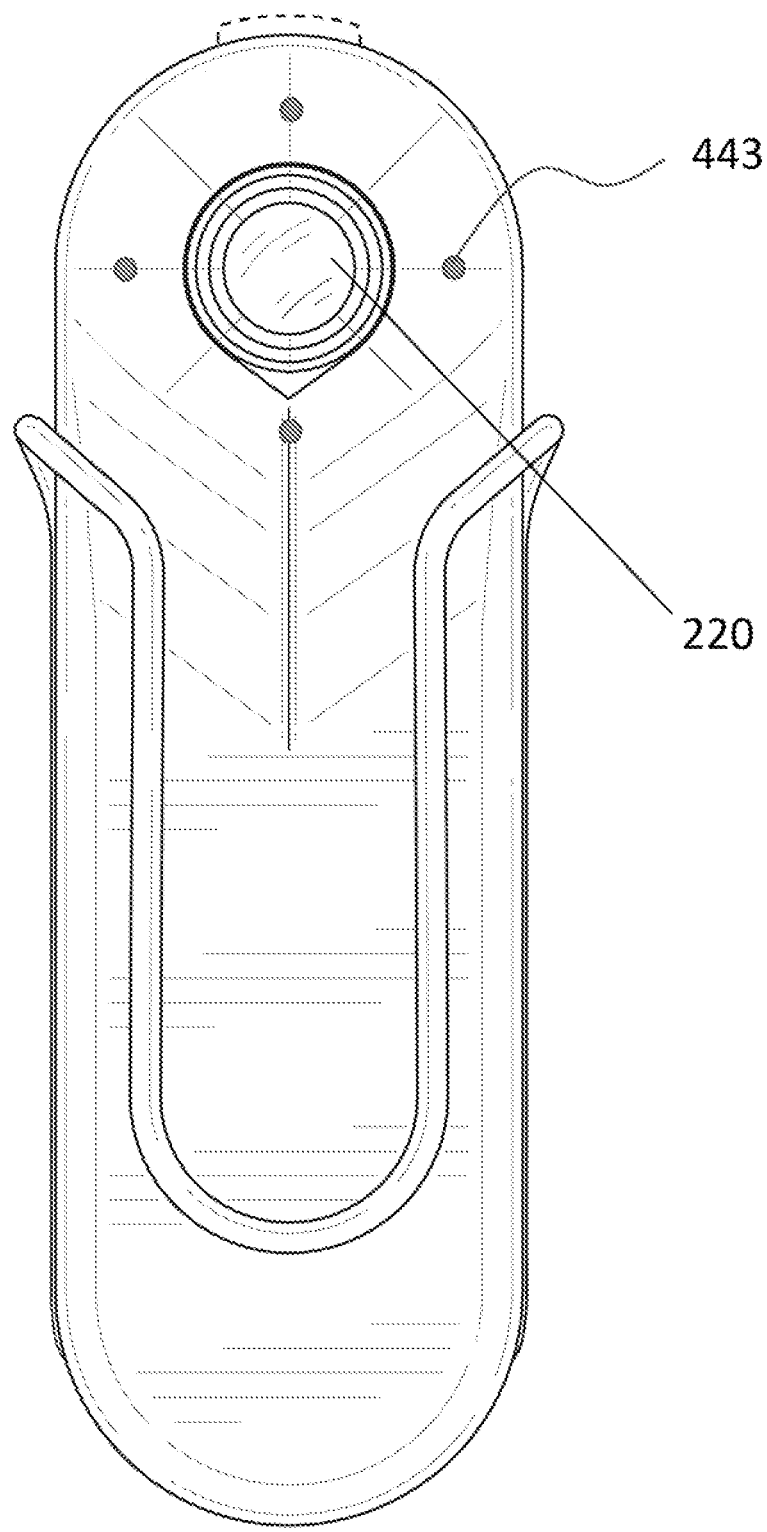
Figure 4G:
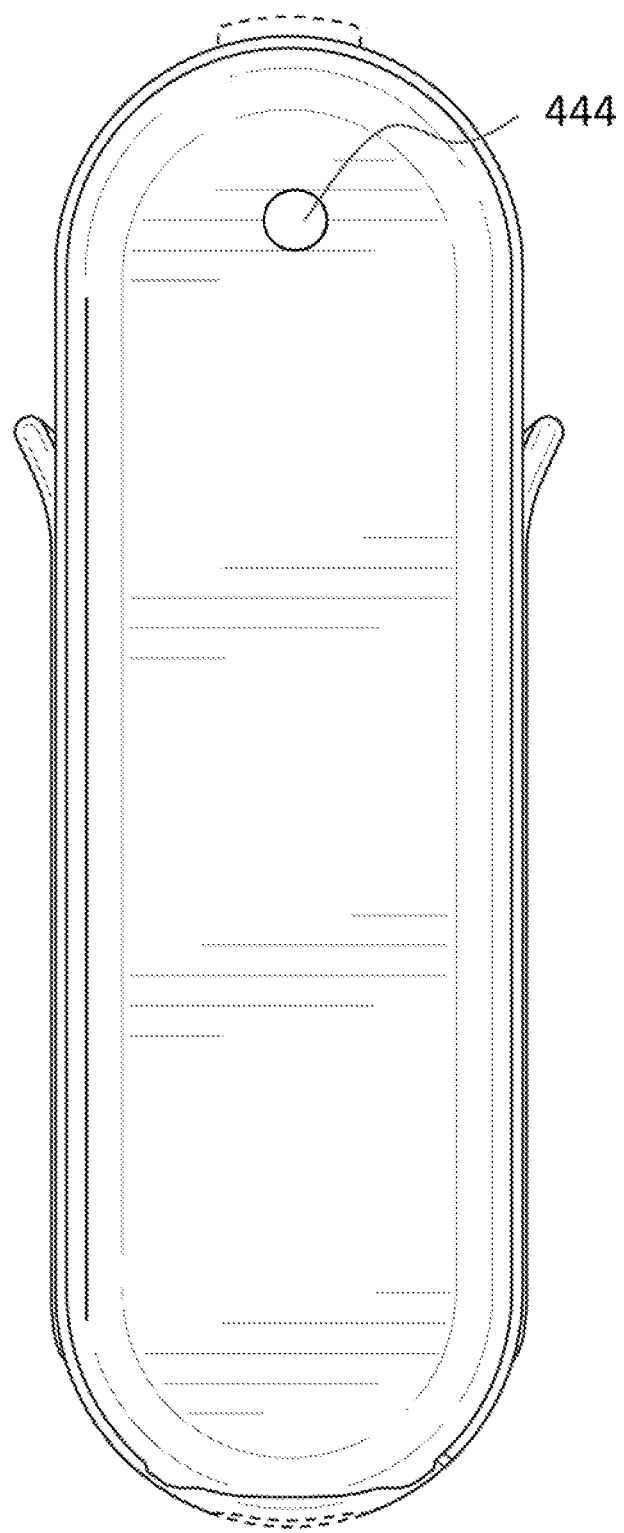

Various views of apparatus 110 are illustrated in FIGS. 4E through 4K. For example, FIG. 4E shows a view of apparatus 110 with an electrical connection 441. Electrical connection 441 may be, for example, a USB port, that may be used to transfer data to/from apparatus 110 and provide electrical power to apparatus 110. In an example embodiment, connection 441 may be used to charge a battery 442 schematically shown in FIG. 4E. FIG. 4F shows F-view of apparatus 110, including sensor 220 and one or more microphones 443. In some embodiments, apparatus 110 may include several microphones 443 facing outwards, wherein microphones 443 are configured to obtain environmental sounds and sounds of various speakers communicating with user 100. FIG. 4G shows R-view of apparatus 110. In some embodiments, microphone 444 may be positioned at the rear side of apparatus 110, as shown in FIG. 4G. Microphone 444 may be used to detect an audio signal from user 100. It should be noted, that apparatus 110 may have microphones placed at any side (e.g., a front side, a rear side, a left side, a right side, a top side, or a bottom side) of apparatus 110. In various embodiments, some microphones may be at a first side (e.g., microphones 443 may be at the front of apparatus 110) and other microphones may be at a second side (e.g., microphone 444 may be at the back side of apparatus 110).

Figure 4H:
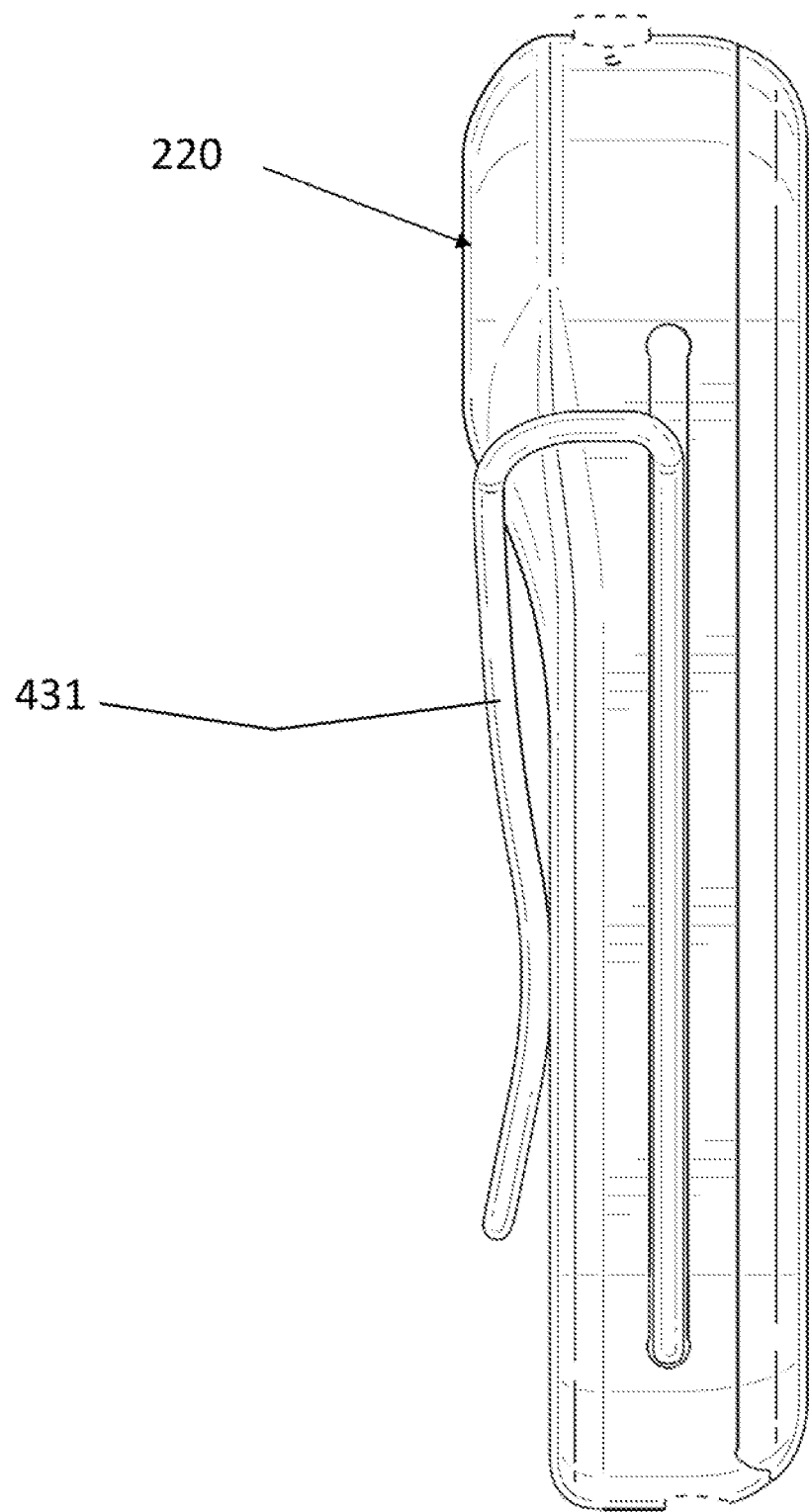
Figure 4I:
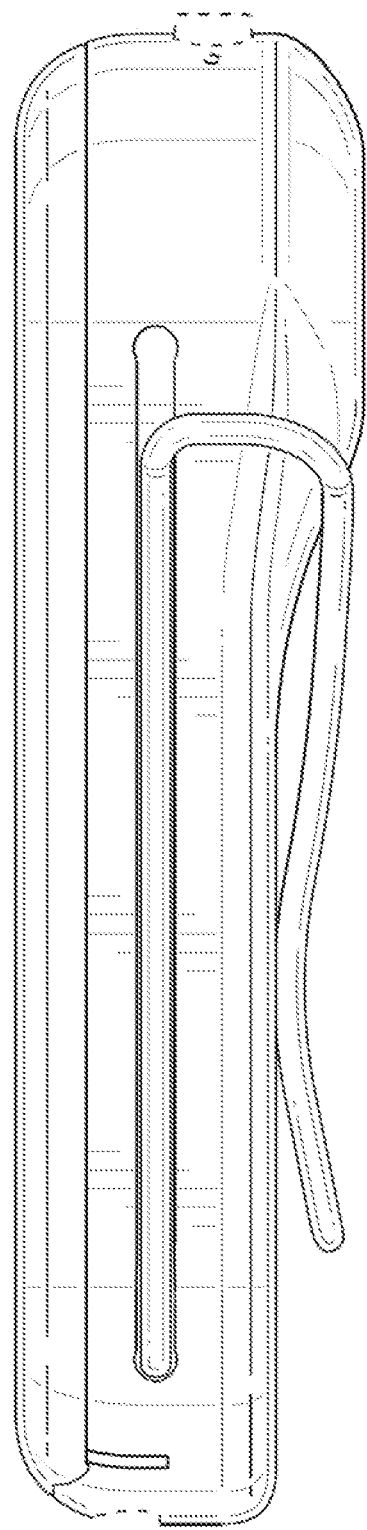
Figure 4J:
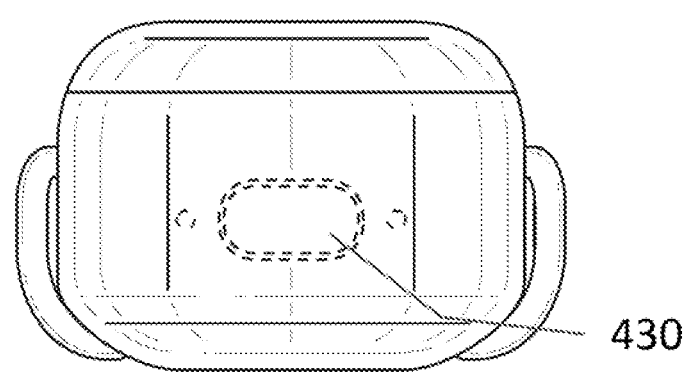
Figure 4K:
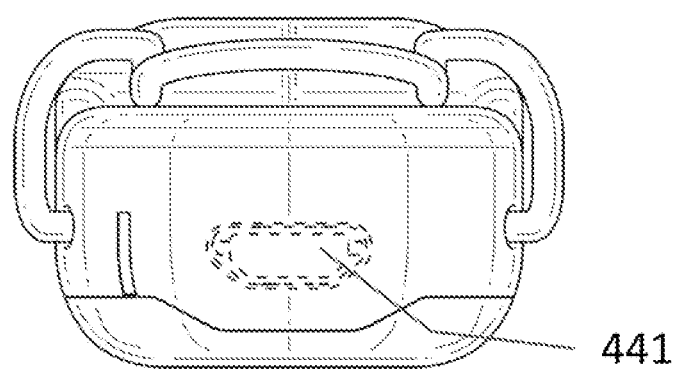

FIGS. 4H and 4I show different sides of apparatus 110 (i.e., S-view of apparatus 110) consisted with disclosed embodiments. For example, FIG. 4H shows the location of sensor 220 and an example shape of clip 431. FIG. 4J shows T-view of apparatus 110, including function button 430, and FIG. 4K shows B-view of apparatus 110 with electrical connection 441.

The example embodiments discussed above with respect to FIGS. 3A, 3B, 4A, and 4B are not limiting. In some embodiments, apparatus 110 may be implemented in any suitable configuration for performing the disclosed methods. For example, referring back to FIG. 2, the disclosed embodiments may implement an apparatus 110 according to any configuration including an image sensor 220 and a processor unit 210 to perform image analysis and for communicating with a feedback unit 230.

Figure 5A:
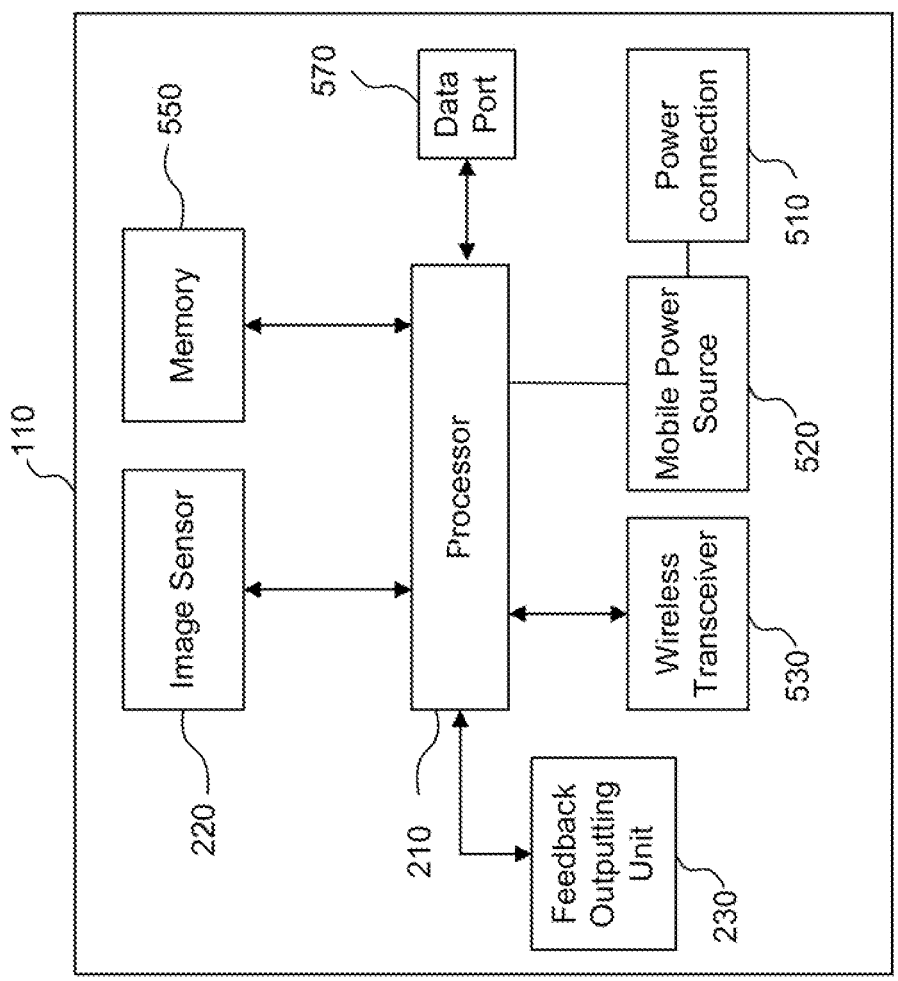
FIG. 5A is a block diagram illustrating an example of the components of a wearable apparatus according to a first embodiment.

FIG. 5A is a block diagram illustrating the components of apparatus 110 according to an example embodiment. As shown in FIG. 5A, and as similarly discussed above, apparatus 110 includes an image sensor 220, a memory 550, a processor 210, a feedback outputting unit 230, a wireless transceiver 530, and a mobile power source 520. In other embodiments, apparatus 110 may also include buttons, other sensors such as a microphone, and inertial measurements devices such as accelerometers, gyroscopes, magnetometers, temperature sensors, color sensors, light sensors, etc. Apparatus 110 may further include a data port 570 and a power connection 510 with suitable interfaces for connecting with an external power source or an external device (not shown).

Processor 210, depicted in FIG. 5A, may include any suitable processing device. The term "processing device" includes any physical device having an electric circuit that performs a logic operation on input or inputs. For example, processing device may include one or more integrated circuits, microchips, microcontrollers, microprocessors, all or part of a central processing unit (CPU), graphics processing unit (GPU), digital signal processor (DSP), field-programmable gate array (FPGA), or other circuits suitable for executing instructions or performing logic operations. The instructions executed by the processing device may, for example, be pre-loaded into a memory integrated with or embedded into the processing device or may be stored in a separate memory (e.g., memory 550). Memory 550 may comprise a Random Access Memory (RAM), a Read-Only Memory (ROM), a hard disk, an optical disk, a magnetic medium, a flash memory, other permanent, fixed, or volatile memory, or any other mechanism capable of storing instructions.

Although, in the embodiment illustrated in FIG. 5A, apparatus 110 includes one processing device (e.g., processor 210), apparatus 110 may include more than one processing device. Each processing device may have a similar construction, or the processing devices may be of differing constructions that are electrically connected or disconnected from each other. For example, the processing devices may be separate circuits or integrated in a single circuit. When more than one processing device is used, the processing devices may be configured to operate independently or collaboratively. The processing devices may be coupled electrically, magnetically, optically, acoustically, mechanically or by other means that permit them to interact.

In some embodiments, processor 210 may process a plurality of images captured from the environment of user 100 to determine different parameters related to capturing subsequent images. For example, processor 210 can determine, based on information derived from captured image data, a value for at least one of the following: an image resolution, a compression ratio, a cropping parameter, frame rate, a focus point, an exposure time, an aperture size, and a light sensitivity. The determined value may be used in capturing at least one subsequent image. Additionally, processor 210 can detect images including at least one hand-related trigger in the environment of the user and perform an action and/or provide an output of information to a user via feedback outputting unit 230.

In another embodiment, processor 210 can change the aiming direction of image sensor 220. For example, when apparatus 110 is attached with clip 420, the aiming direction of image sensor 220 may not coincide with the field-of-view of user 100. Processor 210 may recognize certain situations from the analyzed image data and adjust the aiming direction of image sensor 220 to capture relevant image data. For example, in one embodiment, processor 210 may detect an interaction with another individual and sense that the individual is not fully in view, because image sensor 220 is tilted down. Responsive thereto, processor 210 may adjust the aiming direction of image sensor 220 to capture image data of the individual. Other scenarios are also contemplated where processor 210 may recognize the need to adjust an aiming direction of image sensor 220.

In some embodiments, processor 210 may communicate data to feedback-outputting unit 230, which may include any device configured to provide information to a user 100. Feedback outputting unit 230 may be provided as part of apparatus 110 (as shown) or may be provided external to apparatus 110 and communicatively coupled thereto. Feedback-outputting unit 230 may be configured to output visual or nonvisual feedback based on signals received from processor 210, such as when processor 210 recognizes a hand-related trigger in the analyzed image data.

The term "feedback" refers to any output or information provided in response to processing at least one image in an environment. In some embodiments, as similarly described above, feedback may include an audible or visible indication of time information, detected text or numerals, the value of currency, a branded product, a person's identity, the identity of a landmark or other environmental situation or condition including the street names at an intersection or the color of a traffic light, etc., as well as other information associated with each of these. For example, in some embodiments, feedback may include additional information regarding the amount of currency still needed to complete a transaction, information regarding the identified person, historical information or times and prices of admission etc. of a detected landmark etc. In some embodiments, feedback may include an audible tone, a tactile response, and/or information previously recorded by user 100. Feedback-outputting unit 230 may comprise appropriate components for outputting acoustical and tactile feedback. For example, feedback-outputting unit 230 may comprise audio headphones, a hearing aid type device, a speaker, a bone conduction headphone, interfaces that provide tactile cues, vibrotactile stimulators, etc. In some embodiments, processor 210 may communicate signals with an external feedback outputting unit 230 via a wireless transceiver 530, a wired connection, or some other communication interface. In some embodiments, feedback outputting unit 230 may also include any suitable display device for visually displaying information to user 100.

As shown in FIG. 5A, apparatus 110 includes memory 550. Memory 550 may include one or more sets of instructions accessible to processor 210 to perform the disclosed methods, including instructions for recognizing a hand-related trigger in the image data. In some embodiments memory 550 may store image data (e.g., images, videos) captured from the environment of user 100. In addition, memory 550 may store information specific to user 100, such as image representations of known individuals, favorite products, personal items, and calendar or appointment information, etc. In some embodiments, processor 210 may determine, for example, which type of image data to store based on available storage space in memory 550. In another embodiment, processor 210 may extract information from the image data stored in memory 550.

As further shown in FIG. 5A, apparatus 110 includes mobile power source 520. The term "mobile power source" includes any device capable of providing electrical power, which can be easily carried by hand (e.g., mobile power source 520 may weigh less than a pound). The mobility of the power source enables user 100 to use apparatus 110 in a variety of situations. In some embodiments, mobile power source 520 may include one or more batteries (e.g., nickel-cadmium batteries, nickel-metal hydride batteries, and lithium-ion batteries) or any other type of electrical power supply. In other embodiments, mobile power source 520 may be rechargeable and contained within a casing that holds apparatus 110. In yet other embodiments, mobile power source 520 may include one or more energy harvesting devices for converting ambient energy into electrical energy (e.g., portable solar power units, human vibration units, etc.).

Mobile power source 520 may power one or more wireless transceivers (e.g., wireless transceiver 530 in FIG. 5A). The term "wireless transceiver" refers to any device configured to exchange transmissions over an air interface by use of radio frequency, infrared frequency, magnetic field, or electric field. Wireless transceiver 530 may use any known standard to transmit and/or receive data (e.g., Wi-Fi, Bluetooth®, Bluetooth Smart, 802.15.4, or ZigBee). In some embodiments, wireless transceiver 530 may transmit data (e.g., raw image data, processed image data, extracted information) from apparatus 110 to computing device 120 and/or server 250. Wireless transceiver 530 may also receive data from computing device 120 and/or server 250. In other embodiments, wireless transceiver 530 may transmit data and instructions to an external feedback outputting unit 230.

Figure 5B:
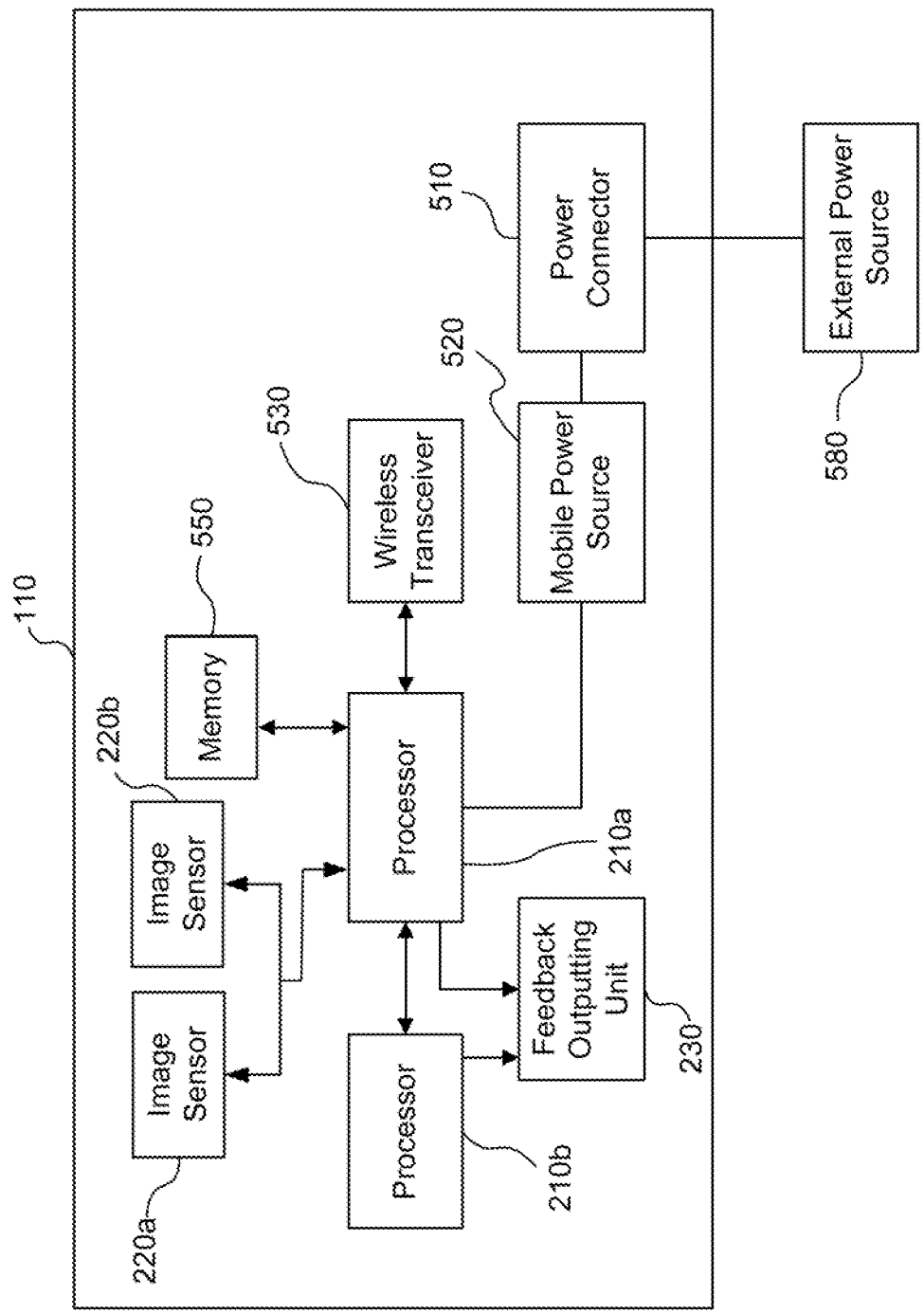
FIG. 5B is a block diagram illustrating an example of the components of a wearable apparatus according to a second embodiment.

FIG. 5B is a block diagram illustrating the components of apparatus 110 according to another example embodiment. In some embodiments, apparatus 110 includes a first image sensor 220a, a second image sensor 220b, a memory 550, a first processor 210a, a second processor 210b, a feedback outputting unit 230, a wireless transceiver 530, a mobile power source 520, and a power connector 510. In the arrangement shown in FIG. 5B, each of the image sensors may provide images in a different image resolution, or face a different direction. Alternatively, each image sensor may be associated with a different camera (e.g., a wide angle camera, a narrow angle camera, an IR camera, etc.). In some embodiments, apparatus 110 can select which image sensor to use based on various factors. For example, processor 210a may determine, based on available storage space in memory 550, to capture subsequent images in a certain resolution.

Apparatus 110 may operate in a first processing-mode and in a second processing-mode, such that the first processing-mode may consume less power than the second processing-mode. For example, in the first processing-mode, apparatus 110 may capture images and process the captured images to make real-time decisions based on an identifying hand-related trigger, for example. In the second processing-mode, apparatus 110 may extract information from stored images in memory 550 and delete images from memory 550. In some embodiments, mobile power source 520 may provide more than fifteen hours of processing in the first processing-mode and about three hours of processing in the second processing-mode. Accordingly, different processing-modes may allow mobile power source 520 to produce sufficient power for powering apparatus 110 for various time periods (e.g., more than two hours, more than four hours, more than ten hours, etc.).

In some embodiments, apparatus 110 may use first processor 210a in the first processing-mode when powered by mobile power source 520, and second processor 210b in the second processing-mode when powered by external power source 580 that is connectable via power connector 510. In other embodiments, apparatus 110 may determine, based on predefined conditions, which processors or which processing modes to use. Apparatus 110 may operate in the second processing-mode even when apparatus 110 is not powered by external power source 580. For example, apparatus 110 may determine that it should operate in the second processing-mode when apparatus 110 is not powered by external power source 580, if the available storage space in memory 550 for storing new image data is lower than a predefined threshold.

Although one wireless transceiver is depicted in FIG. 5B, apparatus 110 may include more than one wireless transceiver (e.g., two wireless transceivers). In an arrangement with more than one wireless transceiver, each of the wireless transceivers may use a different standard to transmit and/or receive data. In some embodiments, a first wireless transceiver may communicate with server 250 or computing device 120 using a cellular standard (e.g., LTE or GSM), and a second wireless transceiver may communicate with server 250 or computing device 120 using a short-range standard (e.g., Wi-Fi or Bluetooth®). In some embodiments, apparatus 110 may use the first wireless transceiver when the wearable apparatus is powered by a mobile power source included in the wearable apparatus, and use the second wireless transceiver when the wearable apparatus is powered by an external power source.

FIG. 5C is a block diagram illustrating the components of apparatus 110 according to another example embodiment including computing device 120. In this embodiment, apparatus 110 includes an image sensor 220, a memory 550a, a first processor 210, a feedback-outputting unit 230, a wireless transceiver 530a, a mobile power source 520, and a power connector 510. As further shown in FIG. 5C, computing device 120 includes a processor 540, a feedback-outputting unit 545, a memory 550b, a wireless transceiver 530b, and a display 260. One example of computing device 120 is a smartphone or tablet having a dedicated application installed therein. In other embodiments, computing device 120 may include any configuration such as an on-board automobile computing system, a PC, a laptop, and any other system consistent with the disclosed embodiments. In this example, user 100 may view feedback output in response to identification of a hand-related trigger on display 260. Additionally, user 100 may view other data (e.g., images, video clips, object information, schedule information, extracted information, etc.) on display 260. In addition, user 100 may communicate with server 250 via computing device 120.

In some embodiments, processor 210 and processor 540 are configured to extract information from captured image data. The term "extracting information" includes any process by which information associated with objects, individuals, locations, events, etc., is identified in the captured image data by any means known to those of ordinary skill in the art. In some embodiments, apparatus 110 may use the extracted information to send feedback or other real-time indications to feedback outputting unit 230 or to computing device 120. In some embodiments, processor 210 may identify in the image data the individual standing in front of user 100, and send computing device 120 the name of the individual and the last time user 100 met the individual. In another embodiment, processor 210 may identify in the image data, one or more visible triggers, including a hand-related trigger, and determine whether the trigger is associated with a person other than the user of the wearable apparatus to selectively determine whether to perform an action associated with the trigger. One such action may be to provide a feedback to user 100 via feedback-outputting unit 230 provided as part of (or in communication with) apparatus 110 or via a feedback unit 545 provided as part of computing device 120. For example, feedback-outputting unit 545 may be in communication with display 260 to cause the display 260 to visibly output information. In some embodiments, processor 210 may identify in the image data a hand-related trigger and send computing device 120 an indication of the trigger. Processor 540 may then process the received trigger information and provide an output via feedback outputting unit 545 or display 260 based on the hand-related trigger. In other embodiments, processor 540 may determine a hand-related trigger and provide suitable feedback similar to the above, based on image data received from apparatus 110. In some embodiments, processor 540 may provide instructions or other information, such as environmental information to apparatus 110 based on an identified hand-related trigger.

In some embodiments, processor 210 may identify other environmental information in the analyzed images, such as an individual standing in front user 100, and send computing device 120 information related to the analyzed information such as the name of the individual and the last time user 100 met the individual. In a different embodiment, processor 540 may extract statistical information from captured image data and forward the statistical information to server 250. For example, certain information regarding the types of items a user purchases, or the frequency a user patronizes a particular merchant, etc. may be determined by processor 540.

Based on this information, server 250 may send computing device 120 coupons and discounts associated with the user's preferences.

When apparatus 110 is connected or wirelessly connected to computing device 120, apparatus 110 may transmit at least part of the image data stored in memory 550a for storage in memory 550b. In some embodiments, after computing device 120 confirms that transferring the part of image data was successful, processor 540 may delete the part of the image data. The term "delete" means that the image is marked as 'deleted' and other image data may be stored instead of it, but does not necessarily mean that the image data was physically removed from the memory.

As will be appreciated by a person skilled in the art having the benefit of this disclosure, numerous variations and/or modifications may be made to the disclosed embodiments. Not all components are essential for the operation of apparatus 110. Any component may be located in any appropriate apparatus and the components may be rearranged into a variety of configurations while providing the functionality of the disclosed embodiments. For example, in some embodiments, apparatus 110 may include a camera, a processor, and a wireless transceiver for sending data to another device. Therefore, the foregoing configurations are examples and, regardless of the configurations discussed above, apparatus 110 can capture, store, and/or process images.

Further, the foregoing and following description refers to storing and/or processing images or image data. In the embodiments disclosed herein, the stored and/or processed images or image data may comprise a representation of one or more images captured by image sensor 220. As the term is used herein, a "representation" of an image (or image data) may include an entire image or a portion of an image. A representation of an image (or image data) may have the same resolution or a lower resolution as the image (or image data), and/or a representation of an image (or image data) may be altered in some respect (e.g., be compressed, have a lower resolution, have one or more colors that are altered, etc.).

For example, apparatus 110 may capture an image and store a representation of the image that is compressed as a JPG file. As another example, apparatus 110 may capture an image in color, but store a black-and-white representation of the color image. As yet another example, apparatus 110 may capture an image and store a different representation of the image (e.g., a portion of the image). For example, apparatus 110 may store a portion of an image that includes a face of a person who appears in the image, but that does not substantially include the environment surrounding the person. Similarly, apparatus 110 may, for example, store a portion of an image that includes a product that appears in the image, but does not substantially include the environment surrounding the product. As yet another example, apparatus 110 may store a representation of an image at a reduced resolution (i.e., at a resolution that is of a lower value than that of the captured image). Storing representations of images may allow apparatus 110 to save storage space in memory 550. Furthermore, processing representations of images may allow apparatus 110 to improve processing efficiency and/or help to preserve battery life.

In addition to the above, in some embodiments, any one of apparatus 110 or computing device 120, via processor 210 or 540, may further process the captured image data to provide additional functionality to recognize objects and/or gestures and/or other information in the captured image data. In some embodiments, actions may be taken based on the identified objects, gestures, or other information. In some embodiments, processor 210 or 540 may identify in the image data, one or more visible triggers, including a hand-related trigger, and determine whether the trigger is associated with a person other than the user to determine whether to perform an action associated with the trigger.

Some embodiments of the present disclosure may include an apparatus securable to an article of clothing of a user. Such an apparatus may include two portions, connectable by a connector. A capturing unit may be designed to be worn on the outside of a user's clothing, and may include an image sensor for capturing images of a user's environment. The capturing unit may be connected to or connectable to a power unit, which may be configured to house a power source and a processing device. The capturing unit may be a small device including a camera or other device for capturing images. The capturing unit may be designed to be inconspicuous and unobtrusive, and may be configured to communicate with a power unit concealed by a user's clothing. The power unit may include bulkier aspects of the system, such as transceiver antennas, at least one battery, a processing device, etc. In some embodiments, communication between the capturing unit and the power unit may be provided by a data cable included in the connector, while in other embodiments, communication may be wirelessly achieved between the capturing unit and the power unit. Some embodiments may permit alteration of the orientation of an image sensor of the capture unit, for example to better capture images of interest.

Figure 6:
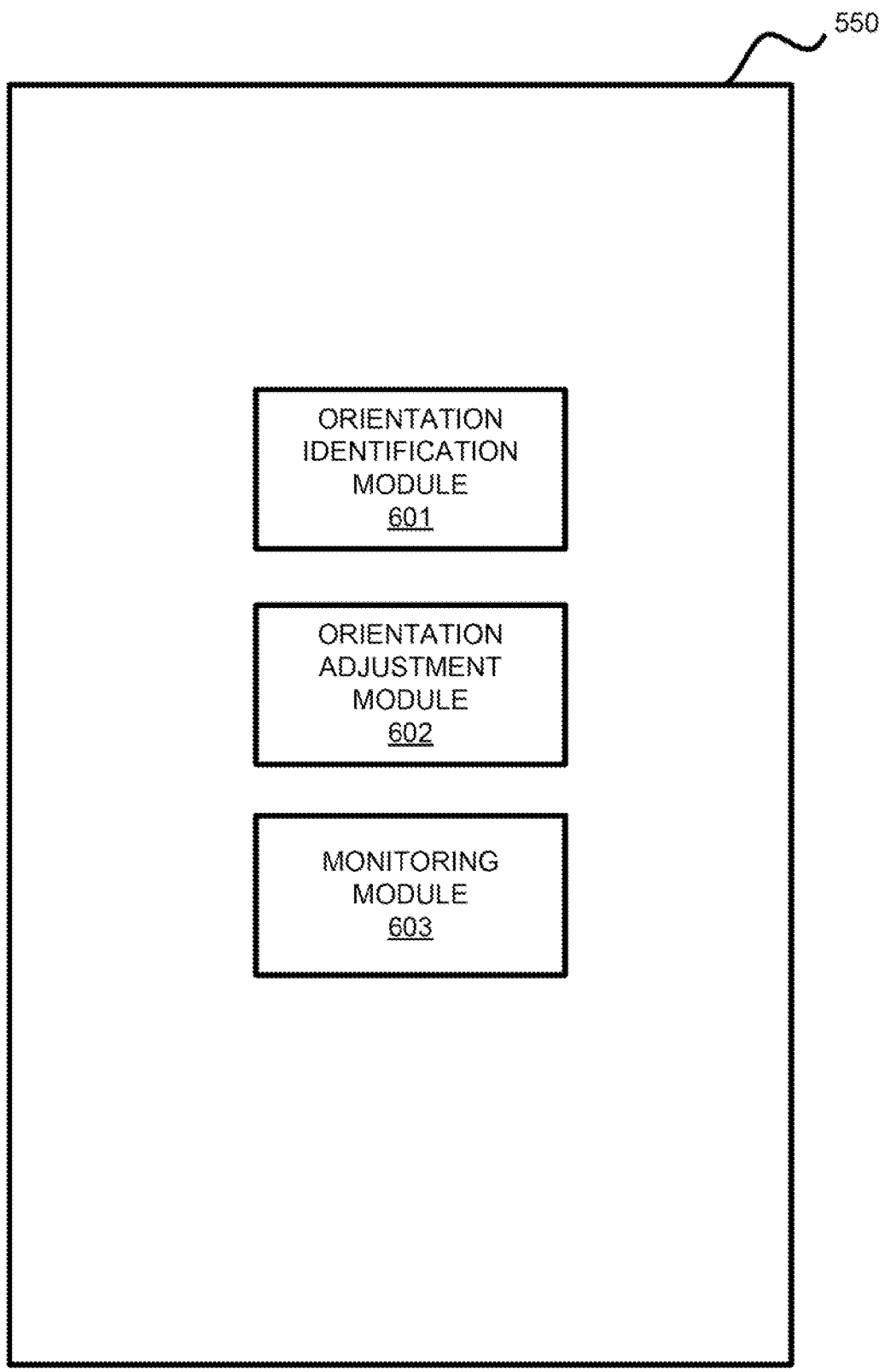
FIG. 6 illustrates an exemplary embodiment of a memory containing software modules consistent with the present disclosure.

FIG. 6 illustrates an exemplary embodiment of a memory containing software modules consistent with the present disclosure. Included in memory 550 are orientation identification module 601, orientation adjustment module 602, and motion tracking module 603. Modules 601, 602, 603 may contain software instructions for execution by at least one processing device, e.g., processor 210, included with a wearable apparatus. Orientation identification module 601, orientation adjustment module 602, and motion tracking module 603 may cooperate to provide orientation adjustment for a capturing unit incorporated into wireless apparatus 110.

Figure 7:
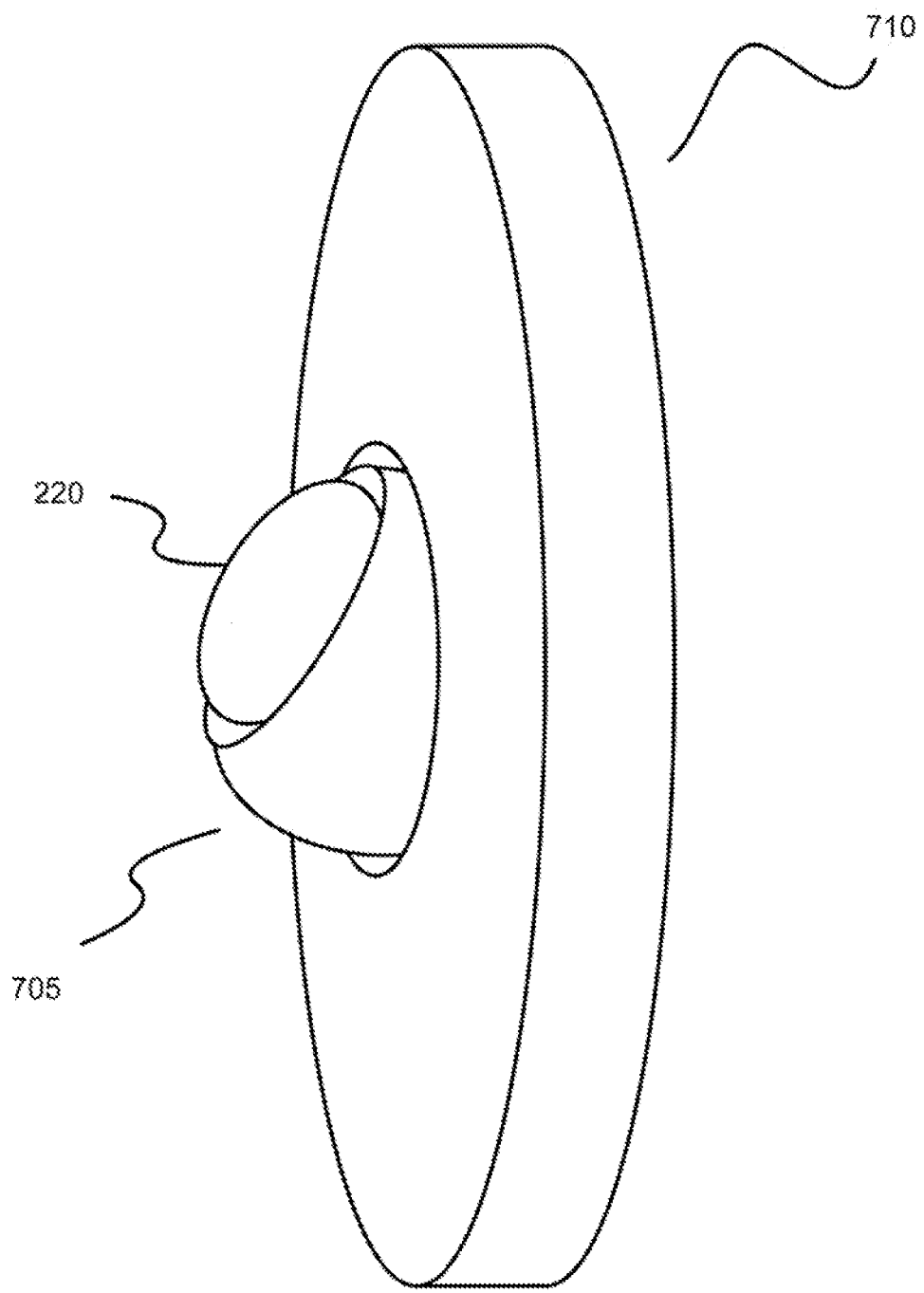
FIG. 7 is a schematic illustration of an embodiment of a wearable apparatus including an orientable image capture unit.

FIG. 7 illustrates an exemplary capturing unit 710 including an orientation adjustment unit 705. Orientation adjustment unit 705 may be configured to permit the adjustment of image sensor 220. As illustrated in FIG. 7, orientation adjustment unit 705 may include an eye-ball type adjustment mechanism. In alternative embodiments, orientation adjustment unit 705 may include gimbals, adjustable stalks, pivotable mounts, and any other suitable unit for adjusting an orientation of image sensor 220.

Image sensor 220 may be configured to be movable with the head of user 100 in such a manner that an aiming direction of image sensor 220 substantially coincides with a field of view of user 100. For example, as described above, a camera associated with image sensor 220 may be installed within capturing unit 710 at a predetermined angle in a position facing slightly upwards or downwards, depending on an intended location of capturing unit 710. Accordingly, the set aiming direction of image sensor 220 may match the field-of-view of user 100. In some embodiments, processor 210 may change the orientation of image sensor 220 using image data provided from image sensor 220. For example, processor 210 may recognize that a user is reading a book and determine that the aiming direction of image sensor 220 is offset from the text. That is, because the words in the beginning of each line of text are not fully in view, processor 210 may determine that image sensor 220 is tilted in the wrong direction. Responsive thereto, processor 210 may adjust the aiming direction of image sensor 220.

Orientation identification module 601 may be configured to identify an orientation of an image sensor 220 of capturing unit 710. An orientation of an image sensor 220 may be identified, for example, by analysis of images captured by image sensor 220 of capturing unit 710, by tilt or attitude sensing devices within capturing unit 710, and by measuring a relative direction of orientation adjustment unit 705 with respect to the remainder of capturing unit 710.

Orientation adjustment module 602 may be configured to adjust an orientation of image sensor 220 of capturing unit 710. As discussed above, image sensor 220 may be mounted on an orientation adjustment unit 705 configured for movement. Orientation adjustment unit 705 may be configured for rotational and/or lateral movement in response to commands from orientation adjustment module 602. In some embodiments orientation adjustment unit 705 may be adjust an orientation of image sensor 220 via motors, electromagnets, permanent magnets, and/or any suitable combination thereof.

In some embodiments, monitoring module 603 may be provided for continuous monitoring. Such continuous monitoring may include tracking a movement of at least a portion of an object included in one or more images captured by the image sensor. For example, in one embodiment, apparatus 110 may track an object as long as the object remains substantially within the field-of-view of image sensor 220. In additional embodiments, monitoring module 603 may engage orientation adjustment module 602 to instruct orientation adjustment unit 705 to continually orient image sensor 220 towards an object of interest. For example, in one embodiment, monitoring module 603 may cause image sensor 220 to adjust an orientation to ensure that a certain designated object, for example, the face of a particular person, remains within the field-of view of image sensor 220, even as that designated object moves about. In another embodiment, monitoring module 603 may continuously monitor an area of interest included in one or more images captured by the image sensor. For example, a user may be occupied by a certain task, for example, typing on a laptop, while image sensor 220 remains oriented in a particular direction and continuously monitors a portion of each image from a series of images to detect a trigger or other event. For example, image sensor 210 may be oriented towards a piece of laboratory equipment and monitoring module 603 may be configured to monitor a status light on the laboratory equipment for a change in status, while the user's attention is otherwise occupied.

In some embodiments consistent with the present disclosure, capturing unit 710 may include a plurality of image sensors 220. The plurality of image sensors 220 may each be configured to capture different image data. For example, when a plurality of image sensors 220 are provided, the image sensors 220 may capture images having different resolutions, may capture wider or narrower fields of view, and may have different levels of magnification. Image sensors 220 may be provided with varying lenses to permit these different configurations. In some embodiments, a plurality of image sensors 220 may include image sensors 220 having different orientations. Thus, each of the plurality of image sensors 220 may be pointed in a different direction to capture different images. The fields of view of image sensors 220 may be overlapping in some embodiments. The plurality of image sensors 220 may each be configured for orientation adjustment, for example, by being paired with an image adjustment unit 705. In some embodiments, monitoring module 603, or another module associated with memory 550, may be configured to individually adjust the orientations of the plurality of image sensors 220 as well as to turn each of the plurality of image sensors 220 on or off as may be required. In some embodiments, monitoring an object or person captured by an image sensor 220 may include tracking movement of the object across the fields of view of the plurality of image sensors 220.

Embodiments consistent with the present disclosure may include connectors configured to connect a capturing unit and a power unit of a wearable apparatus. Capturing units consistent with the present disclosure may include least one image sensor configured to capture images of an environment of a user. Power units consistent with the present disclosure may be configured to house a power source and/or at least one processing device. Connectors consistent with the present disclosure may be configured to connect the capturing unit and the power unit, and may be configured to secure the apparatus to an article of clothing such that the capturing unit is positioned over an outer surface of the article of clothing and the power unit is positioned under an inner surface of the article of clothing. Exemplary embodiments of capturing units, connectors, and power units consistent with the disclosure are discussed in further detail with respect to FIGS. 8-14.

Figure 8:
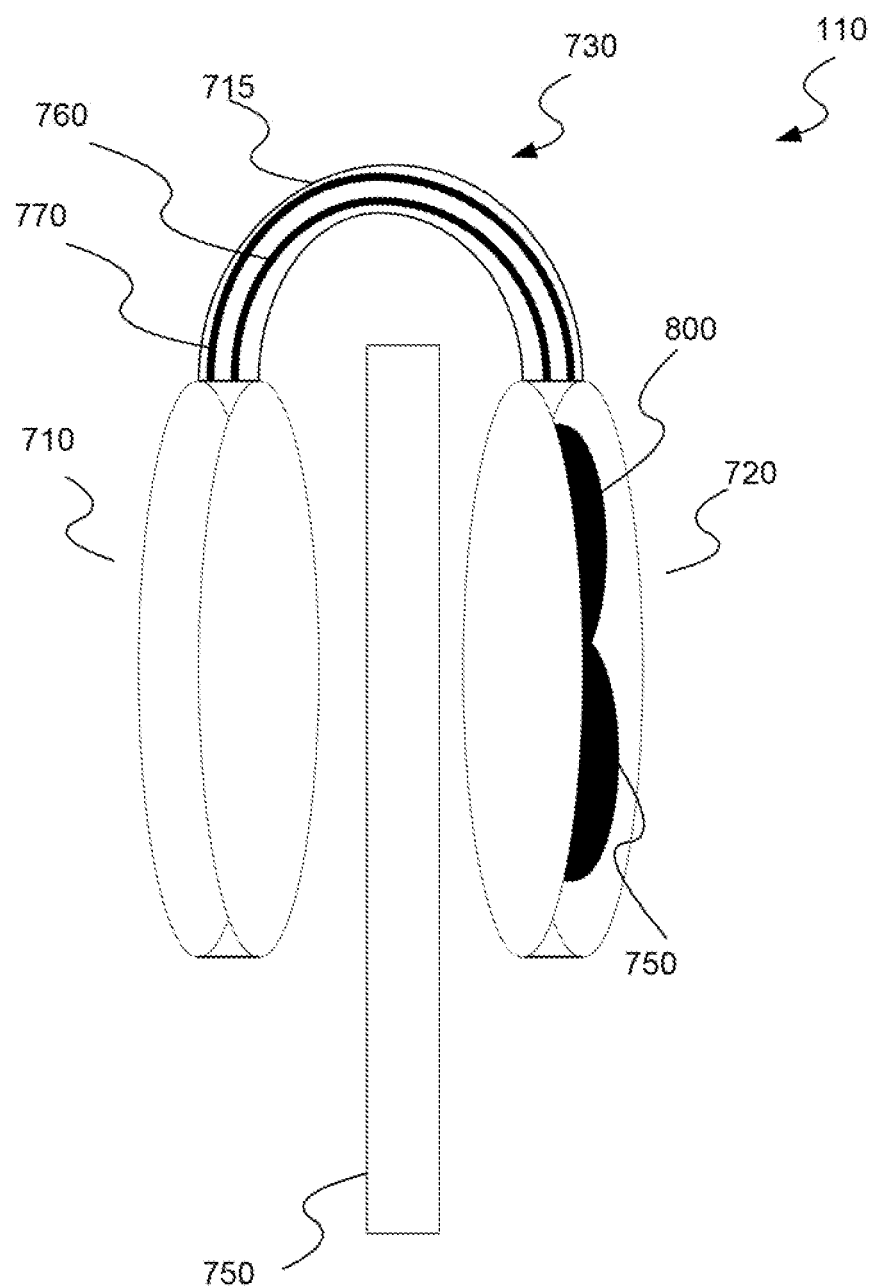
FIG. 8 is a schematic illustration of an embodiment of a wearable apparatus securable to an article of clothing consistent with the present disclosure.

FIG. 8 is a schematic illustration of an embodiment of wearable apparatus 110 securable to an article of clothing consistent with the present disclosure. As illustrated in FIG. 8, capturing unit 710 and power unit 720 may be connected by a connector 730 such that capturing unit 710 is positioned on one side of an article of clothing 750 and power unit 720 is positioned on the opposite side of the clothing 750. In some embodiments, capturing unit 710 may be positioned over an outer surface of the article of clothing 750 and power unit 720 may be located under an inner surface of the article of clothing 750. The power unit 720 may be configured to be placed against the skin of a user.

Capturing unit 710 may include an image sensor 220 and an orientation adjustment unit 705 (as illustrated in FIG. 7). Power unit 720 may include mobile power source 520 and processor 210. Power unit 720 may further include any combination of elements previously discussed that may be a part of wearable apparatus 110, including, but not limited to, wireless transceiver 530, feedback outputting unit 230, memory 550, and data port 570.

Connector 730 may include a clip 715 or other mechanical connection designed to clip or attach capturing unit 710 and power unit 720 to an article of clothing 750 as illustrated in FIG. 8. As illustrated, clip 715 may connect to each of capturing unit 710 and power unit 720 at a perimeter thereof, and may wrap around an edge of the article of clothing 750 to affix the capturing unit 710 and power unit 720 in place. Connector 730 may further include a power cable 760 and a data cable 770. Power cable 760 may be capable of conveying power from mobile power source 520 to image sensor 220 of capturing unit 710. Power cable 760 may also be configured to provide power to any other elements of capturing unit 710, e.g., orientation adjustment unit 705. Data cable 770 may be capable of conveying captured image data from image sensor 220 in capturing unit 710 to processor 800 in the power unit 720. Data cable 770 may be further capable of conveying additional data between capturing unit 710 and processor 800, e.g., control instructions for orientation adjustment unit 705.

Figure 9:
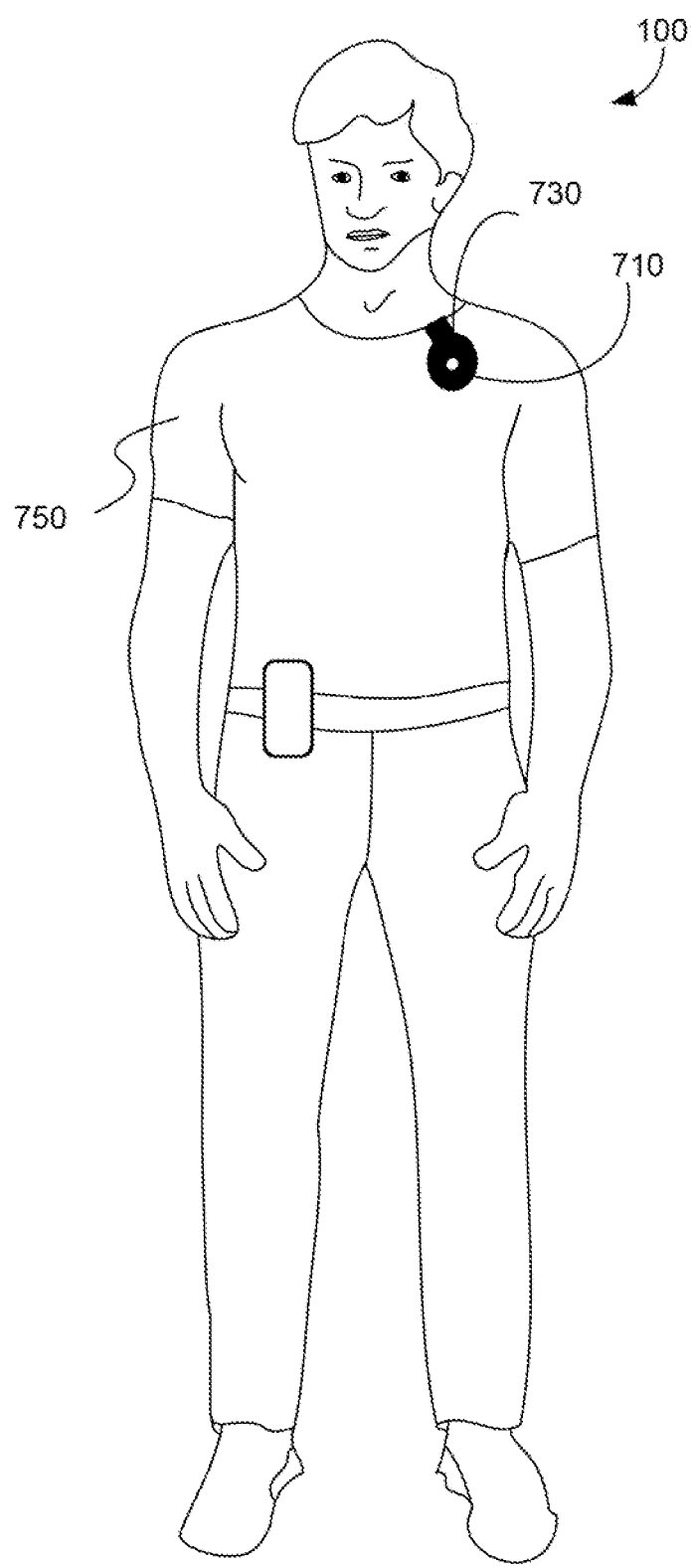
FIG. 9 is a schematic illustration of a user wearing a wearable apparatus consistent with an embodiment of the present disclosure.

FIG. 9 is a schematic illustration of a user 100 wearing a wearable apparatus 110 consistent with an embodiment of the present disclosure. As illustrated in FIG. 9, capturing unit 710 is located on an exterior surface of the clothing 750 of user 100. Capturing unit 710 is connected to power unit 720 (not seen in this illustration) via connector 730, which wraps around an edge of clothing 750.

Figure 10:
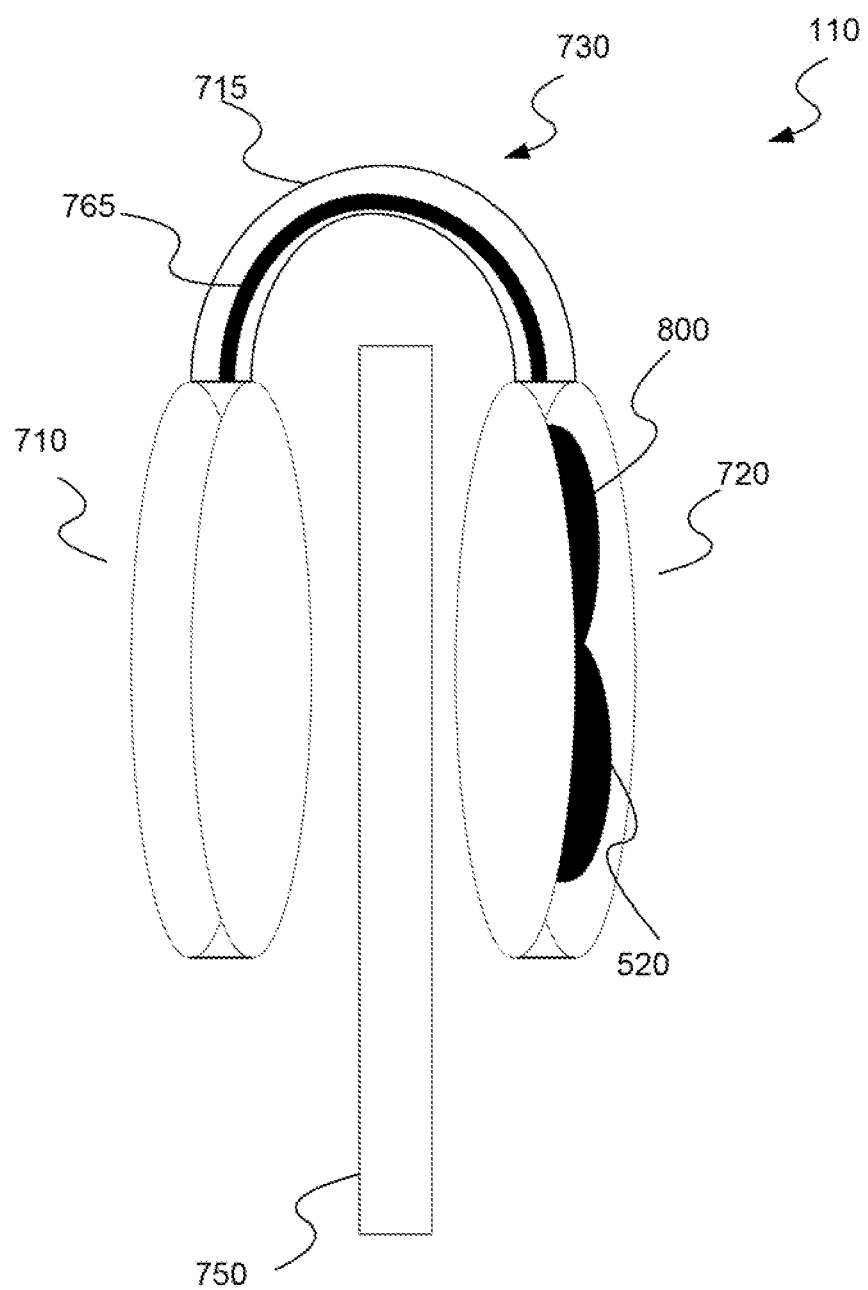
FIG. 10 is a schematic illustration of an embodiment of a wearable apparatus securable to an article of clothing consistent with the present disclosure.

In some embodiments, connector 730 may include a flexible printed circuit board (PCB). FIG. 10 illustrates an exemplary embodiment wherein connector 730 includes a flexible printed circuit board 765. Flexible printed circuit board 765 may include data connections and power connections between capturing unit 710 and power unit 720. Thus, in some embodiments, flexible printed circuit board 765 may serve to replace power cable 760 and data cable 770. In alternative embodiments, flexible printed circuit board 765 may be included in addition to at least one of power cable 760 and data cable 770. In various embodiments discussed herein, flexible printed circuit board 765 may be substituted for, or included in addition to, power cable 760 and data cable 770.

Figure 11:
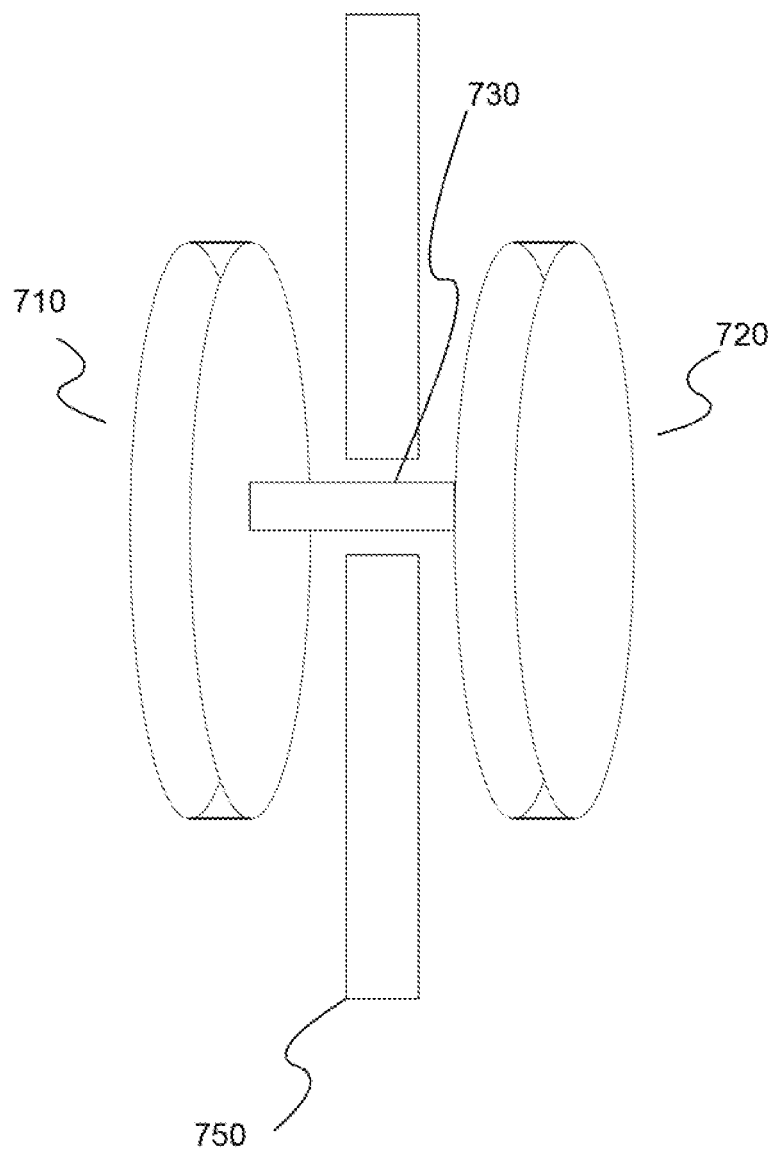
FIG. 11 is a schematic illustration of an embodiment of a wearable apparatus securable to an article of clothing consistent with the present disclosure.

FIG. 11 is a schematic illustration of another embodiment of a wearable apparatus securable to an article of clothing consistent with the present disclosure. As illustrated in FIG. 11, connector 730 may be centrally located with respect to capturing unit 710 and power unit 720. Central location of connector 730 may facilitate affixing apparatus 110 to clothing 750 through a hole in clothing 750 such as, for example, a button-hole in an existing article of clothing 750 or a specialty hole in an article of clothing 750 designed to accommodate wearable apparatus 110.

Figure 12:
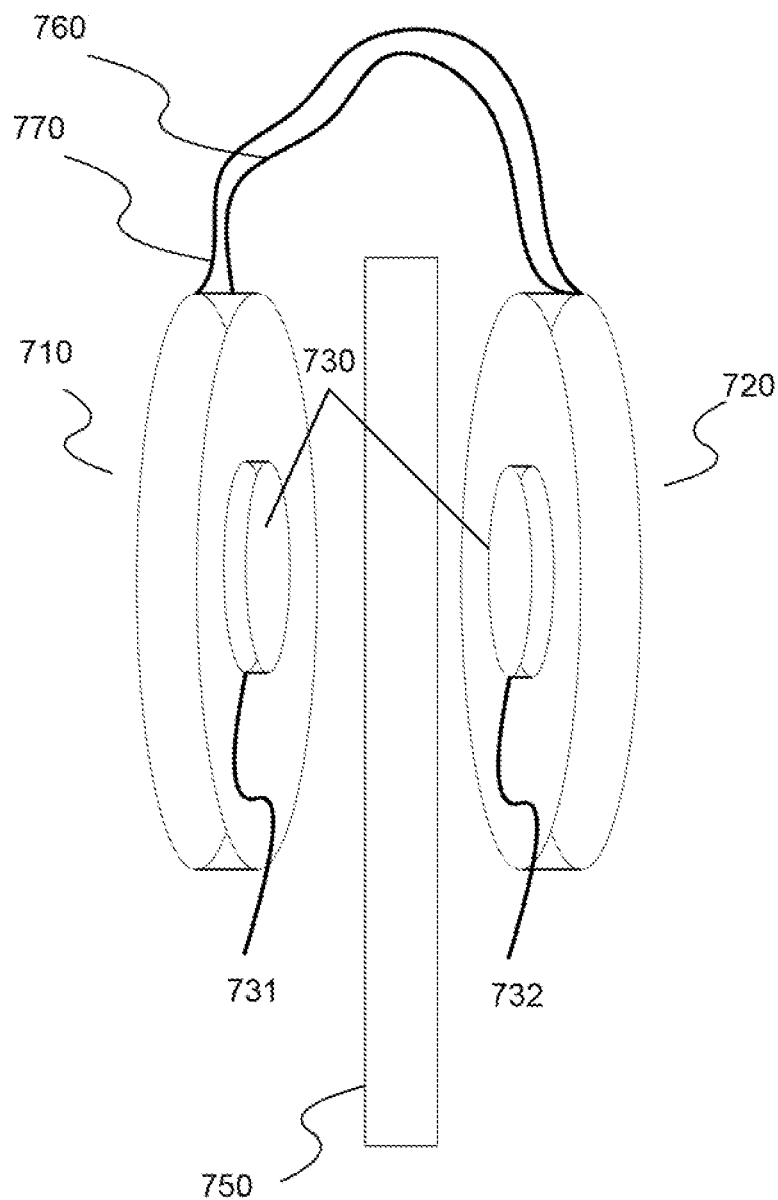
FIG. 12 is a schematic illustration of an embodiment of a wearable apparatus securable to an article of clothing consistent with the present disclosure.

FIG. 12 is a schematic illustration of still another embodiment of wearable apparatus 110 securable to an article of clothing. As illustrated in FIG. 12, connector 730 may include a first magnet 731 and a second magnet 732. First magnet 731 and second magnet 732 may secure capturing unit 710 to power unit 720 with the article of clothing positioned between first magnet 731 and second magnet 732. In embodiments including first magnet 731 and second magnet 732, power cable 760 and data cable 770 may also be included. In these embodiments, power cable 760 and data cable 770 may be of any length, and may provide a flexible power and data connection between capturing unit 710 and power unit 720. Embodiments including first magnet 731 and second magnet 732 may further include a flexible PCB 765 connection in addition to or instead of power cable 760 and/or data cable 770. In some embodiments, first magnet 731 or second magnet 732 may be replaced by an object comprising a metal material.

Figure 13:
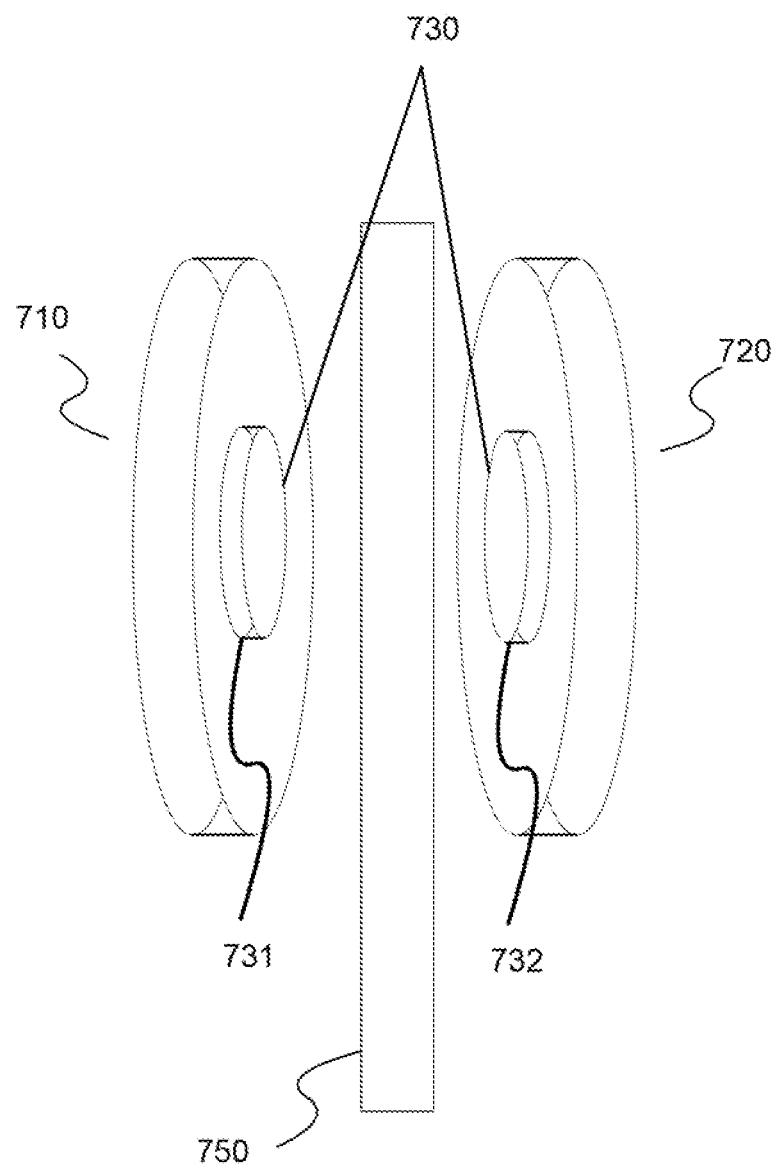
FIG. 13 is a schematic illustration of an embodiment of a wearable apparatus securable to an article of clothing consistent with the present disclosure.

FIG. 13 is a schematic illustration of yet another embodiment of a wearable apparatus 110 securable to an article of clothing. FIG. 13 illustrates an embodiment wherein power and data may be wirelessly transferred between capturing unit 710 and power unit 720. As illustrated in FIG. 13, first magnet 731 and second magnet 732 may be provided as connector 730 to secure capturing unit 710 and power unit 720 to an article of clothing 750. Power and/or data may be transferred between capturing unit 710 and power unit 720 via any suitable wireless technology, for example, magnetic and/or capacitive coupling, near field communication technologies, radiofrequency transfer, and any other wireless technology suitable for transferring data and/or power across short distances.

Figure 14:
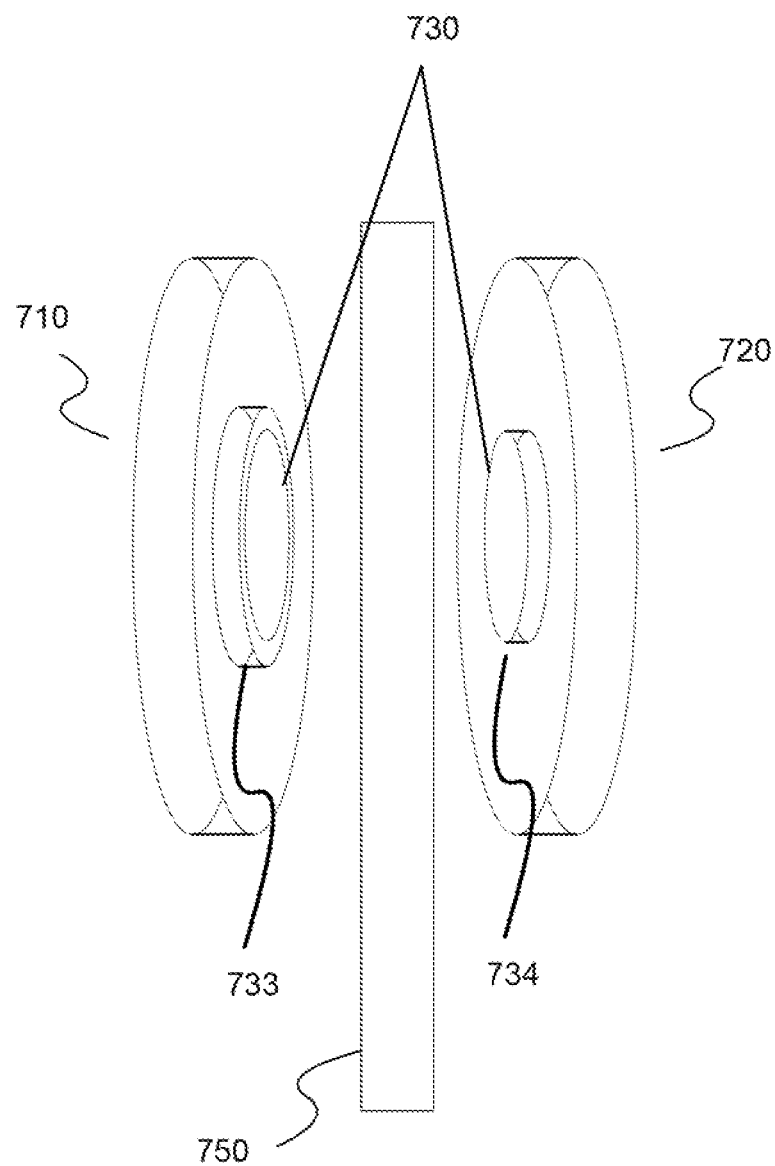
FIG. 14 is a schematic illustration of an embodiment of a wearable apparatus securable to an article of clothing consistent with the present disclosure.

FIG. 14 illustrates still another embodiment of wearable apparatus 110 securable to an article of clothing 750 of a user. As illustrated in FIG. 14, connector 730 may include features designed for a contact fit. For example, capturing unit 710 may include a ring 733 with a hollow center having a diameter slightly larger than a disk-shaped protrusion 734 located on power unit 720. When pressed together with fabric of an article of clothing 750 between them, disk-shaped protrusion 734 may fit tightly inside ring 733, securing capturing unit 710 to power unit 720. FIG. 14 illustrates an embodiment that does not include any cabling or other physical connection between capturing unit 710 and power unit 720. In this embodiment, capturing unit 710 and power unit 720 may transfer power and data wirelessly. In alternative embodiments, capturing unit 710 and power unit 720 may transfer power and data via at least one of cable 760, data cable 770, and flexible printed circuit board 765.

Figure 15:
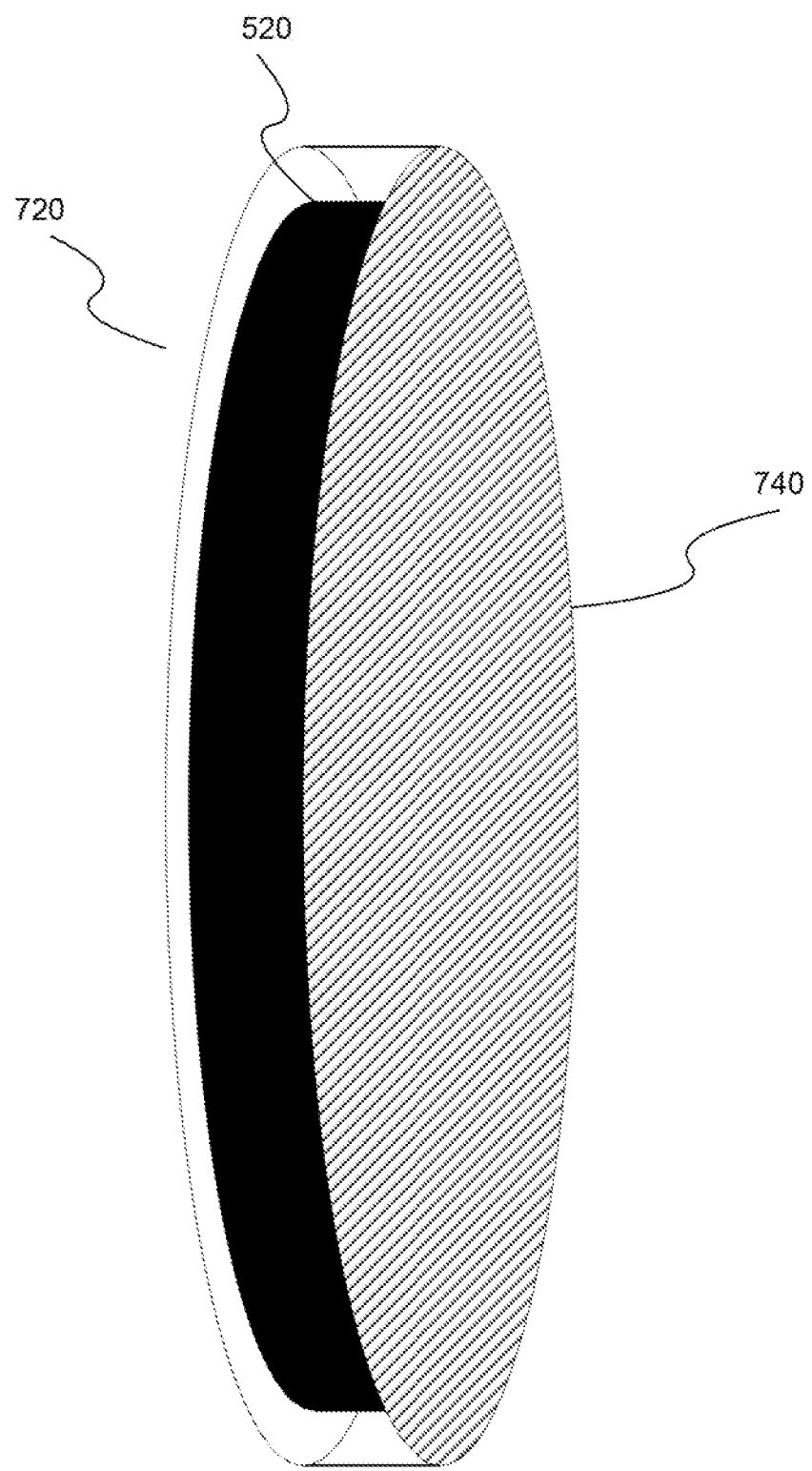
FIG. 15 is a schematic illustration of an embodiment of a wearable apparatus power unit including a power source.

FIG. 15 illustrates another aspect of power unit 720 consistent with embodiments described herein. Power unit 720 may be configured to be positioned directly against the user's skin. To facilitate such positioning, power unit 720 may further include at least one surface coated with a biocompatible material 740. Biocompatible materials 740 may include materials that will not negatively react with the skin of the user when worn against the skin for extended periods of time. Such materials may include, for example, silicone, PTFE, kapton, polyimide, titanium, nitinol, platinum, and others. Also as illustrated in FIG. 15, power unit 720 may be sized such that an inner volume of the power unit is substantially filled by mobile power source 520. That is, in some embodiments, the inner volume of power unit 720 may be such that the volume does not accommodate any additional components except for mobile power source 520. In some embodiments, mobile power source 520 may take advantage of its close proximity to the skin of user's skin. For example, mobile power source 520 may use the Peltier effect to produce power and/or charge the power source.

Figure 16:
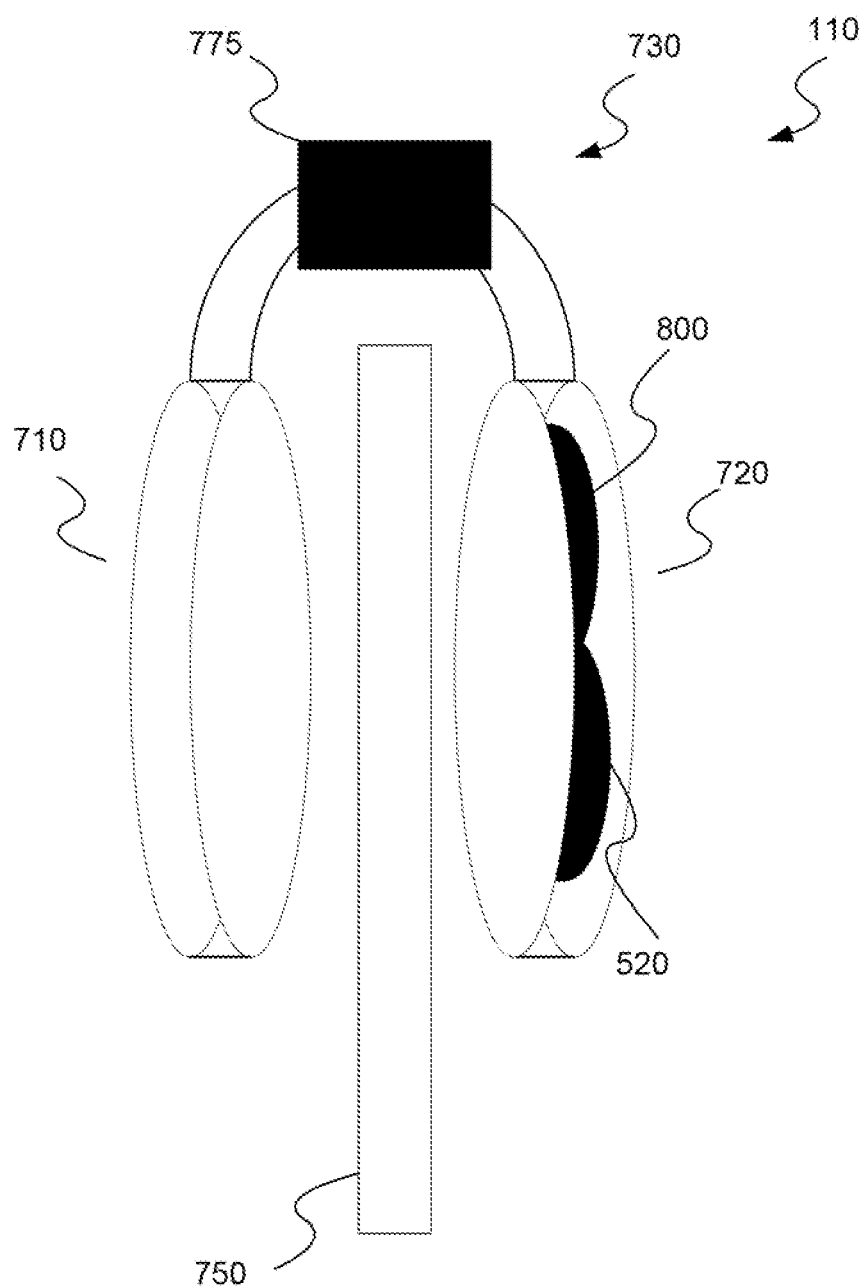
FIG. 16 is a schematic illustration of an exemplary embodiment of a wearable apparatus including protective circuitry.

In further embodiments, an apparatus securable to an article of clothing may further include protective circuitry associated with power source 520 housed in in power unit 720. FIG. 16 illustrates an exemplary embodiment including protective circuitry 775. As illustrated in FIG. 16, protective circuitry 775 may be located remotely with respect to power unit 720. In alternative embodiments, protective circuitry 775 may also be located in capturing unit 710, on flexible printed circuit board 765, or in power unit 720.

Protective circuitry 775 may be configured to protect image sensor 220 and/or other elements of capturing unit 710 from potentially dangerous currents and/or voltages produced by mobile power source 520. Protective circuitry 775 may include passive components such as capacitors, resistors, diodes, inductors, etc., to provide protection to elements of capturing unit 710. In some embodiments, protective circuitry 775 may also include active components, such as transistors, to provide protection to elements of capturing unit 710. For example, in some embodiments, protective circuitry 775 may comprise one or more resistors serving as fuses. Each fuse may comprise a wire or strip that melts (thereby braking a connection between circuitry of image capturing unit 710 and circuitry of power unit 720) when current flowing through the fuse exceeds a predetermined limit (e.g., 500 milliamps, 900 milliamps, 1 amp, 1.1 amps, 2 amp, 2.1 amps, 3 amps, etc.) Any or all of the previously described embodiments may incorporate protective circuitry 775.

In some embodiments, the wearable apparatus may transmit data to a computing device (e.g., a smartphone, tablet, watch, computer, etc.) over one or more networks via any known wireless standard (e.g., cellular, Wi-Fi, Bluetooth®, etc.), or via near-filed capacitive coupling, other short range wireless techniques, or via a wired connection. Similarly, the wearable apparatus may receive data from the computing device over one or more networks via any known wireless standard (e.g., cellular, Wi-Fi, Bluetooth®, etc.), or via near-filed capacitive coupling, other short range wireless techniques, or via a wired connection. The data transmitted to the wearable apparatus and/or received by the wireless apparatus may include images, portions of images, identifiers related to information appearing in analyzed images or associated with analyzed audio, or any other data representing image and/or audio data. For example, an image may be analyzed and an identifier related to an activity occurring in the image may be transmitted to the computing device (e.g., the "paired device"). In the embodiments described herein, the wearable apparatus may process images and/or audio locally (on board the wearable apparatus) and/or remotely (via a computing device). Further, in the embodiments described herein, the wearable apparatus may transmit data related to the analysis of images and/or audio to a computing device for further analysis, display, and/or transmission to another device (e.g., a paired device). Further, a paired device may execute one or more applications (apps) to process, display, and/or analyze data (e.g., identifiers, text, images, audio, etc.) received from the wearable apparatus.

Some of the disclosed embodiments may involve systems, devices, methods, and software products for determining at least one keyword. For example, at least one keyword may be determined based on data collected by apparatus 110. At least one search query may be determined based on the at least one keyword. The at least one search query may be transmitted to a search engine.

In some embodiments, at least one keyword may be determined based on at least one or more images captured by image sensor 220. In some cases, the at least one keyword may be selected from a keywords pool stored in memory. In some cases, optical character recognition (OCR) may be performed on at least one image captured by image sensor 220, and the at least one keyword may be determined based on the OCR result. In some cases, at least one image captured by image sensor 220 may be analyzed to recognize: a person, an object, a location, a scene, and so forth. Further, the at least one keyword may be determined based on the recognized person, object, location, scene, etc. For example, the at least one keyword may comprise: a person's name, an object's name, a place's name, a date, a sport team's name, a movie's name, a book's name, and so forth.

In some embodiments, at least one keyword may be determined based on the user's behavior. The user's behavior may be determined based on an analysis of the one or more images captured by image sensor 220. In some embodiments, at least one keyword may be determined based on activities of a user and/or other person. The one or more images captured by image sensor 220 may be analyzed to identify the activities of the user and/or the other person who appears in one or more images captured by image sensor 220. In some embodiments, at least one keyword may be determined based on at least one or more audio segments captured by apparatus 110. In some embodiments, at least one keyword may be determined based on at least CPS information associated with the user. In some embodiments, at least one keyword may be determined based on at least the current time and/or date.

In some embodiments, at least one search query may be determined based on at least one keyword. In some cases, the at least one search query may comprise the at least one keyword. In some cases, the at least one search query may comprise the at least one keyword and additional keywords provided by the user. In some cases, the at least one search query may comprise the at least one keyword and one or more images, such as images captured by image sensor 220. In some cases, the at least one search query may comprise the at least one keyword and one or more audio segments, such as audio segments captured by apparatus 110.

In some embodiments, the at least one search query may be transmitted to a search engine. In some embodiments, search results provided by the search engine in response to the at least one search query may be provided to the user. In some embodiments, the at least one search query may be used to access a database.

For example, in one embodiment, the keywords may include a name of a type of food, such as *quinoa*, or a brand name of a food product; and the search will output information related to desirable quantities of consumption, facts about the nutritional profile, and so forth. In another example, in one embodiment, the keywords may include a name of a restaurant, and the search will output information related to the restaurant, such as a menu, opening hours, reviews, and so forth. The name of the restaurant may be obtained using OCR on an image of signage, using GPS information, and so forth. In another example, in one embodiment, the keywords may include a name of a person, and the search will provide information from a social network profile of the person. The name of the person may be obtained using OCR on an image of a name tag attached to the person's shirt, using face recognition algorithms, and so forth. In another example, in one embodiment, the keywords may include a name of a book, and the search will output information related to the book, such as reviews, sales statistics, information regarding the author of the book, and so forth. In another example, in one embodiment, the keywords may include a name of a movie, and the search will output information related to the movie, such as reviews, box office statistics, information regarding the cast of the movie, show times, and so forth. In another example, in one embodiment, the keywords may include a name of a sport team, and the search will output information related to the sport team, such as statistics, latest results, future schedule, information regarding the players of the sport team, and so forth. For example, the name of the sport team may be obtained using audio recognition algorithms.

Camera-Based Directional Hearing Aid

As discussed previously, the disclosed embodiments may include providing feedback, such as acoustical and tactile feedback, to one or more auxiliary devices in response to processing at least one image in an environment. In some embodiments, the auxiliary device may be an earpiece or other device used to provide auditory feedback to the user, such as a hearing aid. Traditional hearing aids often use microphones to amplify sounds in the user's environment. These traditional systems, however, are often unable to distinguish between sounds that may be of particular importance to the wearer of the device, or may do so on a limited basis. Using the systems and methods of the disclosed embodiments, various improvements to traditional hearing aids are provided, as described in detail below.

In one embodiment, a camera-based directional hearing aid may be provided for selectively amplifying sounds based on a look direction of a user. The hearing aid may communicate with an image capturing device, such as apparatus 110, to determine the look direction of the user. This look direction may be used to isolate and/or selectively amplify sounds received from that direction (e.g., sounds from individuals in the user's look direction, etc.). Sounds received from directions other than the user's look direction may be suppressed, attenuated, filtered or the like.

Figure 17A:
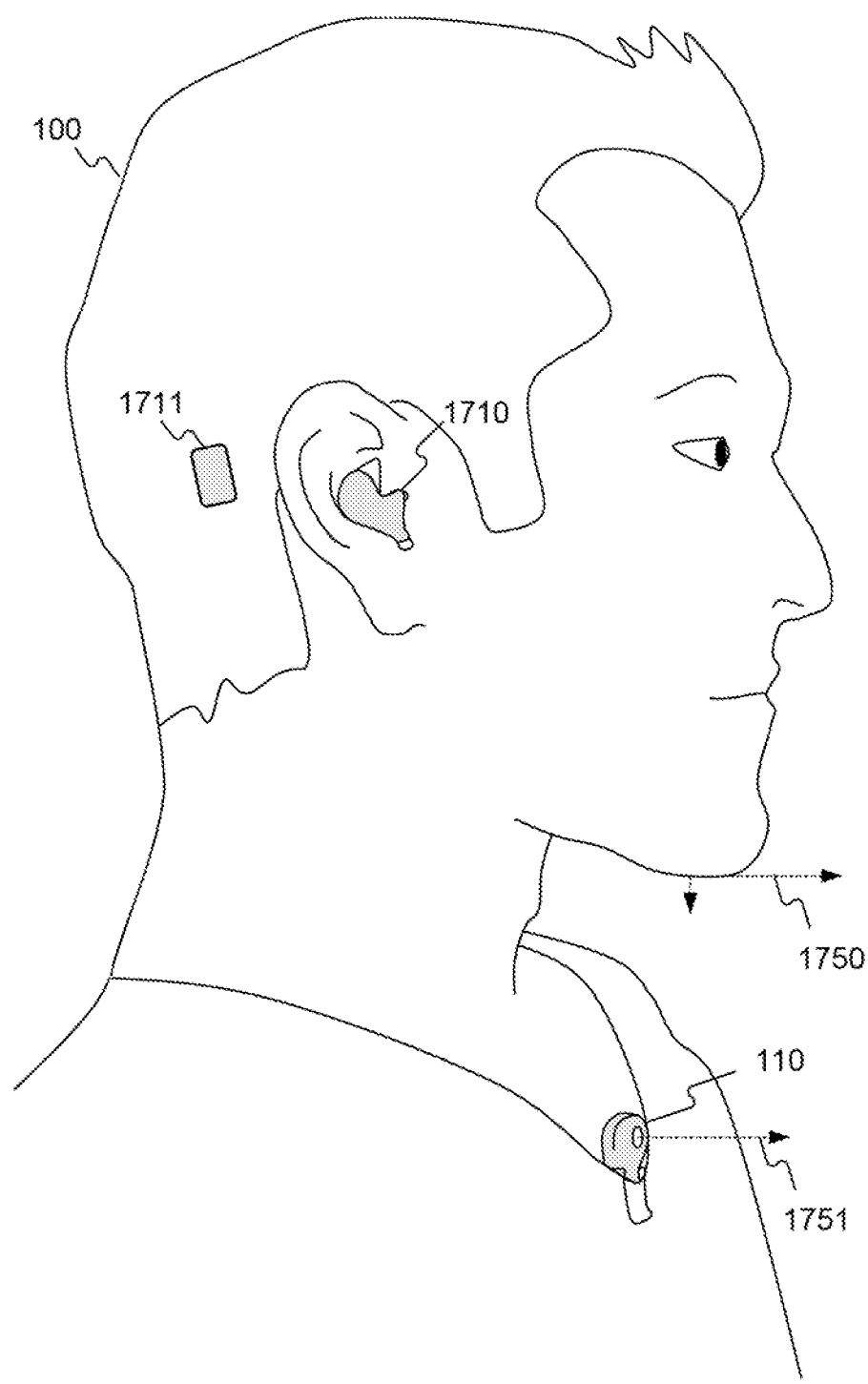
FIG. 17A is a schematic illustration of an example of a user wearing an apparatus for a camera-based hearing aid device according to a disclosed embodiment.

FIG. 17A is a schematic illustration of an example of a user 100 wearing an apparatus 110 for a camera-based hearing interface device 1710 according to a disclosed embodiment. User 100 may wear apparatus 110 that is physically connected to a shirt or other piece of clothing of user 100, as shown. Consistent with the disclosed embodiments, apparatus 110 may be positioned in other locations, as described previously. For example, apparatus 110 may be physically connected to a necklace, a belt, glasses, a wrist strap, a button, etc. Apparatus 110 may be configured to communicate with a hearing interface device such as hearing interface device 1710. Such communication may be through a wired connection, or may be made wirelessly (e.g., using a Bluetooth™, NFC, or forms of wireless communication). In some embodiments, one or more additional devices may also be included, such as computing device 120. Accordingly, one or more of the processes or functions described herein with respect to apparatus 110 or processor 210 may be performed by computing device 120 and/or processor 540.

Hearing interface device 1710 may be any device configured to provide audible feedback to user 100. Hearing interface device 1710 may correspond to feedback outputting unit 230, described above, and therefore any descriptions of feedback outputting unit 230 may also apply to hearing interface device 1710. In some embodiments, hearing interface device 1710 may be separate from feedback outputting unit 230 and may be configured to receive signals from feedback outputting unit 230. As shown in FIG. 17A, hearing interface device 1710 may be placed in one or both ears of user 100, similar to traditional hearing interface devices. Hearing interface device 1710 may be of various styles, including in-the-canal, completely-in-canal, in-the-ear, behind-the-ear, on-the-ear, receiver-in-canal, open fit, or various other styles. Hearing interface device 1710 may include one or more speakers for providing audible feedback to user 100, microphones for detecting sounds in the environment of user 100, internal electronics, processors, memories, etc. In some embodiments, in addition to or instead of a microphone, hearing interface device 1710 may comprise one or more communication units, and in particular one or more receivers for receiving signals from apparatus 110 and transferring the signals to user 100.

Hearing interface device 1710 may have various other configurations or placement locations. In some embodiments, hearing interface device 1710 may comprise a bone conduction headphone 1711, as shown in FIG. 17A. Bone conduction headphone 1711 may be surgically implanted and may provide audible feedback to user 100 through bone conduction of sound vibrations to the inner ear. Hearing interface device 1710 may also comprise one or more headphones (e.g., wireless headphones, over-ear headphones, etc.) or a portable speaker carried or worn by user 100. In some embodiments, hearing interface device 1710 may be integrated into other devices, such as a Bluetooth™ headset of the user, glasses, a helmet (e.g., motorcycle helmets, bicycle helmets, etc.), a hat, etc.

Apparatus 110 may be configured to determine a user look direction 1750 of user 100. In some embodiments, user look direction 1750 may be tracked by monitoring a direction of the chin, or another body part or face pan of user 100 relative to an optical axis of a camera sensor 1751. Apparatus 110 may be configured to capture one or more images of the surrounding environment of user, for example, using image sensor 220. The captured images may include a representation of a chin of user 100, which may be used to determine user look direction 1750. Processor 210 (and/or processors 210a and 210b) may be configured to analyze the captured images and detect the chin or another part of user 100 using various image detection or processing algorithms (e.g., using convolutional neural networks (CNN), scale-invariant feature transform (SIFT), histogram of oriented gradients (HOG) features, or other techniques). Based on the detected representation of a chin of user 100, look direction 1750 may be determined. Look direction 1750 may be determined in part by comparing the detected representation of a chin of user 100 to an optical axis of a camera sensor 1751. For example, the optical axis 1751 may be known or fixed in each image and processor 210 may determine look direction 1750 by comparing a representative angle of the chin of user 100 to the direction of optical axis 1751. While the process is described using a representation of a chin of user 100, various other features may be detected for determining user look direction 1750, including the user's face, nose, eyes, hand, etc.

In other embodiments, user look direction 1750 may be aligned more closely with the optical axis 1751. For example, as discussed above, apparatus 110 may be affixed to a pair of glasses of user 100, as shown in FIG. 1A. In this embodiment, user look direction 1750 may be the same as or close to the direction of optical axis 1751. Accordingly, user look direction 1750 may be determined or approximated based on the view of image sensor 220.

Figure 17B:
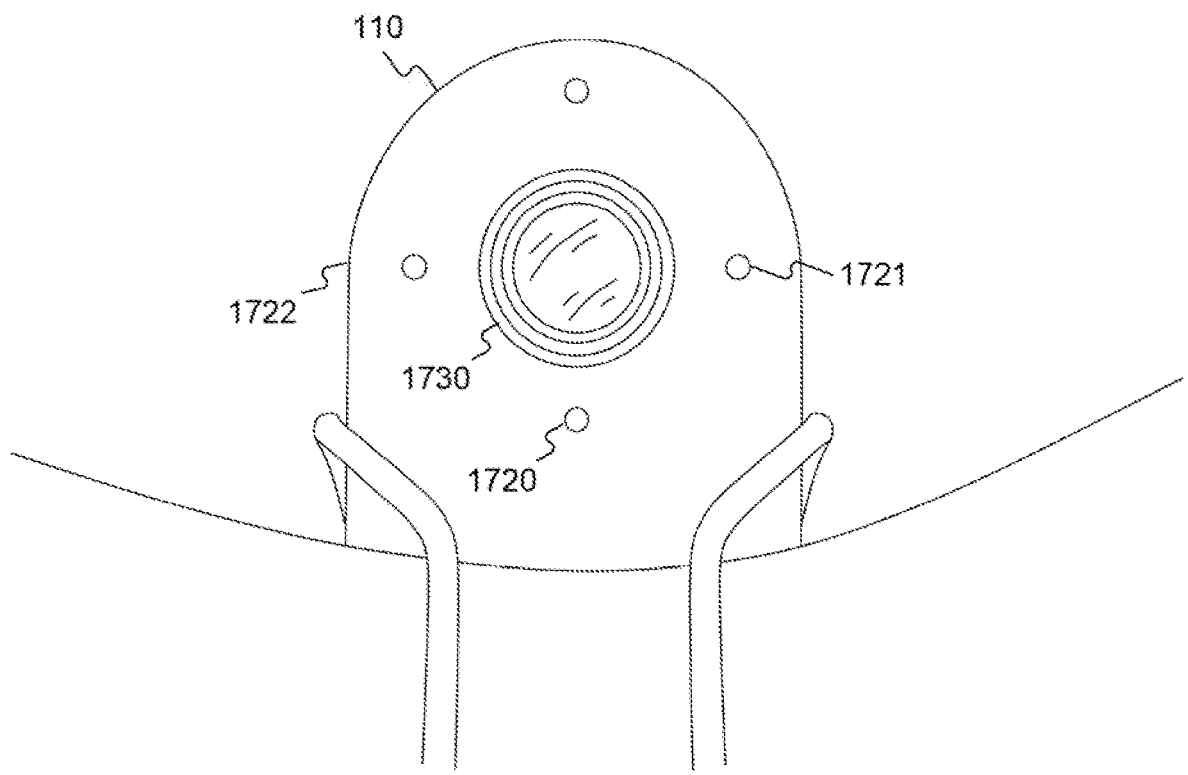
FIG. 17B is a schematic illustration of an embodiment of an apparatus securable to an article of clothing consistent with the present disclosure.

FIG. 17B is a schematic illustration of an embodiment of an apparatus securable to an article of clothing consistent with the present disclosure. Apparatus 110 may be securable to a piece of clothing, such as the shirt of user 110, as shown in FIG. 17A. Apparatus 110 may be securable to other articles of clothing, such as a belt or pants of user 100, as discussed above. Apparatus 110 may have one or more cameras 1730, which may correspond to image sensor 220. Camera 1730 may be configured to capture images of the surrounding environment of user 100. In some embodiments, camera 1730 may be configured to detect a representation of a chin of the user in the same images capturing the surrounding environment of the user, which may be used for other functions described in this disclosure. In other embodiments camera 1730 may be an auxiliary or separate camera dedicated to determining user look direction 1750.

Apparatus 110 may further comprise one or more microphones 1720 for capturing sounds from the environment of user 100. Microphone 1720 may also be configured to determine a directionality of sounds in the environment of user 100. For example, microphone 1720 may comprise one or more directional microphones, which may be more sensitive to picking up sounds in certain directions. For example, microphone 1720 may comprise a unidirectional microphone, designed to pick up sound from a single direction or small range of directions. Microphone 1720 may also comprise a cardioid microphone, which may be sensitive to sounds from the front and sides. Microphone 1720 may also include a microphone array, which may comprise additional microphones, such as microphone 1721 on the front of apparatus 110, or microphone 1722, placed on the side of apparatus 110. In some embodiments, microphone 1720 may be a multi-port microphone for capturing multiple audio signals. The microphones shown in FIG. 173 are by way of example only, and any suitable number, configuration, or location of microphones may be utilized. Processor 210 may be configured to distinguish sounds within the environment of user 100 and determine an approximate directionality of each sound. For example, using an array of microphones 1720, processor 210 may compare the relative timing or amplitude of an individual sound among the microphones 1720 to determine a directionality relative to apparatus 100.

As a preliminary step before other audio analysis operations, the sound captured from an environment of a user may be classified using any audio classification technique. For example, the sound may be classified into segments containing music, tones, laughter, screams, or the like. Indications of the respective segments may be logged in a database and may prove highly useful for life logging applications. As one example, the logged information may enable the system to to retrieve and/or determine a mood when the user met another person. Additionally, such processing is relatively fast and efficient, and does not require significant computing resources, and transmitting the information to a destination does not require significant bandwidth. Moreover, once certain parts of the audio are classified as non-speech, more computing resources may be available for processing the other segments.

Figure 18:
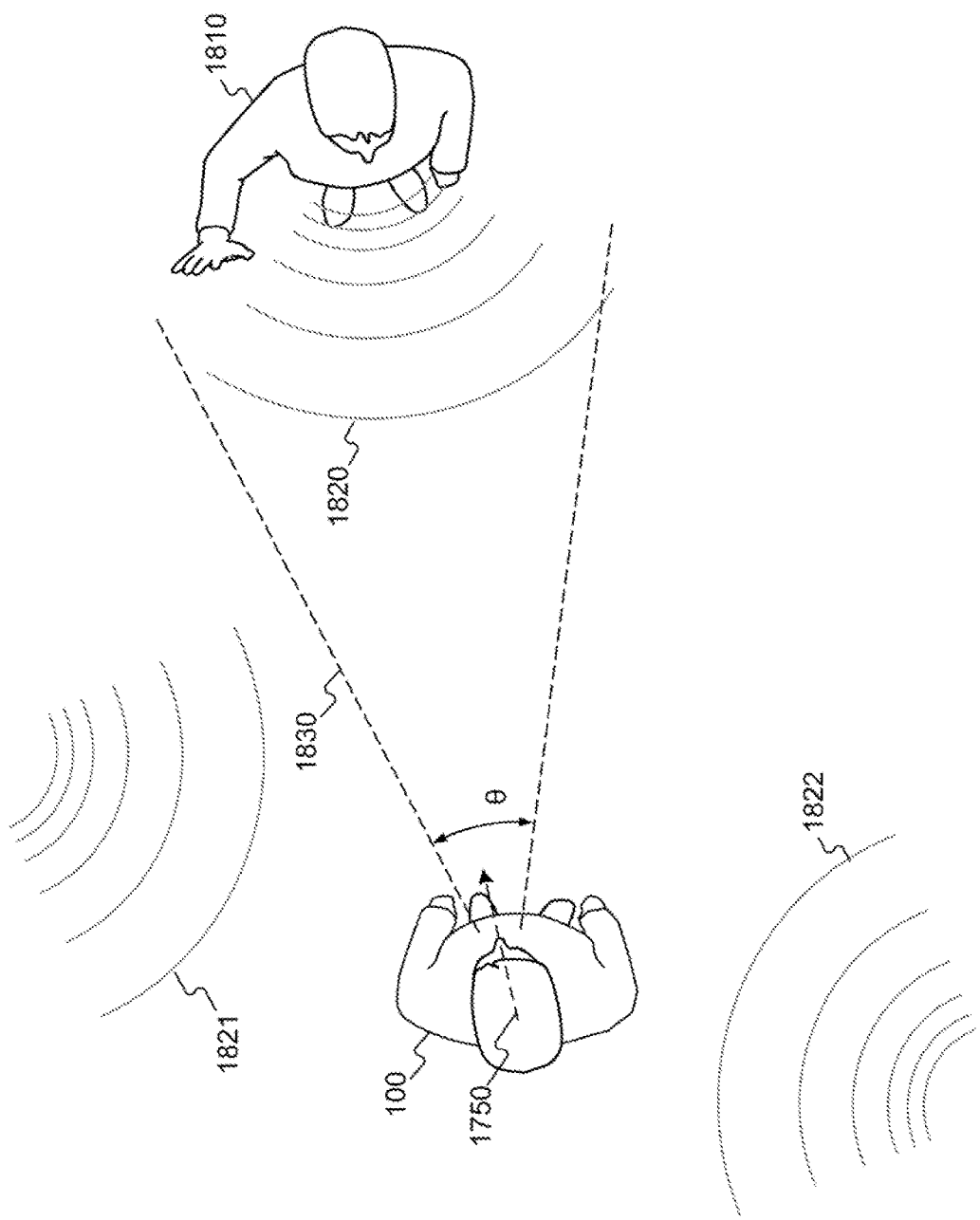
FIG. 18 is a schematic illustration showing an exemplary environment for use of a camera-based hearing aid consistent with the present disclosure.

Based on the determined user look direction 1750, processor 210 may selectively condition or amplify sounds from a region associated with user look direction 1750. FIG. 18 is a schematic illustration showing an exemplary environment for use of a camera-based hearing aid consistent with the present disclosure. Microphone 1720 may detect one or more sounds 1820, 1821, and 1822 within the environment of user 100. Based on user look direction 1750, determined by processor 210, a region 1830 associated with user look direction 1750 may be determined. As shown in FIG. 18, region 1830 may be defined by a cone or range of directions based on user look direction 1750. The range of angles may be defined by an angle, θ, as shown in FIG. 18. The angle, θ, may be any suitable angle for defining a range for conditioning sounds within the environment of user 100 (e.g., 10 degrees, 20 degrees, 45 degrees).

Processor 210 may be configured to cause selective conditioning of sounds in the environment of user 100 based on region 1830. The conditioned audio signal may be transmitted to hearing interface device 1710, and thus may provide user 100 with audible feedback corresponding to the look direction of the user. For example, processor 210 may determine that sound 1820 (which may correspond to the voice of an individual 1810, or to noise for example) is within region 1830. Processor 210 may then perform various conditioning techniques on the audio signals received from microphone 1720. The conditioning may include amplifying audio signals determined to correspond to sound 1820 relative to other audio signals. Amplification may be accomplished digitally, for example by processing audio signals associated with 1820 relative to other signals. Amplification may also be accomplished by changing one or more parameters of microphone 1720 to focus on audio sounds emanating from region 1830 (e.g., a region of interest) associated with user look direction 1750. For example, microphone 1720 may be a directional microphone that and processor 210 may perform an operation to focus microphone 1720 on sound 1820 or other sounds within region 1830. Various other techniques for amplifying sound 1820 may be used, such as using a beamforming microphone array, acoustic telescope techniques, etc.

Conditioning may also include attenuation or suppressing one or more audio signals received from directions outside of region 1830. For example, processor 1820 may attenuate sounds 1821 and 1822. Similar to amplification of sound 1820, attenuation of sounds may occur through processing audio signals, or by varying one or more parameters associated with one or more microphones 1720 to direct focus away from sounds emanating from outside of region 1830.

In some embodiments, conditioning may further include changing a tone of audio signals corresponding to sound 1820 to make sound 1820 more perceptible to user 100. For example, user 100 may have lesser sensitivity to tones in a certain range and conditioning of the audio signals may adjust the pitch of sound 1820 to make it more perceptible to user 100. For example, user 100 may experience hearing loss in frequencies above 10 khz. Accordingly, processor 210 may remap higher frequencies (e.g., at 15 khz) to 10 khz. In some embodiments processor 210 may be configured to change a rate of speech associated with one or more audio signals. Accordingly, processor 210 may be configured to detect speech within one or more audio signals received by microphone 1720, for example using voice activity detection (VAD) algorithms or techniques. If sound 1820 is determined to correspond to voice or speech, for example from individual 1810, processor 220 may be configured to vary the playback rate of sound 1820. For example, the rate of speech of individual 1810 may be decreased to make the detected speech more perceptible to user 100. Various other processing may be performed, such as modifying the tone of sound 1820 to maintain the same pitch as the original audio signal, or to reduce noise within the audio signal. If speech recognition has been performed on the audio signal associated with sound 1820, conditioning may further include modifying the audio signal based on the detected speech. For example, processor 210 may introduce pauses or increase the duration of pauses between words and/or sentences, which may make the speech easier to understand.

The conditioned audio signal may then be transmitted to hearing interface device 1710 and produced for user 100. Thus, in the conditioned audio signal, sound 1820 may be easier to hear to user 100, louder and/or more easily distinguishable than sounds 1821 and 1822, which may represent background noise within the environment.

Figure 19:
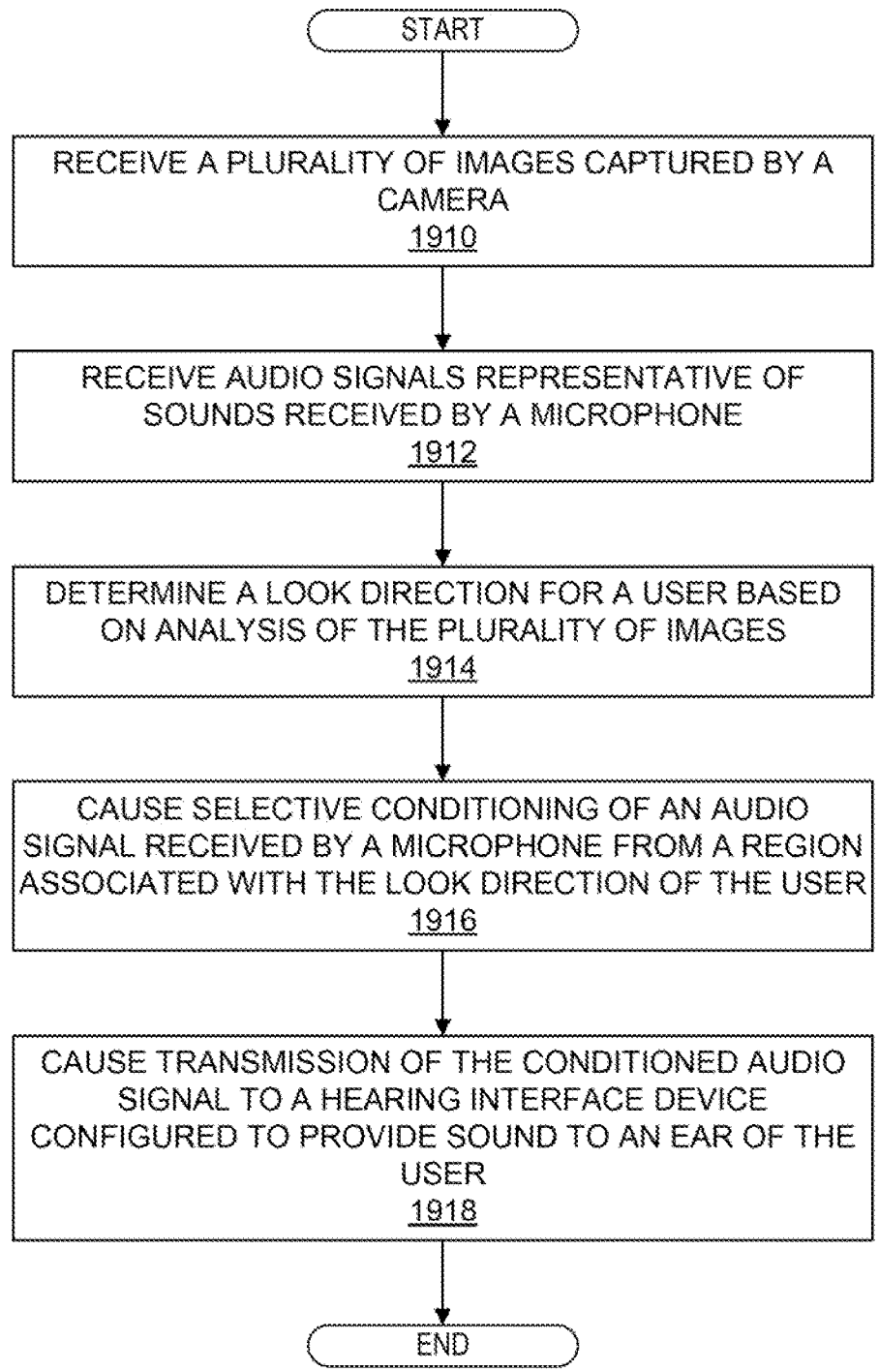
FIG. 19 is a flowchart showing an exemplary process for selectively amplifying sounds emanating from a detected look direction of a user consistent with disclosed embodiments.

FIG. 19 is a flowchart showing an exemplary process 1900 for selectively amplifying sounds emanating from a detected look direction of a user consistent with disclosed embodiments. Process 1900 may be performed by one or more processors associated with apparatus 110, such as processor 210. In some embodiments, some or all of process 1900 may be performed on processors external to apparatus 110. In other words, the processor performing process 1900 may be included in a common housing as microphone 1720 and camera 1730, or may be included in a second housing. For example, one or more portions of process 1900 may be performed by processors in hearing interface device 1710, or an auxiliary device, such as computing device 120.

In step 1910, process 1900 may include receiving a plurality of images from an environment of a user captured by a camera. The camera may be a wearable camera such as camera 1730 of apparatus 110. In step 1912, process 1900 may include receiving audio signals representative of sounds received by at least one microphone. The microphone may be configured to capture sounds from an environment of the user. For example, the microphone may be microphone 1720, as described above. Accordingly, the microphone may include a directional microphone, a microphone array, a multi-port microphone, or various other types of microphones. In some embodiments, the microphone and wearable camera may be included in a common housing, such as the housing of apparatus 110. The one or more processors performing process 1900 may also be included in the housing or may be included in a second housing. In such embodiments, the processor(s) may be configured to receive images and/or audio signals from the common housing via a wireless link (e.g., Bluetooth™, NFC, etc.). Accordingly, the common housing (e.g., apparatus 110) and the second housing (e.g., computing device 120) may further comprise transmitters or various other communication components.

In step 1914, process 1900 may include determining a look direction for the user based on analysis of at least one of the plurality of images. As discussed above, various techniques may be used to determine the user look direction. In some embodiments, the look direction may be determined based, at least in part, upon detection of a representation of a chin of a user in one or more images. The images may be processed to determine a pointing direction of the chin relative to an optical axis of the wearable camera, as discussed above.

In step 1916, process 1900 may include causing selective conditioning of at least one audio signal received by the at least one microphone from a region associated with the look direction of the user. As described above, the region may be determined based on the user look direction determined in step 1914. The range may be associated with an angular width about the look direction (e.g., 10 degrees, 20 degrees, 45 degrees, etc.). Various forms of conditioning may be performed on the audio signal, as discussed above. In some embodiments, conditioning may include changing the tone or playback speed of an audio signal. For example, conditioning may include changing a rate of speech associated with the audio signal. In some embodiments, the conditioning may include amplification of the audio signal relative to other audio signals received from outside of the region associated with the look direction of the user. Amplification may be performed by various means, such as operation of a directional microphone configured to focus on audio sounds emanating from the region, or varying one or more parameters associated with the microphone to cause the microphone to focus on audio sounds emanating from the region. The amplification may include attenuating or suppressing one or more audio signals received by the microphone from directions outside the region associated with the look direction of user 110.

In step 1918, process 1900 may include causing transmission of the at least one conditioned audio signal to a hearing interface device configured to provide sound to an ear of the user. The conditioned audio signal, for example, may be transmitted to hearing interface device 1710, which may provide sound corresponding to the audio signal to user 100. The processor performing process 1900 may further be configured to cause transmission to the hearing interface device of one or more audio signals representative of background noise, which may be attenuated relative to the at least one conditioned audio signal. For example, processor 220 may be configured to transmit audio signals corresponding to sounds 1820, 1821, and 1822. The signal associated with 1820, however, may be modified in a different manner, for example amplified, from sounds 1821 and 1822 based on a determination that sound 1820 is within region 1830. In some embodiments, hearing interface device 1710 may include a speaker associated with an earpiece. For example, hearing interface device may be inserted at least partially into the ear of the user for providing audio to the user. Hearing interface device may also be external to the ear, such as a behind-the-ear hearing device, one or more headphones, a small portable speaker, or the like. In some embodiments, hearing interface device may include a bone conduction microphone, configured to provide an audio signal to user through vibrations of a bone of the user's head. Such devices may be placed in contact with the exterior of the user's skin, or may be implanted surgically and attached to the bone of the user.

Hearing Aid with Voice and/or Image Recognition

Consistent with the disclosed embodiments, a hearing aid may selectively amplify audio signals associated with a voice of a recognized individual. The hearing aid system may store voice characteristics and/or facial features of a recognized person to aid in recognition and selective amplification. For example, when an individual enters the field of view of apparatus 110, the individual may be recognized as an individual that has been introduced to the device, or that has possibly interacted with user 100 in the past (e.g., a friend, colleague, relative, prior acquaintance, etc.). Accordingly, audio signals associated with the recognized individual's voice may be isolated and/or selectively amplified relative to other sounds in the environment of the user. Audio signals associated with sounds received from directions other than the individual's direction may be suppressed, attenuated, filtered or the like.

User 100 may wear a hearing aid device similar to the camera-based hearing aid device discussed above. For example, the hearing aid device may be hearing interface device 1720, as shown in FIG. 17A. Hearing interface device 1710 may be any device configured to provide audible feedback to user 100. Hearing interface device 1710 may be placed in one or both ears of user 100, similar to traditional hearing interface devices. As discussed above, hearing interface device 1710 may be of various styles, including in-the-canal, completely-in-canal, in-the-ear, behind-the-ear, on-the-ear, receiver-in-canal, open fit, or various other styles. Hearing interface device 1710 may include one or more speakers for providing audible feedback to user 100, a communication unit for receiving signals from another system, such as apparatus 110, microphones for detecting sounds in the environment of user 100, internal electronics, processors, memories, etc. Hearing interface device 1710 may correspond to feedback outputting unit 230 or may be separate from feedback outputting unit 230 and may be configured to receive signals from feedback outputting unit 230.

In some embodiments, hearing interface device 1710 may comprise a bone conduction headphone 1711, as shown in FIG. 17A. Bone conduction headphone 1711 may be surgically implanted and may provide audible feedback to user 100 through bone conduction of sound vibrations to the inner ear. Hearing interface device 1710 may also comprise one or more headphones (e.g., wireless headphones, over-ear headphones, etc.) or a portable speaker carried or worn by user 100. In some embodiments, hearing interface device 1710 may be integrated into other devices, such as a Bluetooth™ headset of the user, glasses, a helmet (e.g., motorcycle helmets, bicycle helmets, etc.), a hat, etc.

Hearing interface device 1710 may be configured to communicate with a camera device, such as apparatus 110. Such communication may be through a wired connection, or may be made wirelessly (e.g., using a Bluetooth™, NFC, or forms of wireless communication). As discussed above, apparatus 110 may be worn by user 100 in various configurations, including being physically connected to a shirt, necklace, a belt, glasses, a wrist strap, a button, or other articles associated with user 100. In some embodiments, one or more additional devices may also be included, such as computing device 120. Accordingly, one or more of the processes or functions described herein with respect to apparatus 110 or processor 210 may be performed by computing device 120 and/or processor 540.

As discussed above, apparatus 110 may comprise at least one microphone and at least one image capture device. Apparatus 110 may comprise microphone 1720, as described with respect to FIG. 17B. Microphone 1720 may be configured to determine a directionality of sounds in the environment of user 100. For example, microphone 1720 may comprise one or more directional microphones, a microphone array, a multi-port microphone, or the like. The microphones shown in FIG. 17B are by way of example only, and any suitable number, configuration, or location of microphones may be utilized. Processor 210 may be configured to distinguish sounds within the environment of user 100 and determine an approximate directionality of each sound. For example, using an array of microphones 1720, processor 210 may compare the relative timing or amplitude of an individual sound among the microphones 1720 to determine a directionality relative to apparatus 100. Apparatus 110 may comprise one or more cameras, such as camera 1730, which may correspond to image sensor 220. Camera 1730 may be configured to capture images of the surrounding environment of user 100.

Figure 20A:
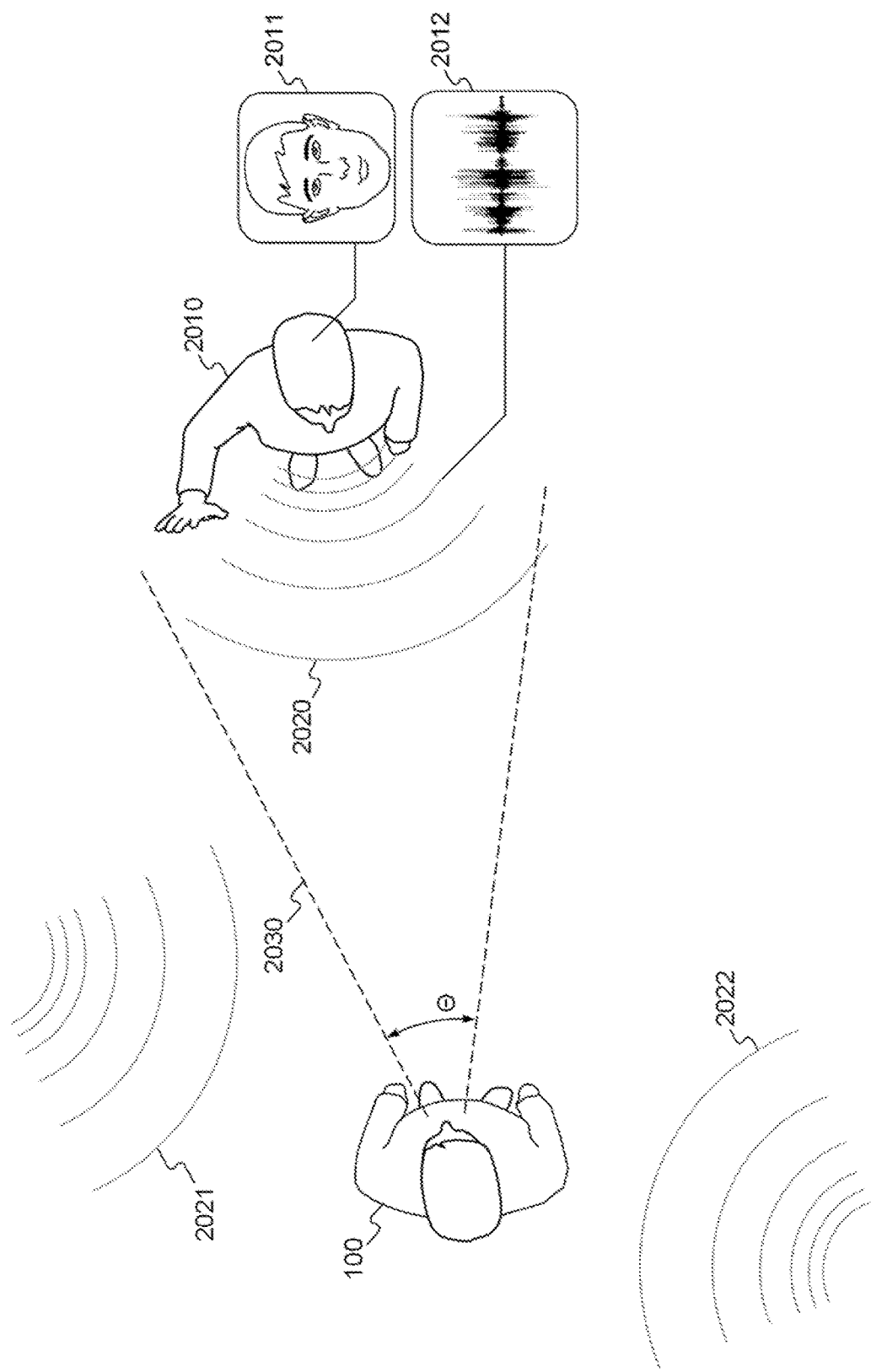
FIG. 20A is a schematic illustration showing an exemplary environment for use of a hearing aid with voice and/or image recognition consistent with the present disclosure.

Apparatus 110 may be configured to recognize an individual in the environment of user 100. FIG. 20A is a schematic illustration showing an exemplary environment for use of a hearing aid with voice and/or image recognition consistent with the present disclosure. Apparatus 110 may be configured to recognize a face 2011 or voice 2012 associated with an individual 2010 within the environment of user 100. For example, apparatus 110 may be configured to capture one or more images of the surrounding environment of user 100 using camera 1730. The captured images may include a representation of a recognized individual 2010, which may be a friend, colleague, relative, or prior acquaintance of user 100. Processor 210 (and/or processors 210a and 210b) may be configured to analyze the captured images and detect the recognized user using various facial recognition techniques, as represented by element 2011. Accordingly, apparatus 110, or specifically memory 550, may comprise one or more facial or voice recognition components.

Figure 20B:
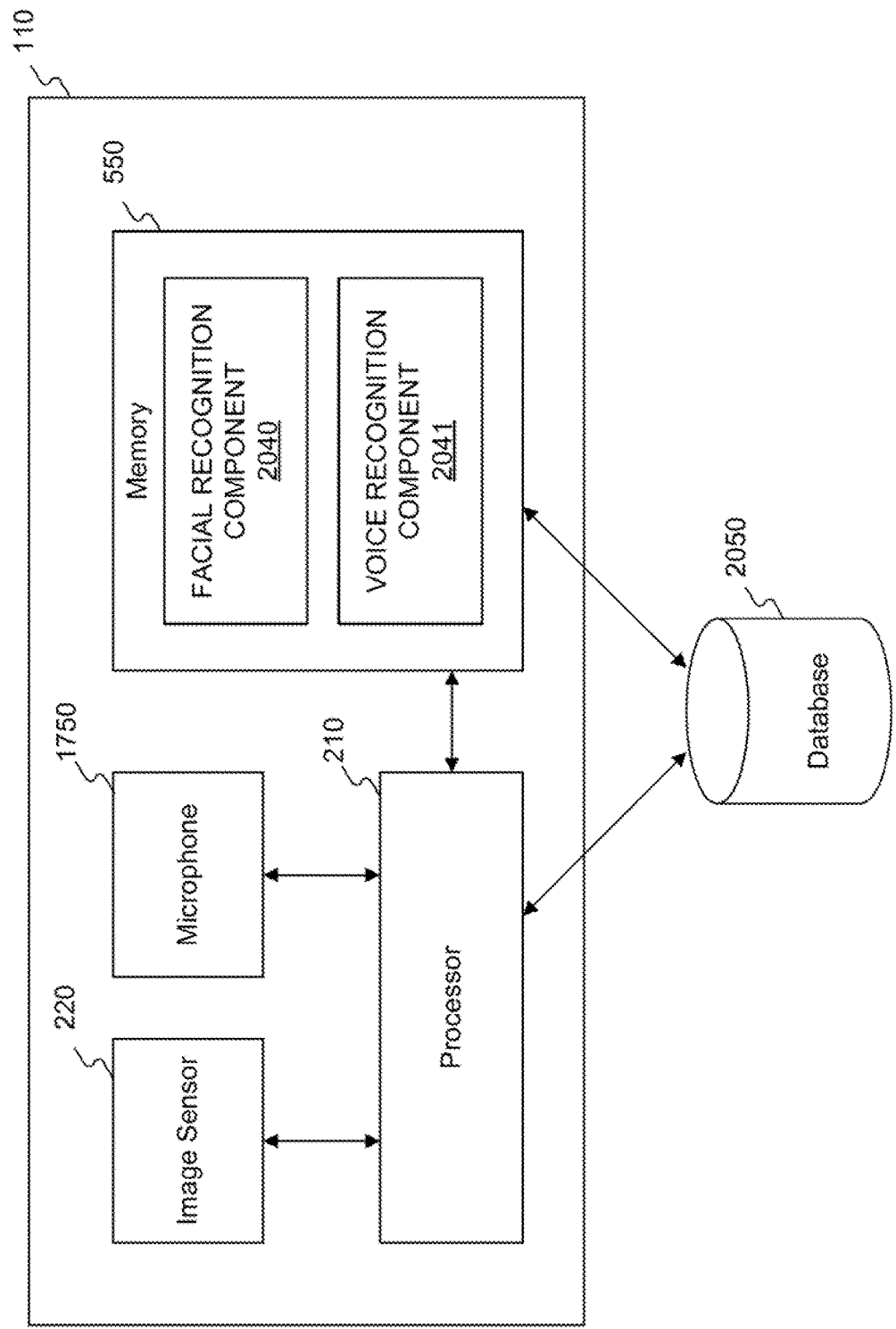
FIG. 20B illustrates an exemplary embodiment of an apparatus comprising facial and voice recognition components consistent with the present disclosure.

FIG. 20B illustrates an exemplary embodiment of apparatus 110 comprising facial and voice recognition components consistent with the present disclosure. Apparatus 110 is shown in FIG. 20B in a simplified form, and apparatus 110 may contain additional elements or may have alternative configurations, for example, as shown in FIGS. 5A-5C. Memory 550 (or 550a or 550b) may include facial recognition component 2040 and voice recognition component 2041. These components may be instead of or in addition to orientation identification module 601, orientation adjustment module 602, and motion tracking module 603 as shown in FIG. 6. Components 2040 and 2041 may contain software instructions for execution by at least one processing device, e.g., processor 210, included with a wearable apparatus. Components 2040 and 2041 are shown within memory 550 by way of example only, and may be located in other locations within the system. For example, components 2040 and 2041 may be located in hearing interface device 1710, in computing device 120, on a remote server, or in another associated device.

Facial recognition component 2040 may be configured to identify one or more faces within the environment of user 100. For example, facial recognition component 2040 may identify facial features on the face 2011 of individual 2010, such as the eyes, nose, cheekbones, jaw, or other features. Facial recognition component 2040 may then analyze the relative size and position of these features to identify the user. Facial recognition component 2040 may utilize one or more algorithms for analyzing the detected features, such as principal component analysis (e.g., using eigenfaces), linear discriminant analysis, elastic bunch graph matching (e.g., using Fisherface), Local Binary Patterns Histograms (LBPH), Scale Invariant Feature Transform (SIFT), Speed Up Robust Features (SURF), or the like. Other facial recognition techniques such as 3-Dimensional recognition, skin texture analysis, and/or thermal imaging may also be used to identify individuals. Other features besides facial features may also be used for identification, such as the height, body shape, or other distinguishing features of individual 2010.

Facial recognition component 2040 may access a database or data associated with user 100 to determine if the detected facial features correspond to a recognized individual. For example, a processor 210 may access a database 2050 containing information about individuals known to user 100 and data representing associated facial features or other identifying features. Such data may include one or more images of the individuals, or data representative of a face of the user that may be used for identification through facial recognition. Database 2050 may be any device capable of storing information about one or more individuals, and may include a hard drive, a solid state drive, a web storage platform, a remote server, or the like. Database 2050 may be located within apparatus 110 (e.g., within memory 550) or external to apparatus 110, as shown in FIG. 20B. In some embodiments, database 2050 may be associated with a social network platform, such as Facebook™, LinkedIn™, Instagram™, etc. Facial recognition component 2040 may also access a contact list of user 100, such as a contact list on the user's phone, a web-based contact list (e.g., through Outlook™, Skype™, Google™, SalesForce™, etc.) or a dedicated contact list associated with hearing interface device 1710. In some embodiments, database 2050 may be compiled by apparatus 110 through previous facial recognition analysis. For example, processor 210 may be configured to store data associated with one or more faces recognized in images captured by apparatus 110 in database 2050. Each time a face is detected in the images, the detected facial features or other data may be compared to previously identified faces in database 2050. Facial recognition component 2040 may determine that an individual is a recognized individual of user 100 if the individual has previously been recognized by the system in a number of instances exceeding a certain threshold, if the individual has been explicitly introduced to apparatus 110, or the like.

In some embodiments, user 100 may have access to database 2050, such as through a web interface, an application on a mobile device, or through apparatus 110 or an associated device. For example, user 100 may be able to select which contacts are recognizable by apparatus 110 and/or delete or add certain contacts manually. In some embodiments, a user or administrator may be able to train facial recognition component 2040. For example, user 100 may have an option to confirm or reject identifications made by facial recognition component 2040, which may improve the accuracy of the system. This training may occur in real time, as individual 2010 is being recognized, or at some later time.

Other data or information may also inform the facial identification process. In some embodiments, processor 210 may use various techniques to recognize the voice of individual 2010, as described in further detail below. The recognized voice pattern and the detected facial features may be used, either alone or in combination, to determine that individual 2010 is recognized by apparatus 110. Processor 210 may also determine a user look direction 1750, as described above, which may be used to verify the identity of individual 2010. For example, if user 100 is looking in the direction of individual 2010 (especially for a prolonged period), this may indicate that individual 2010 is recognized by user 100, which may be used to increase the confidence of facial recognition component 2040 or other identification means.

Processor 210 may further be configured to determine whether individual 2010 is recognized by user 100 based on one or more detected audio characteristics of sounds associated with a voice of individual 2010. Returning to FIG. 20A, processor 210 may determine that sound 2020 corresponds to voice 2012 of user 2010. Processor 210 may analyze audio signals representative of sound 2020 captured by microphone 1720 to determine whether individual 2010 is recognized by user 100. This may be performed using voice recognition component 2041 (FIG. 20I) and may include one or more voice recognition algorithms, such as Hidden Markov Models, Dynamic Time Warping, neural networks, or other techniques. Voice recognition component and/or processor 210 may access database 2050, which may further include a voiceprint of one or more individuals. Voice recognition component 2041 may analyze the audio signal representative of sound 2020 to determine whether voice 2012 matches a voiceprint of an individual in database 2050. Accordingly, database 2050 may contain voiceprint data associated with a number of individuals, similar to the stored facial identification data described above. After determining a match, individual 2010 may be determined to be a recognized individual of user 100. This process may be used alone, or in conjunction with the facial recognition techniques described above. For example, individual 2010 may be recognized using facial recognition component 2040 and may be verified using voice recognition component 2041, or vice versa.

In some embodiments, apparatus 110 may detect the voice of an individual that is not within the field of view of apparatus 110. For example, the voice may be heard over a speakerphone, from a back seat, or the like. In such embodiments, recognition of an individual may be based on the voice of the individual only, in the absence of a speaker in the field of view. Processor 110 may analyze the voice of the individual as described above, for example, by determining whether the detected voice matches a voiceprint of an individual in database 2050.

After determining that individual 2010 is a recognized individual of user 100, processor 210 may cause selective conditioning of audio associated with the recognized individual. The conditioned audio signal may be transmitted to hearing interface device 1710, and thus may provide user 100 with audio conditioned based on the recognized individual. For example, the conditioning may include amplifying audio signals determined to correspond to sound 2020 (which may correspond to voice 2012 of individual 2010) relative to other audio signals. In some embodiments, amplification may be accomplished digitally, for example by processing audio signals associated with sound 2020 relative to other signals. Additionally, or alternatively, amplification may be accomplished by changing one or more parameters of microphone 1720 to focus on audio sounds associated with individual 2010. For example, microphone 1720 may be a directional microphone and processor 210 may perform an operation to focus microphone 1720 on sound 2020. Various other techniques for amplifying sound 2020 may be used, such as using a beamforming microphone array, acoustic telescope techniques, etc.

In some embodiments, selective conditioning may include attenuation or suppressing one or more audio signals received from directions not associated with individual 2010. For example, processor 210 may attenuate sounds 2021 and/or 2022. Similar to amplification of sound 2020, attenuation of sounds may occur through processing audio signals, or by varying one or more parameters associated with microphone 1720 to direct focus away from sounds not associated with individual 2010.

Selective conditioning may further include determining whether individual 2010 is speaking. For example, processor 210 may be configured to analyze images or videos containing representations of individual 2010 to determine when individual 2010 is speaking, for example, based on detected movement of the recognized individual's lips. This may also be determined through analysis of audio signals received by microphone 1720, for example by detecting the voice 2012 of individual 2010. In some embodiments, the selective conditioning may occur dynamically (initiated and/or terminated) based on whether or not the recognized individual is speaking.

In some embodiments, conditioning may further include changing a tone of one or more audio signals corresponding to sound 2020 to make the sound more perceptible to user 100. For example, user 100 may have lesser sensitivity to tones in a certain range and conditioning of the audio signals may adjust the pitch of sound 2020. In some embodiments processor 210 may be configured to change a rate of speech associated with one or more audio signals. For example, sound 2020 may be determined to correspond to voice 2012 of individual 2010. Processor 210 may be configured to vary the rate of speech of individual 2010 to make the detected speech more perceptible to user 100. Various other processing may be performed, such as modifying the tone of sound 2020 to maintain the same pitch as the original audio signal, or to reduce noise within the audio signal.

In some embodiments, processor 210 may determine a region 2030 associated with individual 2010. Region 2030 may be associated with a direction of individual 2010 relative to apparatus 110 or user 100. The direction of individual 2010 may be determined using camera 1730 and/or microphone 1720 using the methods described above. As shown in FIG. 20A, region 2030 may be defined by a cone or range of directions based on a determined direction of individual 2010. The range of angles may be defined by an angle, θ, as shown in FIG. 20A. The angle, θ, may be any suitable angle for defining a range for conditioning sounds within the environment of user 100 (e.g., 10 degrees, 20 degrees, 45 degrees). Region 2030 may be dynamically calculated as the position of individual 2010 changes relative to apparatus 110. For example, as user 100 turns, or if individual 1020 moves within the environment, processor 210 may be configured to track individual 2010 within the environment and dynamically update region 2030. Region 2030 may be used for selective conditioning, for example by amplifying sounds associated with region 2030 and/or attenuating sounds determined to be emanating from outside of region 2030.

The conditioned audio signal may then be transmitted to hearing interface device 1710 and produced for user 100. Thus, in the conditioned audio signal, sound 2020 (and specifically voice 2012) may be louder and/or more easily distinguishable than sounds 2021 and 2022, which may represent background noise within the environment.

In some embodiments, processor 210 may perform further analysis based on captured images or videos to determine how to selectively condition audio signals associated with a recognized individual. In some embodiments, processor 210 may analyze the captured images to selectively condition audio associated with one individual relative to others. For example, processor 210 may determine the direction of a recognized individual relative to the user based on the images and may determine how to selectively condition audio signals associated with the individual based on the direction. If the recognized individual is standing to the front of the user, audio associated with that user may be amplified (or otherwise selectively conditioned) relative to audio associated with an individual standing to the side of the user. Similarly, processor 210 may selectively condition audio signals associated with an individual based on proximity to the user. Processor 210 may determine a distance from the user to each individual based on captured images and may selectively condition audio signals associated with the individuals based on the distance. For example, an individual closer to the user may be prioritized higher than an individual that is farther away.

In some embodiments, selective conditioning of audio signals associated with a recognized individual may be based on the identities of individuals within the environment of the user. For example, where multiple individuals are detected in the images, processor 210 may use one or more facial recognition techniques to identify the individuals, as described above. Audio signals associated with individuals that are known to user 100 may be selectively amplified or otherwise conditioned to have priority over unknown individuals. For example, processor 210 may be configured to attenuate or silence audio signals associated with bystanders in the user's environment, such as a noisy office mate, etc. In some embodiments, processor 210 may also determine a hierarchy of individuals and give priority based on the relative status of the individuals. This hierarchy may be based on the individual's position within a family or an organization (e.g., a company, sports team, club, etc.) relative to the user. For example, the user's boss may be ranked higher than a co-worker or a member of the maintenance staff and thus may have priority in the selective conditioning process. In some embodiments, the hierarchy may be determined based on a list or database. Individuals recognized by the system may be ranked individually or grouped into tiers of priority. This database may be maintained specifically for this purpose, or may be accessed externally. For example, the database may be associated with a social network of the user (e.g., Facebook™, LinkedIn™, etc.) and individuals may be prioritized based on their grouping or relationship with the user. Individuals identified as "close friends" or family, for example, may be prioritized over acquaintances of the user.

Selective conditioning may be based on a determined behavior of one or more individuals determined based on the captured images. In some embodiments, processor 210 may be configured to determine a look direction of the individuals in the images. Accordingly, the selective conditioning may be based on behavior of the other individuals towards the recognized individual. For example, processor 210 may selectively condition audio associated with a first individual that one or more other users are looking at. If the attention of the individuals shifts to a second individual, processor 210 may then switch to selectively condition audio associated with the second user. In some embodiments, processor 210 may be configured to selectively condition audio based on whether a recognized individual is speaking to the user or to another individual. For example, when the recognized individual is speaking to the user, the selective conditioning may include amplifying an audio signal associated with the recognized individual relative to other audio signals received from directions outside a region associated with the recognized individual. When the recognized individual is speaking to another individual, the selective conditioning may include attenuating the audio signal relative to other audio signals received from directions outside the region associated with the recognized individual.

In some embodiments, processor 210 may have access to one or more voiceprints of individuals, which may facilitate selective conditioning of voice 2012 of individual 2010 in relation to other sounds or voices. Having a speaker's voiceprint, and a high quality voiceprint in particular, may provide for fast and efficient speaker separation. A high quality voice print may be collected, for example, when the user speaks alone, preferably in a quiet environment. By having a voiceprint of one or more speakers, it is possible to separate an ongoing voice signal almost in real time, e.g. with a minimal delay, using a sliding time window. The delay may be, for example 10 ms, 20 ms, 30 ms, 50 ms, 100 ms, or the like. Different time windows may be selected, depending on the quality of the voice print, on the quality of the captured audio, the difference in characteristics between the speaker and other speaker(s), the available processing resources, the required separation quality, or the like. In some embodiments, a voice print may be extracted from a segment of a conversation in which an individual speaks alone, and then used for separating the individual's voice later in the conversation, whether the individual's is recognized or not.

Separating voices may be performed as follows: spectral features, also referred to as spectral attributes, spectral envelope, or spectrogram may be extracted from a clean audio of a single speaker and fed into a pre-trained first neural network, which generates or updates a signature of the speaker's voice based on the extracted features. The audio may be for example, of one second of clean voice. The output signature may be a vector representing the speaker's voice, such that the distance between the vector and another vector extracted from the voice of the same speaker is typically smaller than the distance between the vector and a vector extracted from the voice of another speaker. The speaker's model may be pre-generated from a captured audio. Alternatively or additionally, the model may be generated after a segment of the audio in which only the speaker speaks, followed by another segment in which the speaker and another speaker (or background noise) is heard, and which it is required to separate.

Then, to separate the speaker's voice from additional speakers or background noise in a noisy audio, a second pre-trained neural network may receive the noisy audio and the speaker's signature, and output an audio (which may also be represented as attributes) of the voice of the speaker as extracted from the noisy audio, separated from the other speech or background noise. It will be appreciated that the same or additional neural networks may be used to separate the voices of multiple speakers. For example, if there are two possible speakers, two neural networks may be activated, each with models of the same noisy output and one of the two speakers. Alternatively, a neural network may receive voice signatures of two or more speakers, and output the voice of each of the speakers separately. Accordingly, the system may generate two or more different audio outputs, each comprising the speech of the respective speaker. In some embodiments, if separation is impossible, the input voice may only be cleaned from background noise.

Figure 21:
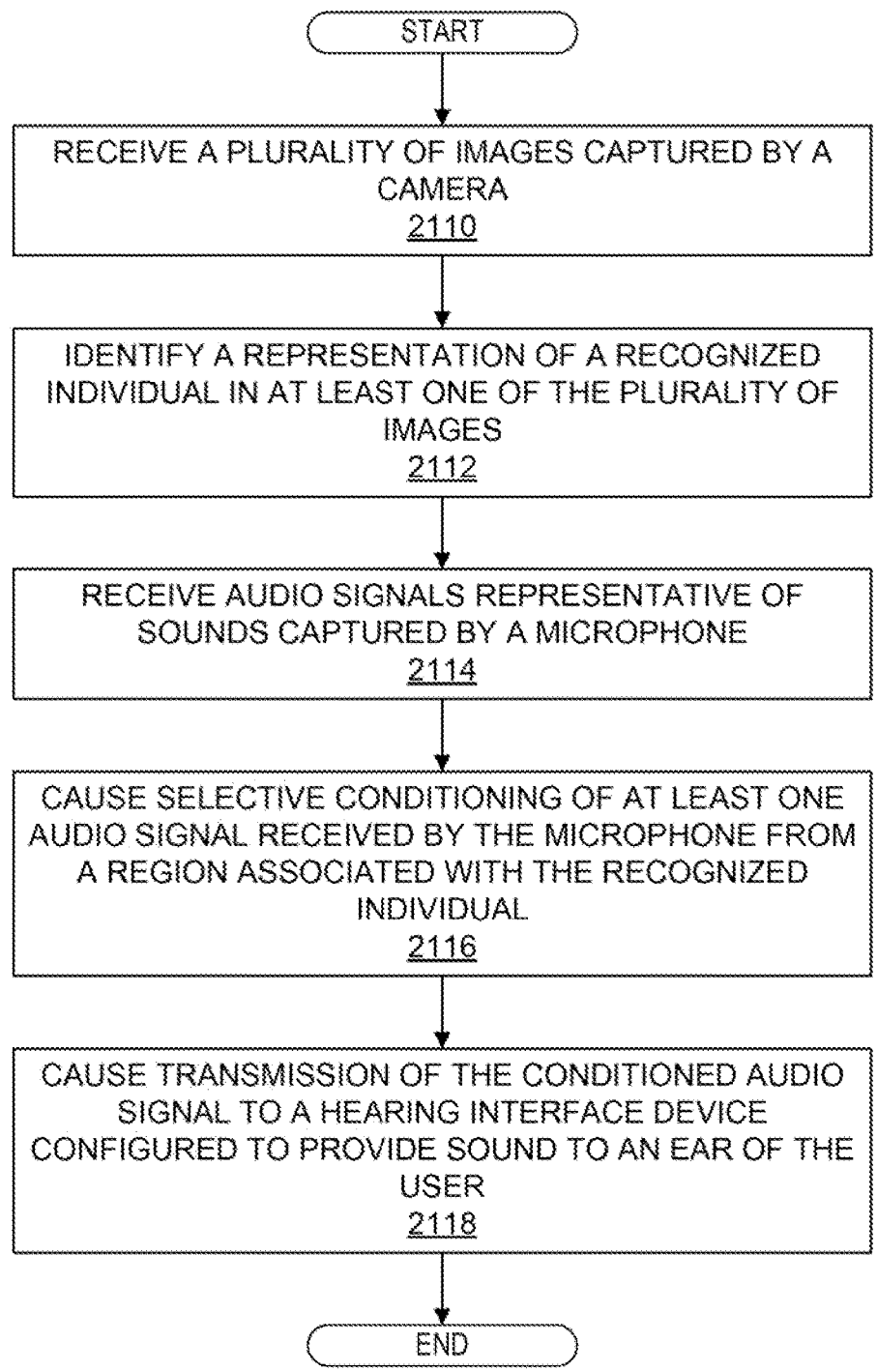
FIG. 21 is a flowchart showing an exemplary process for selectively amplifying audio signals associated with a voice of a recognized individual consistent with disclosed embodiments.

FIG. 21 is a flowchart showing an exemplary process 2100 for selectively amplifying audio signals associated with a voice of a recognized individual consistent with disclosed embodiments. Process 2100 may be performed by one or more processors associated with apparatus 110, such as processor 210. In some embodiments, some or all of process 2100 may be performed on processors external to apparatus 110. In other words, the processor performing process 2100 may be included in the same common housing as microphone 1720 and camera 1730, or may be included in a second housing. For example, one or more portions of process 2100 may be performed by processors in hearing interface device 1710, or in an auxiliary device, such as computing device 120.

In step 2110, process 2100 may include receiving a plurality of images from an environment of a user captured by a camera. The images may be captured by a wearable camera such as camera 1730 of apparatus 110. In step 2112, process 2100 may include identifying a representation of a recognized individual in at least one of the plurality of images. Individual 2010 may be recognized by processor 210 using facial recognition component 2040, as described above. For example, individual 2010 may be a friend, colleague, relative, or prior acquaintance of the user. Processor 210 may determine whether an individual represented in at least one of the plurality of images is a recognized individual based on one or more detected facial features associated with the individual. Processor 210 may also determine whether the individual is recognized based on one or more detected audio characteristics of sounds determined to be associated with a voice of the individual, as described above.

In step 2114, process 2100 may include receiving audio signals representative of sounds captured by a microphone. For example, apparatus 110 may receive audio signals representative of sounds 2020, 2021, and 2022, captured by microphone 1720. Accordingly, the microphone may include a directional microphone, a microphone array, a multi-port microphone, or various other types of microphones, as described above. In some embodiments, the microphone and wearable camera may be included in a common housing, such as the housing of apparatus 110. The one or more processors performing process 2100 may also be included in the housing (e.g., processor 210), or may be included in a second housing. Where a second housing is used, the processor(s) may be configured to receive images and/or audio signals from the common housing via a wireless link (e.g., Bluetooth™, NFC, etc.). Accordingly, the common housing (e.g., apparatus 110) and the second housing (e.g., computing device 120) may further comprise transmitters, receivers, and/or various other communication components.

In step 2116, process 2100 may include cause selective conditioning of at least one audio signal received by the at least one microphone from a region associated with the at least one recognized individual. As described above, the region may be determined based on a determined direction of the recognized individual based one or more of the plurality of images or audio signals. The range may be associated with an angular width about the direction of the recognized individual (e.g., 10 degrees, 20 degrees, 45 degrees, etc.).

Various forms of conditioning may be performed on the audio signal, as discussed above. In some embodiments, conditioning may include changing the tone or playback speed of an audio signal. For example, conditioning may include changing a rate of speech associated with the audio signal. In some embodiments, the conditioning may include amplification of the audio signal relative to other audio signals received from outside of the region associated with the recognized individual. Amplification may be performed by various means, such as operation of a directional microphone configured to focus on audio sounds emanating from the region or varying one or more parameters associated with the microphone to cause the microphone to focus on audio sounds emanating from the region. The amplification may include attenuating or suppressing one or more audio signals received by the microphone from directions outside the region. In some embodiments, step 2116 may further comprise determining, based on analysis of the plurality of images, that the recognized individual is speaking and trigger the selective conditioning based on the determination that the recognized individual is speaking. For example, the determination that the recognized individual is speaking may be based on detected movement of the recognized individual's lips. In some embodiments, selective conditioning may be based on further analysis of the captured images as described above, for example, based on the direction or proximity of the recognized individual, the identity of the recognized individual, the behavior of other individuals, etc.

In step 2118, process 2100 may include causing transmission of the at least one conditioned audio signal to a hearing interface device configured to provide sound to an ear of the user. The conditioned audio signal, for example, may be transmitted to hearing interface device 1710, which may provide sound corresponding to the audio signal to user 100. The processor performing process 2100 may further be configured to cause transmission to the hearing interface device of one or more audio signals representative of background noise, which may be attenuated relative to the at least one conditioned audio signal. For example, processor 210 may be configured to transmit audio signals corresponding to sounds 2020, 2021, and 2022. The signal associated with 2020, however, may be amplified in relation to sounds 2021 and 2022 based on a determination that sound 2020 is within region 2030. In some embodiments, hearing interface device 1710 may include a speaker associated with an earpiece. For example, hearing interface device 1710 may be inserted at least partially into the ear of the user for providing audio to the user. Hearing interface device may also be external to the ear, such as a behind-the-ear hearing device, one or more headphones, a small portable speaker, or the like. In some embodiments, hearing interface device may include a bone conduction microphone, configured to provide an audio signal to user through vibrations of a bone of the user's head. Such devices may be placed in contact with the exterior of the user's skin, or may be implanted surgically and attached to the bone of the user.

In addition to recognizing voices of individuals speaking to user 100, the systems and methods described above may also be used to recognize the voice of user 100. For example, voice recognition unit 2041 may be configured to analyze audio signals representative of sounds collected from the user's environment to recognize the voice of user 100. Similar to the selective conditioning of the voice of recognized individuals, the voice of user 100 may be selectively conditioned. For example, sounds may be collected by microphone 1720, or by a microphone of another device, such as a mobile phone (or a device linked to a mobile phone). Audio signals corresponding to the voice of user 100 may be selectively transmitted to a remote device, for example, by amplifying the voice of user 100 and/or attenuating or eliminating altogether sounds other than the user's voice. Accordingly, a voiceprint of one or more users of apparatus 110 may be collected and/or stored to facilitate detection and/or isolation of the user's voice, as described in further detail above.

Figure 22:
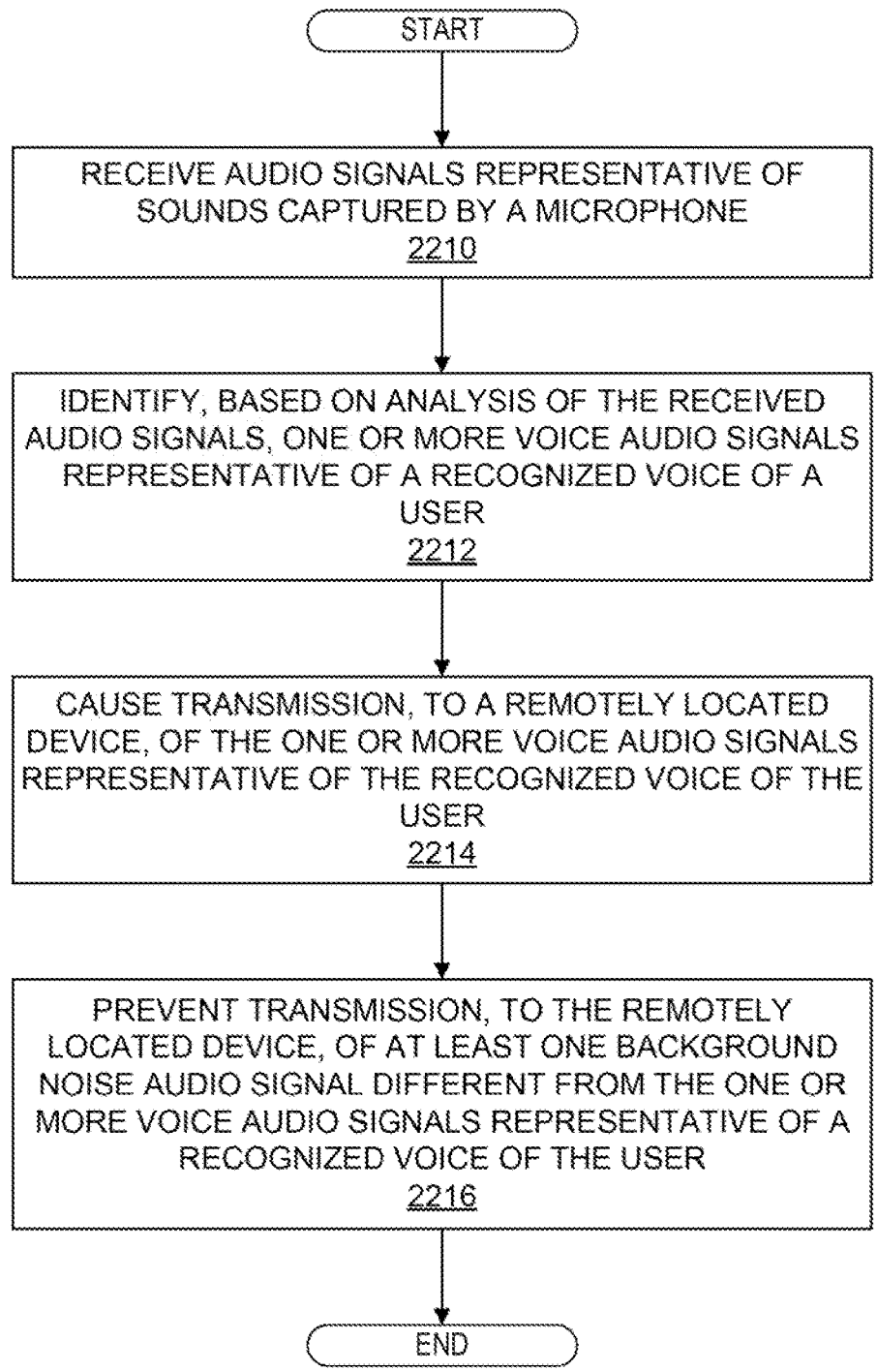
FIG. 22 is a flowchart showing an exemplary process for selectively transmitting audio signals associated with a voice of a recognized user consistent with disclosed embodiments.

FIG. 22 is a flowchart showing an exemplary process 2200 for selectively transmitting audio signals associated with a voice of a recognized user consistent with disclosed embodiments. Process 2200 may be performed by one or more processors associated with apparatus 110, such as processor 210.

In step 2210, process 2200 may include receiving audio signals representative of sounds captured by a microphone. For example, apparatus 110 may receive audio signals representative of sounds 2020, 2021, and 2022, captured by microphone 1720. Accordingly, the microphone may include a directional microphone, a microphone array, a multi-port microphone, or various other types of microphones, as described above. In step 2212, process 2200 may include identifying, based on analysis of the received audio signals, one or more voice audio signals representative of a recognized voice of the user. For example, the voice of the user may be recognized based on a voiceprint associated with the user, which may be stored in memory 550, database 2050, or other suitable locations. Processor 210 may recognize the voice of the user, for example, using voice recognition component 2041. Processor 210 may separate an ongoing voice signal associated with the user almost in real time, e.g. with a minimal delay, using a sliding time window. The voice may be separated by extracting spectral features of an audio signal according to the methods described above.

In step 2214, process 2200 may include causing transmission, to a remotely located device, of the one or more voice audio signals representative of the recognized voice of the user. The remotely located device may be any device configured to receive audio signals remotely, either by a wired or wireless form of communication. In some embodiments, the remotely located device may be another device of the user, such as a mobile phone, an audio interface device, or another form of computing device. In some embodiments, the voice audio signals may be processed by the remotely located device and/or transmitted further. In step 2216, process 2200 may include preventing transmission, to the remotely located device, of at least one background noise audio signal different from the one or more voice audio signals representative of a recognized voice of the user. For example, processor 210 may attenuate and/or eliminate audio signals associated with sounds 2020, 2021, or 2023, which may represent background noise. The voice of the user may be separated from other noises using the audio processing techniques described above.

In an exemplary illustration, the voice audio signals may be captured by a headset or other device worn by the user. The voice of the user may be recognized and isolated from the background noise in the environment of the user. The headset may transmit the conditioned audio signal of the user's voice to a mobile phone of the user. For example, the user may be on a telephone call and the conditioned audio signal may be transmitted by the mobile phone to a recipient of the call. The voice of the user may also be recorded by the remotely located device. The audio signal, for example, may be stored on a remote server or other computing device. In some embodiments, the remotely located device may process the received audio signal, for example, to convert the recognized user's voice into text.

Lip-Tracking Hearing Aid

Consistent with the disclosed embodiments, a hearing aid system may selectively amplify audio signals based on tracked lip movements. The hearing aid system analyzes captured images of the environment of a user to detect lips of an individual and track movement of the individual's lips. The tracked lip movements may serve as a cue for selectively amplifying audio received by the hearing aid system. For example, voice signals determined to sync with the tracked lip movements or that are consistent with the tracked lip movements may be selectively amplified or otherwise conditioned. Audio signals that are not associated with the detected lip movement may be suppressed, attenuated, filtered or the like.

User 100 may wear a hearing aid device consistent with the camera-based hearing aid device discussed above. For example, the hearing aid device may be hearing interface device 1710, as shown in FIG. 17A. Hearing interface device 1710 may be any device configured to provide audible feedback to user 100. Hearing interface device 1710 may be placed in one or both ears of user 100, similar to traditional hearing interface devices. As discussed above, hearing interface device 1710 may be of various styles, including in-the-canal, completely-in-canal, in-the-ear, behind-the-ear, on-the-ear, receiver-in-canal, open fit, or various other styles. Hearing interface device 1710 may include one or more speakers for providing audible feedback to user 100, microphones for detecting sounds in the environment of user 100, internal electronics, processors, memories, etc. In some embodiments, in addition to or instead of a microphone, hearing interface device 1710 may comprise one or more communication units, and one or more receivers for receiving signals from apparatus 110 and transferring the signals to user 100. Hearing interface device 1710 may correspond to feedback outputting unit 230 or may be separate from feedback outputting unit 230 and may be configured to receive signals from feedback outputting unit 230.

In some embodiments, hearing interface device 1710 may comprise a bone conduction headphone 1711, as shown in FIG. 17A. Bone conduction headphone 1711 may be surgically implanted and may provide audible feedback to user 100 through bone conduction of sound vibrations to the inner ear. Hearing interface device 1710 may also comprise one or more headphones (e.g., wireless headphones, over-ear headphones, etc.) or a portable speaker carried or worn by user 100. In some embodiments, hearing interface device 1710 may be integrated into other devices, such as a Bluetooth™ headset of the user, glasses, a helmet (e.g., motorcycle helmets, bicycle helmets, etc.), a hat, etc.

Hearing interface device 1710 may be configured to communicate with a camera device, such as apparatus 110. Such communication may be through a wired connection, or may be made wirelessly (e.g., using a Bluetooth™, NFC, or forms of wireless communication). As discussed above, apparatus 110 may be worn by user 100 in various configurations, including being physically connected to a shirt, necklace, a belt, glasses, a wrist strap, a button, or other articles associated with user 100. In some embodiments, one or more additional devices may also be included, such as computing device 120. Accordingly, one or more of the processes or functions described herein with respect to apparatus 110 or processor 210 may be performed by computing device 120 and/or processor 540.

As discussed above, apparatus 110 may comprise at least one microphone and at least one image capture device. Apparatus 110 may comprise microphone 1720, as described with respect to FIG. 17B. Microphone 1720 may be configured to determine a directionality of sounds in the environment of user 100. For example, microphone 1720 may comprise one or more directional microphones, a microphone array, a multi-port microphone, or the like. Processor 210 may be configured to distinguish sounds within the environment of user 100 and determine an approximate directionality of each sound. For example, using an array of microphones 1720, processor 210 may compare the relative timing or amplitude of an individual sound among the microphones 1720 to determine a directionality relative to apparatus 100. Apparatus 110 may comprise one or more cameras, such as camera 1730, which may correspond to image sensor 220. Camera 1730 may be configured to capture images of the surrounding environment of user 100. Apparatus 110 may also use one or more microphones of hearing interface device 1710 and, accordingly, references to microphone 1720 used herein may also refer to a microphone on hearing interface device 1710.

Figure 23B:
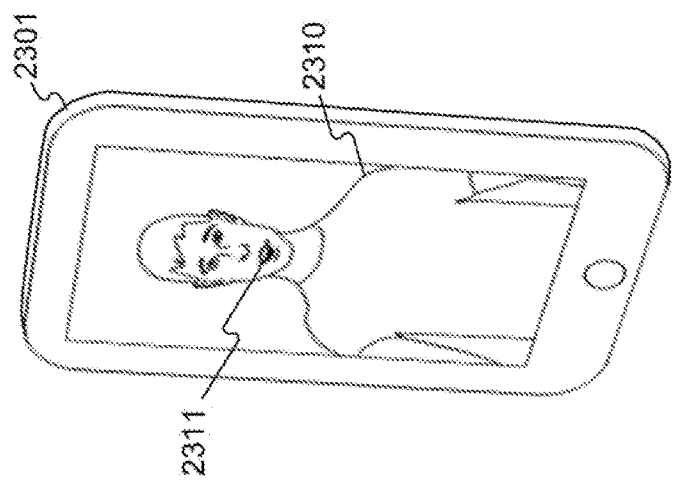
FIG. 23B is a schematic illustration showing an exemplary individual that may be identified in the environment of a user consistent with the present disclosure.
Figure 23A:
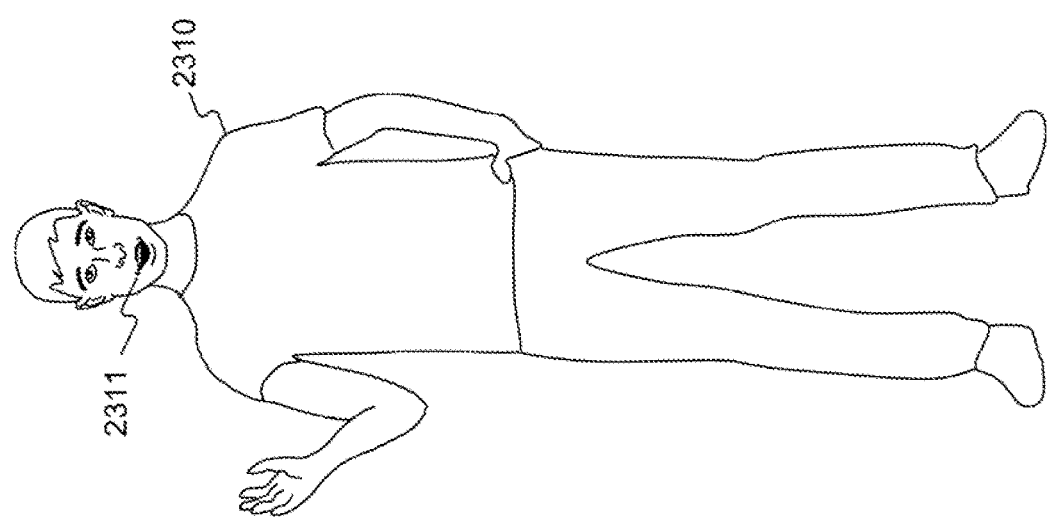
FIG. 23A is a schematic illustration showing an exemplary individual that may be identified in the environment of a user consistent with the present disclosure.

Processor 210 (and/or processors 210*a* and 210*b*) may be configured to detect a mouth and/or lips associated with an individual within the environment of user 100. FIGS. 23A and 23B show an exemplary individual 2310 that may be captured by camera 1730 in the environment of a user consistent with the present disclosure. As shown in FIG. 23, individual 2310 may be physically present with the environment of user 100. Processor 210 may be configured to analyze images captured by camera 1730 to detect a representation of individual 2310 in the images. Processor 210 may use a facial recognition component, such as facial recognition component 2040, described above, to detect and identify individuals in the environment of user 100. Processor 210 may be configured to detect one or more facial features of user 2310, including a mouth 2311 of individual 2310. Accordingly, processor 210 may use one or more facial recognition and/or feature recognition techniques, as described further below.

In some embodiments, processor 210 may detect a visual representation of individual 2310 from the environment of user 100, such as a video of user 2310. As shown in FIG. 23B, user 2310 may be detected on the display of a display device 2301. Display device 2301 may be any device capable of displaying a visual representation of an individual. For example, display device may be a personal computer, a laptop, a mobile phone, a tablet, a television, a movie screen, a handheld gaming device, a video conferencing device (e.g., Facebook Portal™, etc.), a baby monitor, etc. The visual representation of individual 2310 may be a live video feed of individual 2310, such as a video call, a conference call, a surveillance video, etc. In other embodiments, the visual representation of individual 2310 may be a prerecorded video or image, such as a video message, a television program, or a movie. Processor 210 may detect one or more facial features based on the visual representation of individual 2310, including a mouth 2311 of individual 2310.

Figure 23C:
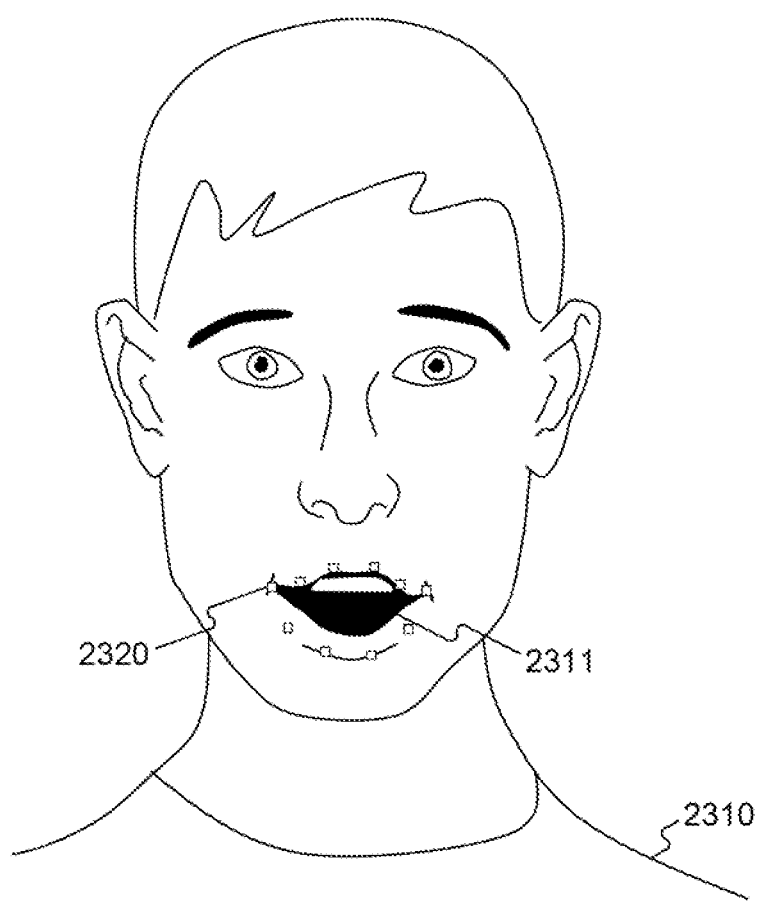
FIG. 23C illustrates an exemplary lip-tracking system consistent with the disclosed embodiments.

FIG. 23C illustrates an exemplary lip-tracking system consistent with the disclosed embodiments. Processor 210 may be configured to detect one or more facial features of individual 2310, which may include, but is not limited to the individual's mouth 2311. Accordingly, processor 210 may use one or more image processing techniques to recognize facial features of the user, such as convolutional neural networks (CNN), scale-invariant feature transform (SIFT), histogram of oriented gradients (HOG) features, or other techniques. In some embodiments, processor 210 may be configured to detect one or more points 2320 associated with the mouth 2311 of individual 2310. Points 2320 may represent one or more characteristic points of an individual's mouth, such as one or more points along the individual's lips or the corner of the individual's mouth. The points shown in FIG. 23C are for illustrative purposes only and it is understood that any points for tracking the individual's lips may be determined or identified via one or more image processing techniques. Points 2320 may be detected at various other locations, including points associated with the individual's teeth, tongue, cheek, chin, eyes, etc. Processor 210 may determine one or more contours of mouth 2311 (e.g., represented by lines or polygons) based on points 2320 or based on the captured image. The contour may represent the entire mouth 2311 or may comprise multiple contours, for example including a contour representing an upper lip and a contour representing a lower lip. Each lip may also be represented by multiple contours, such as a contour for the upper edge and a contour for the lower edge of each lip. Processor 210 may further use various other techniques or characteristics, such as color, edge, shape or motion detection algorithms to identify the lips of individual 2310. The identified lips may be tracked over multiple frames or images. Processor 210 may use one or more video tracking algorithms, such as mean-shift tracking, contour tracking (e.g., a condensation algorithm), or various other techniques. Accordingly, processor 210 may be configured to track movement of the lips of individual 2310 in real time.

Figure 24:
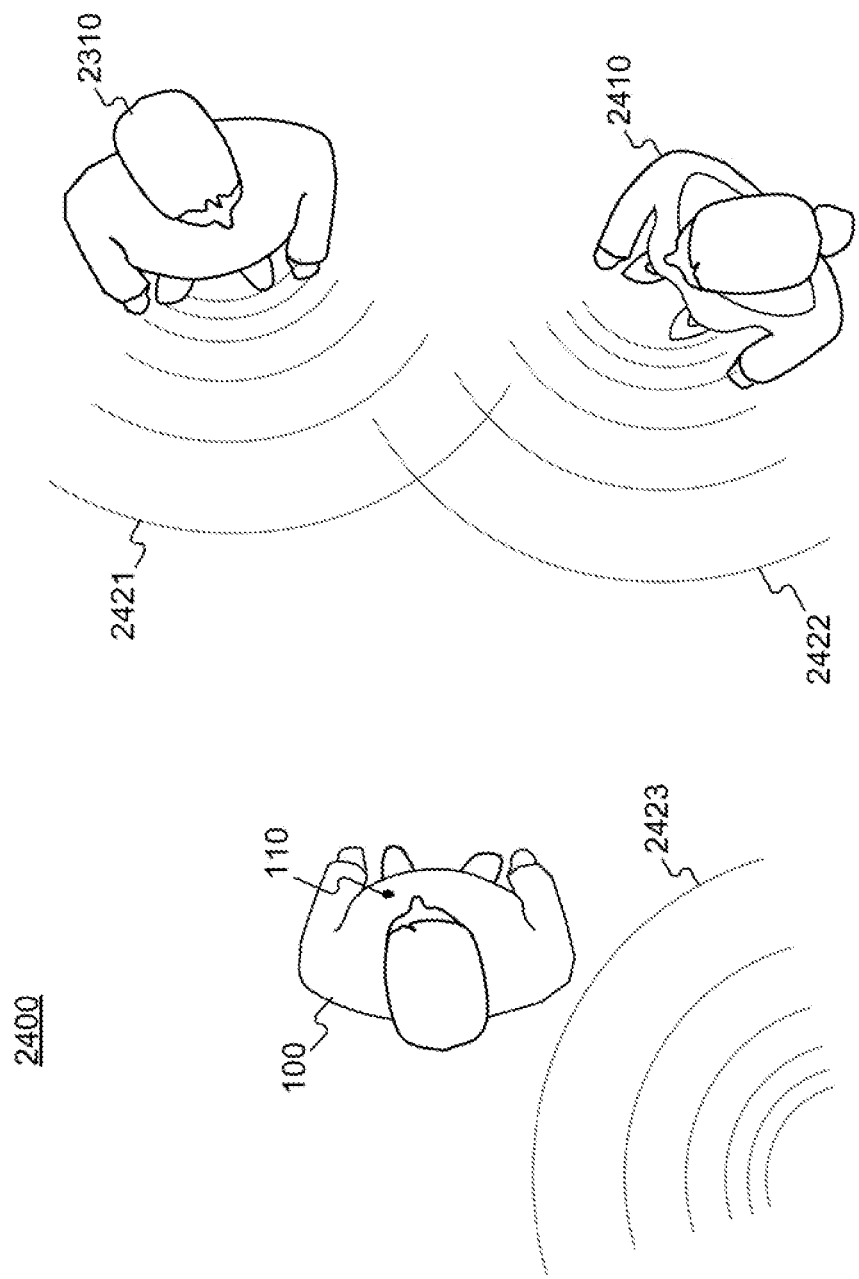
FIG. 24 is a schematic illustration showing an exemplary environment for use of a lip-tracking hearing aid consistent with the present disclosure.

The tracked lip movement of individual 2310 may be used to separate if required, and selectively condition one or more sounds in the environment of user 100. FIG. 24 is a schematic illustration showing an exemplary environment 2400 for use of a lip-tracking hearing aid consistent with the present disclosure. Apparatus 110, worn by user 100 may be configured to identify one or more individuals within environment 2400. For example, apparatus 110 may be configured to capture one or more images of the surrounding environment 2400 using camera 1730. The captured images may include a representation of individuals 2310 and 2410, who may be present in environment 2400. Processor 210 may be configured to detect a mouth of individuals 2310 and 2410 and track their respective lip movements using the methods described above. In some embodiments, processor 210 may further be configured to identify individuals 2310 and 2410, for example, by detecting facial features of individuals 2310 and 2410 and comparing them to a database, as discussed previously.

In addition to detecting images, apparatus 110 may be configured to detect one or more sounds in the environment of user 100. For example, microphone 1720 may detect one or more sounds 2421, 2422, and 2423 within environment 2400. In some embodiments, the sounds may represent voices of various individuals. For example, as shown in FIG. 24, sound 2421 may represent a voice of individual 2310 and sound 2422 may represent a voice of individual 2410. Sound 2423 may represent additional voices and/or background noise within environment 2400. Processor 210 may be configured to analyze sounds 2421, 2422, and 2423 to separate and identify audio signals associated with voices. For example, processor 210 may use one or more speech or voice activity detection (VAD) algorithms and/or the voice separation techniques described above. When there are multiple voices detected in the environment, processor 210 may isolate audio signals associated with each voice. In some embodiments, processor 210 may perform further analysis on the audio signal associated the detected voice activity to recognize the speech of the individual. For example, processor 210 may use one or more voice recognition algorithms (e.g., Hidden Markov Models, Dynamic Time Warping, neural networks, or other techniques) to recognize the voice of the individual. Processor 210 may also be configured to recognize the words spoken by individual 2310 using various speech-to-text algorithms. In some embodiments, instead of using microphone 1710, apparatus 110 may receive audio signals from another device through a communication component, such as wireless transceiver 530. For example, if user 100 is on a video call, apparatus 110 may receive an audio signal representing a voice of user 2310 from display device 2301 or another auxiliary device.

Processor 210 may determine, based on lip movements and the detected sounds, which individuals in environment 2400 are speaking. For example, processor 2310 may track lip movements associated with mouth 2311 to determine that individual 2310 is speaking. A comparative analysis may be performed between the detected lip movement and the received audio signals. In some embodiments, processor 210 may determine that individual 2310 is speaking based on a determination that mouth 2311 is moving at the same time as sound 2421 is detected. For example, when the lips of individual 2310 stop moving, this may correspond with a period of silence or reduced volume in the audio signal associated with sound 2421. In some embodiments, processor 210 may be configured to determine whether specific movements of mouth 2311 correspond to the received audio signal. For example, processor 210 may analyze the received audio signal to identify specific phonemes, phoneme combinations or words in the received audio signal. Processor 210 may recognize whether specific lip movements of mouth 2311 correspond to the identified words or phonemes. Various machine learning or deep learning techniques may be implemented to correlate the expected lip movements to the detected audio. For example, a training data set of known sounds and corresponding lip movements may be fed to a machine learning algorithm to develop a model for correlating detected sounds with expected lip movements. Other data associated with apparatus 110 may further be used in conjunction with the detected lip movement to determine and/or verify whether individual 2310 is speaking, such as a look direction of user 100 or individual 2310, a detected identity of user 2310, a recognized voiceprint of user 2310, etc.

Based on the detected lip movement, processor 210 may cause selective conditioning of audio associated with individual 2310. The conditioning may include amplifying audio signals determined to correspond to sound 2421 (which may correspond to a voice of individual 2310) relative to other audio signals. In some embodiments, amplification may be accomplished digitally, for example by processing audio signals associated with sound 2421 relative to other signals. Additionally, or alternatively, amplification may be accomplished by changing one or more parameters of microphone 1720 to focus on audio sounds associated with individual 2310. For example, microphone 1720 may be a directional microphone and processor 210 may perform an operation to focus microphone 1720 on sound 2421. Various other techniques for amplifying sound 2421 may be used, such as using a beamforming microphone array, acoustic telescope techniques, etc. The conditioned audio signal may be transmitted to hearing interface device 1710, and thus may provide user 100 with audio conditioned based on the individual who is speaking.

In some embodiments, selective conditioning may include attenuation or suppressing one or more audio signals not associated with individual 2310, such as sounds 2422 and 2423. Similar to amplification of sound 2421, attenuation of sounds may occur through processing audio signals, or by varying one or more parameters associated with microphone 1720 to direct focus away from sounds not associated with individual 2310.

In some embodiments, conditioning may further include changing a tone of one or more audio signals corresponding to sound 2421 to make the sound more perceptible to user 100. For example, user 100 may have lesser sensitivity to tones in a certain range and conditioning of the audio signals may adjust the pitch of sound 2421. For example, user 100 may experience hearing loss in frequencies above 10 kHz and processor 210 may remap higher frequencies (e.g., at 15 kHz) to 10 kHz. In some embodiments processor 210 may be configured to change a rate of speech associated with one or more audio signals. Processor 210 may be configured to vary the rate of speech of individual 2310 to make the detected speech more perceptible to user 100. If speech recognition has been performed on the audio signal associated with sound 2421, conditioning may further include modifying the audio signal based on the detected speech. For example, processor 210 may introduce pauses or increase the duration of pauses between words and/or sentences, which may make the speech easier to understand. Various other processing may be performed, such as modifying the tone of sound 2421 to maintain the same pitch as the original audio signal, or to reduce noise within the audio signal.

The conditioned audio signal may then be transmitted to hearing interface device 1710 and then produced for user 100. Thus, in the conditioned audio signal, sound 2421 (may be louder and/or more easily distinguishable than sounds 2422 and 2423.

Processor 210 may be configured to selectively condition multiple audio signals based on which individuals associated with the audio signals are currently speaking. For example, individual 2310 and individual 2410 may be engaged in a conversation within environment 2400 and processor 210 may be configured to transition from conditioning of audio signals associated with sound 2421 to conditioning of audio signals associated with sound 2422 based on the respective lip movements of individuals 2310 and 2410. For example, lip movements of individual 2310 may indicate that individual 2310 has stopped speaking or lip movements associated with individual 2410 may indicate that individual 2410 has started speaking. Accordingly, processor 210 may transition between selectively conditioning audio signals associated with sound 2421 to audio signals associated with sound 2422. In some embodiments, processor 210 may be configured to process and/or condition both audio signals concurrently but only selectively transmit the conditioned audio to hearing interface device 1710 based on which individual is speaking. Where speech recognition is implemented, processor 210 may determine and/or anticipate a transition between speakers based on the context of the speech. For example, processor 210 may analyze audio signals associate with sound 2421 to determine that individual 2310 has reached the end of a sentence or has asked a question, which may indicate individual 2310 has finished or is about to finish speaking.

In some embodiments, processor 210 may be configured to select between multiple active speakers to selectively condition audio signals. For example, individuals 2310 and 2410 may both be speaking at the same time or their speech may overlap during a conversation. Processor 210 may selectively condition audio associated with one speaking individual relative to others. This may include giving priority to a speaker who has started but not finished a word or sentence or has not finished speaking altogether when the other speaker started speaking. This determination may also be driven by the context of the speech, as described above.

Various other factors may also be considered in selecting among active speakers. For example, a look direction of the user may be determined and the individual in the look direction of the user may be given higher priority among the active speakers. Priority may also be assigned based on the look direction of the speakers. For example, if individual 2310 is looking at user 100 and individual 2410 is looking elsewhere, audio signals associated with individual 2310 may be selectively conditioned. In some embodiments, priority may be assigned based on the relative behavior of other individuals in environment 2400. For example, if both individual 2310 and individual 2410 are speaking and more other individuals are looking at individual 2410 than individual 2310, audio signals associated with individual 2410 may be selectively conditioned over those associated with individual 2310. In embodiments where the identity of the individuals is determined, priority may be assigned based on the relative status of the speakers, as discussed previously in greater detail. User 100 may also provide input into which speakers are prioritized through predefined settings or by actively selecting which speaker to focus on.

Processor 210 may also assign priority based on how the representation of individual 2310 is detected. While individuals 2310 and 2410 are shown to be physically present in environment 2400, one or more individuals may be detected as visual representations of the individual (e.g., on a display device) as shown in FIG. 23B. Processor 210 may prioritize speakers based on whether or not they are physically present in environment 2400. For example, processor 210 may prioritize speakers who are physically present over speakers on a display. Alternatively, processor 210 may prioritize a video over speakers in a room, for example, if user 100 is on a video conference or if user 100 is watching a movie. The prioritized speaker or speaker type (e.g. present or not) may also be indicated by user 100, using a user interface associated with apparatus 110.

Figure 25:
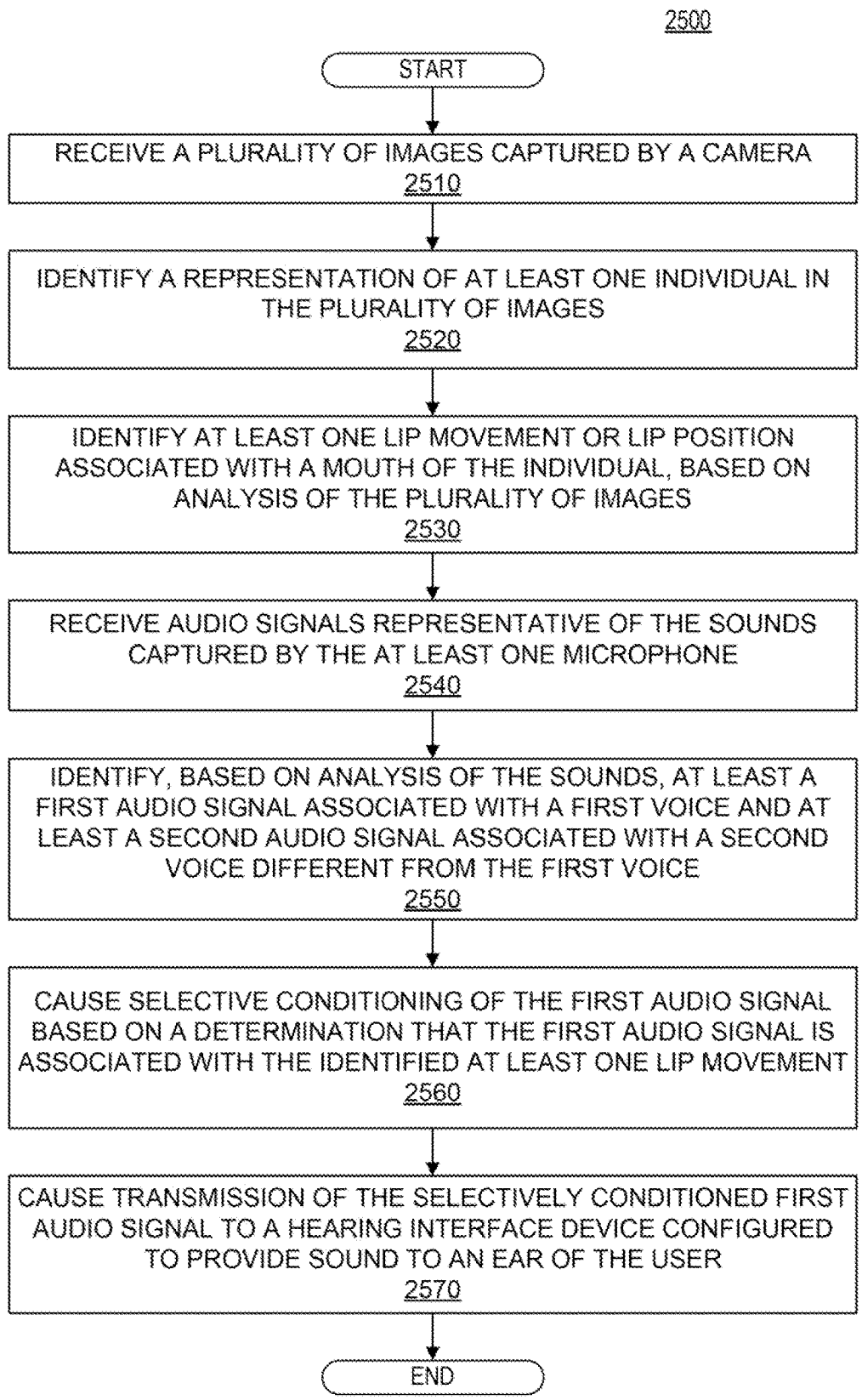
FIG. 25 is a flowchart showing an exemplary process for selectively amplifying audio signals based on tracked lip movements consistent with disclosed embodiments.

FIG. 25 is a flowchart showing an exemplary process 2500 for selectively amplifying audio signals based on tracked lip movements consistent with disclosed embodiments. Process 2500 may be performed by one or more processors associated with apparatus 110, such as processor 210. The processor(s) may be included in the same common housing as microphone 1720 and camera 1730, which may also be used for process 2500. In some embodiments, some or all of process 2500 may be performed on processors external to apparatus 110, which may be included in a second housing. For example, one or more portions of process 2500 may be performed by processors in hearing interface device 1710, or in an auxiliary device, such as computing device 120 or display device 2301. In such embodiments, the processor may be configured to receive the captured images via a wireless link between a transmitter in the common housing and receiver in the second housing.

In step 2510, process 2500 may include receiving a plurality of images captured by a wearable camera from an environment of the user. The images may be captured by a wearable camera such as camera 1730 of apparatus 110. In step 2520, process 2500 may include identifying a representation of at least one individual in at least one of the plurality of images. The individual may be identified using various image detection algorithms, such as Haar cascade, histograms of oriented gradients (HOG), deep convolution neural networks (CNN), scale-invariant feature transform (SIFT), or the like. In some embodiments, processor 210 may be configured to detect visual representations of individuals, for example from a display device, as shown in FIG. 23B.

In step 2530, process 2500 may include identifying at least one lip movement or lip position associated with a mouth of the individual, based on analysis of the plurality of images. Processor 210 may be configured to identify one or more points associated with the mouth of the individual. In some embodiments, processor 210 may develop a contour associated with the mouth of the individual, which may define a boundary associated with the mouth or lips of the individual. The lips identified in the image may be tracked over multiple frames or images to identify the lip movement. Accordingly, processor 210 may use various video tracking algorithms, as described above.

In step 2540, process 2500 may include receiving audio signals representative of the sounds captured by a microphone from the environment of the user. For example, apparatus 110 may receive audio signals representative of sounds 2421, 2422, and 2423 captured by microphone 1720. In step 2550, process 2500 may include identifying, based on analysis of the sounds captured by the microphone, a first audio signal associated with a first voice and a second audio signal associated with a second voice different from the first voice. For example, processor 210 may identify an audio signal associated with sounds 2421 and 2422, representing the voice of individuals 2310 and 2410, respectively. Processor 210 may analyze the sounds received from microphone 1720 to separate the first and second voices using any currently known or future developed techniques or algorithms. Step 2550 may also include identifying additional sounds, such as sound 2423 which may include additional voices or background noise in the environment of the user. In some embodiments, processor 210 may perform further analysis on the first and second audio signals, for example, by determining the identity of individuals 2310 and 2410 using available voiceprints thereof. Alternatively, or additionally, processor 210 may use speech recognition tools or algorithms to recognize the speech of the individuals.

In step 2560, process 2500 may include causing selective conditioning of the first audio signal based on a determination that the first audio signal is associated with the identified lip movement associated with the mouth of the individual. Processor 210 may compare the identified lip movement with the first and second audio signals identified in step 2550. For example, processor 210 may compare the timing of the detected lip movements with the timing of the voice patterns in the audio signals. In embodiments where speech is detected, processor 210 may further compare specific lip movements to phonemes or other features detected in the audio signal, as described above. Accordingly, processor 210 may determine that the first audio signal is associated with the detected lip movements and is thus associated with an individual who is speaking.

Various forms of selective conditioning may be performed, as discussed above. In some embodiments, conditioning may include changing the tone or playback speed of an audio signal. For example, conditioning may include remapping the audio frequencies or changing a rate of speech associated with the audio signal. In some embodiments, the conditioning may include amplification of a first audio signal relative to other audio signals. Amplification may be performed by various means, such as operation of a directional microphone, varying one or more parameters associated with the microphone, or digitally processing the audio signals. The conditioning may include attenuating or suppressing one or more audio signals that are not associated with the detected lip movement. The attenuated audio signals may include audio signals associated with other sounds detected in the environment of the user, including other voices such as a second audio signal. For example, processor 210 may selectively attenuate the second audio signal based on a determination that the second audio signal is not associated with the identified lip movement associated with the mouth of the individual. In some embodiments, the processor may be configured to transition from conditioning of audio signals associated with a first individual to conditioning of audio signals associated with a second individual when identified lip movements of the first individual indicates that the first individual has finished a sentence or has finished speaking.

In step 2570, process 2500 may include causing transmission of the selectively conditioned first audio signal to a hearing interface device configured to provide sound to an ear of the user. The conditioned audio signal, for example, may be transmitted to hearing interface device 1710, which may provide sound corresponding to the first audio signal to user 100. Additional sounds such as the second audio signal may also be transmitted. For example, processor 210 may be configured to transmit audio signals corresponding to sounds 2421, 2422, and 2423. The first audio signal, which may be associated with the detected lip movement of individual 2310, may be amplified, however, in relation to sounds 2422 and 2423 as described above. In some embodiments, hearing interface 1710 device may include a speaker associated with an earpiece. For example, hearing interface device may be inserted at least partially into the ear of the user for providing audio to the user. Hearing interface device may also be external to the ear, such as a behind-the-ear hearing device, one or more headphones, a small portable speaker, or the like. In some embodiments, hearing interface device may include a bone conduction microphone, configured to provide an audio signal to user through vibrations of a bone of the user's head. Such devices may be placed in contact with the exterior of the user's skin, or may be implanted surgically and attached to the bone of the user.

Matching Audio and Image Information

As described above, audio signals captured from within the environment of a user may be processed prior to presenting the audio to the user. This processing may include various conditioning or enhancements to improve the experience for the user. For example, as described above, speech from an individual the user is looking at may be amplified, while other audio, such as background noise, speech from other speakers, or the like, may be muted or attenuated. Accordingly, the speech from the individual the user is speaking with may be easier for the user to hear and understand.

In some embodiments, audio may be identified for selective conditioning relative to other audio based on analysis of images captured within the environment of the user. For example, audio signals may be recognized by correlating a sound captured by a microphone with lip movements of an individual detected in the images. If the mouth of an individual opens at the same time an "ahh" sound is captured by a microphone, it may indicate that the individual is speaking and generated the sound. The disclosed systems may then selectively condition an audio signal associated with the individual, as described throughout the present disclosure. While detecting a lip movement is used throughout the present disclosure by way of example, the disclosed embodiments are not limited to any particular form of image analysis. It is to be understood that the disclosed embodiments may apply to other techniques for identifying audio signals based on analysis of captured images.

In some cases, a sampling rate of the audio may be significantly different than an image capture rate (e.g., a video sample rate). For example, audio may be sampled at a rate on the order of tens of kHz (e.g., ranging from 40-50 kHz, or other suitable sample rates). The images, on the other hand, may be captured at much lower frame rates. For example, video is commonly captured at frame rates of 12 frames per second (fps), 24 fps, 30 fps, 60 fps, or other suitable frame rates. Accordingly, the sample rate for image capture by a wearable device may be on the order of one thousandth of an audio sampling rate. As a result, each image frame may correspond to hundreds or thousands of audio samples.

Further, using conventional techniques, each image may be associated with a single timestamp. However, each frame of a video is typically not captured by taking a snapshot of the entire scene at a single instant in time, but rather is captured using a "rolling shutter." In particular, the frame may be captured by scanning across the scene, either vertically or horizontally. Accordingly, not all parts of the image depicting different parts of the scene are recorded at the same instant in time. As a result, most of the image may not be captured at the time indicated by the image timestamp. Thus, multiple audio samples may be associated with one full image frame, although each audio sample may have been captured at a time that corresponds to a small segment of the image.

This discrepancy between the audio sample timestamps and the image frame time stamps may lead to issues in correlating captured sounds with objects detected in the images. For example, when the sound "ahh" is captured in one or more audio samples, if a region of an image associated with a speaker's mouth was captured before or after the sound is uttered, the resulting image frame may not demonstrate the open mouth position typical to this sound. Accordingly, the system may not correlate the uttered sound and with the individual.

To address this problem and other problems associated with conventional techniques, the disclosed systems may employ rolling shutter timestamps associated with images captured by a wearable apparatus. In particular, each row (or column) of an image may be associated with a corresponding timestamp at which it was scanned by an image sensor. In some embodiments, a group of consecutive rows or columns (e.g., every 2, 5, 10, 20 or other suitable numbers of rows or columns) may be associated with one timestamp. Thus, the disclosed systems may more accurately associate detected objects within images to corresponding sounds. The disclosed systems and methods may therefore provide, among other advantages, improved efficiency, convenience, and functionality over prior art image and video processing systems.

Figure 26:
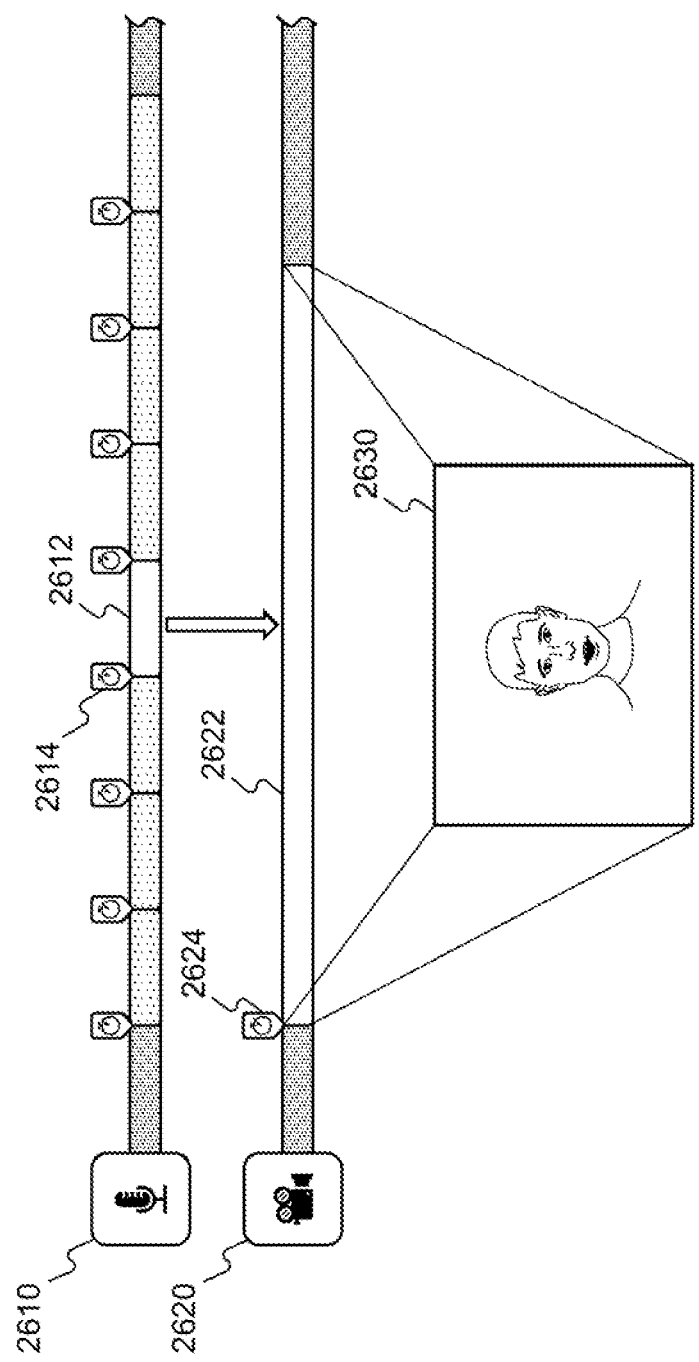
FIG. 26 illustrates an example image that may be associated with multiple audio samples, consistent with the disclosed embodiments.

FIG. 26 illustrates an example image 2630 that may be associated with multiple audio samples, consistent with the disclosed embodiments. As shown in FIG. 26, a wearable apparatus may receive an audio signal 2610. For example, audio signal 2610 may be captured by one or more microphones of wearable apparatus 110, such as microphones 443, 444, or 1720, as described above. In some embodiments, audio signal 2610 may be received from multiple microphones, such as a microphone array. Audio signal 2610 may include representations of sounds from the environment of a user of wearable apparatus 110. The audio signal thus may include voices from one or more individuals, background noise, music, and/or other sounds that may be processed by wearable apparatus 110 prior to presenting it to the user. For example, the system may selectively condition one or more sounds within audio signal 2610 to attenuate background noise, amplify sounds from a particular source (e.g., an object or person the user is looking at), adjust a pitch of the audio signal, adjust a playback rate of the audio signal, remove noise or artifacts from the signal, perform audio compression, or perform other enhancements to improve the quality of the audio for the user.

As shown in FIG. 26, audio signal 2610 may be associated with a plurality of audio samples, such as audio sample 2612. The length of each audio sample may depend on an audio sample rate associated with audio signal 2610. For example, audio signal 2610 may have a sample rate of 44.1 kHz, and thus 44,100 audio samples may be recorded per second. Audio signal 2610 may have various other common audio sample rates, such as 48 kHz, 88.2 kHz, 96 kHz, or any other suitable sample rate. Each audio sample may be associated with a corresponding audio timestamp representing a time at which the audio sample was recorded. For example, audio sample 2612 may be associated with audio timestamp 2614. In some embodiments, audio timestamp 2614 may correspond to a beginning time associated with audio sample 2612, as shown in FIG. 26. Audio timestamp 2614 may be associated with other timings, such as a middle of audio sample 2612, an end of audio sample 2612, or various other timings. In some embodiments, audio timestamp 2614 may be represented based on a current world time (e.g., represented as a date, hours, minutes, seconds, milliseconds, etc.). This may be based on a universal time, such as Coordinated Universal Time (UTC), or may be based on a specific time zone. In some embodiments, the timestamp may be calculated relative to a particular date. For example, the timestamp may be calculated relative to an epoch date used to track a system time for wearable apparatus 110. Various other timestamp formats may be used, and the present disclosure is not limited to any particular timestamp format.

Wearable apparatus 110 may further capture a series of images, such as video 2620. While the series of images is represented as a video in FIG. 26, it is to be understood that the images may be represented in various image formats and are not necessarily stored in a video file format. Video 2620 may include a plurality of images, such as image 2630, that are included in a video sample 2622. Similar to audio sample 2612, image 2630 may be associated with an image timestamp 2624. Image timestamp 2624 may be associated with an initial time at which image 2630 began being captured, as shown in FIG. 26, or may be associated with other timings. For example, image timestamp 2624 may be associated with an end time of image 2630 being captured, a midpoint time of image 2630 being captured, or the like. As with audio timestamp 2614, image timestamp 2624 may be represented in a variety of suitable timestamp formats and may be calculated relative to an epoch date. In some embodiments, audio timestamp 2614 and image timestamp 2624 may be calculated based on the same format. This may enable audio timestamps associated with audio signal 2610 to be more directly correlated with image timestamps associated with video 2620.

As shown in FIG. 26, the entire image frame for image 2630 may be associated with a single timestamp (e.g., image timestamp 2624), Accordingly, multiple audio samples may be associated with a single image timestamp, as shown. Therefore, when the audio samples shown in FIG. 26 are analyzed, each of the audio samples may be correlated to timestamp 2624 within video 2620, regardless of whether and how much the analyzed audio occurred after (or before) the time associated with timestamp 2624. Accordingly, when a sound "ahh" is recognized in audio sample 2612, the mouth of an individual making the sound may be captured too early or too late to be useful for processing in conjunction with the audio sample.

Figure 27:
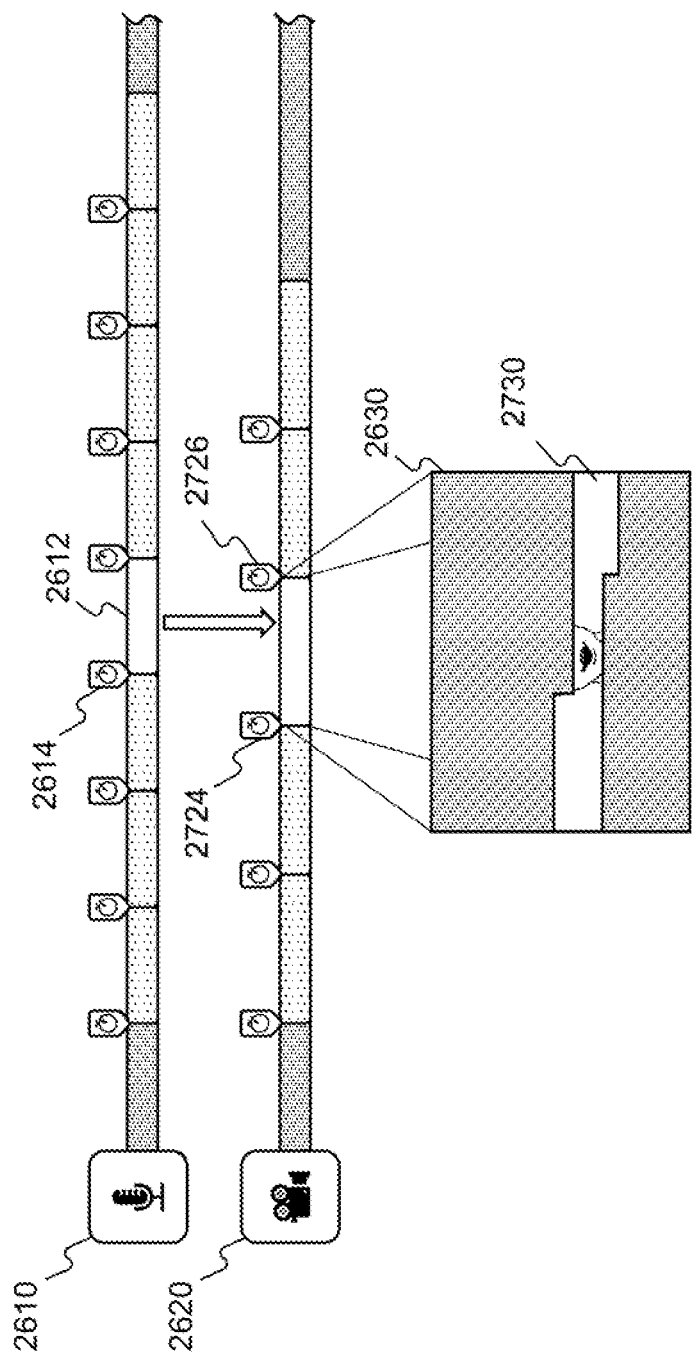
FIG. 27 illustrates an example portion of an image that may be associated with an image portion timestamp, consistent with the disclosed embodiments.

To address this issue, the disclosed systems and methods may associate timestamps with portions of an image as they are captured. FIG. 27 illustrates an example image portion 2730 that may be associated with an image portion timestamp, consistent with the disclosed embodiments. As described above, each image may be captured as a series of groups of pixels, such as rows or columns of sensors of an image sensor. Each group of pixels making up a portion of an image may be associated with a separate image portion timestamp. For example, image 2630 may include a plurality of image portions, such as image portion 2730, which may be associated with an image portion timestamp 2724, representing a time at which image portion 2730 was captured. For example, image portion timestamp 2724 may represent a time at which an image capture device began capturing image portion 2730, as shown in FIG. 27. In some embodiments, image portion timestamp 2724 may correspond to a time when the image capture device finished capturing image portion 2730, or an intermediate time (e.g., a midpoint time, etc.). As a result, each image captured as part of video 2620 may be associated with multiple image portion timestamps, as shown in FIG. 27. As with audio timestamp 2614, image portion timestamp 2724 may be represented in a variety of suitable timestamp formats and may be calculated relative to an epoch date. In some embodiments, audio timestamp 2614 and image portion timestamp 2724 may be calculated based on the same format. Accordingly, the disclosed systems may more accurately correlate audio timestamps associated with audio signal 2610 with image portion timestamps associated with video 2620.

When processing audio signal 2610 and video 2620, the disclosed systems may compare audio timestamp 2614 with image portion timestamp 2724 (rather than image timestamp 2624). This may allow for analyzing image 2630 with finer granularity of time information. For example, an "ahh" sound may be recognized in audio sample 2612, as described above. The system may compare audio timestamp 2614 with timestamps of video 2620 to determine that image portion 2730 most closely matches a timing of audio sample 2612. Accordingly, the system may analyze image portion 2730 to determine whether it includes lip movements that may be associated with the "ahh" sound (e.g., an individual opening his or her mouth to speak, etc.).

This may improve accuracy of detection by focusing image analysis on portions of an image that are most relevant to the audio sample being processed. For example, if the entire frame of image 2630 is analyzed, the image portion containing a mouth of the user may be captured too early or too late and may not match a sound detected in a corresponding audio sample. In particular, a mouth of an individual speaking may be captured before he or she begins making a particular sound. Accordingly, if image 2630 is analyzed to identify a source of the speech, the individual may be determined not to be the speaker because his or her lip movements may not match the expected sound. Conversely, if only portions of image 2630 that are more closely correlated with the detected sound timing are analyzed, the system may make more accurate identifications of an active speaker. For example, if image portion 2730 contains lips of an individual that do not match a sound detected in audio sample 2612, the system may more reliably determine the individual is not the speaker. This may also improve efficiency and reduce a memory or processing demand of the system by focusing image analysis only on more relevant portions of an image.

Identifying an image portion corresponding to a particular audio timestamp may be performed in various ways. In some embodiments, an image portion may be selected based on being associated with an image portion timestamp that is earlier than or equal to the audio portion timestamp, where a subsequent image portion timestamp is after the audio portion timestamp. For example, audio timestamp 2614 may be after image portion timestamp 2724 but before image portion timestamp 2726 and, accordingly, image portion 2730 may be associated with audio sample 2612. In another example, audio sample 2612 may be associated with the rows or columns captured at most a predetermined time before and/or after the audio timestamp 2614. For example, image portions associated with image portion timestamps within a predetermined range of audio timestamp 2614 may be associated with audio sample 2612. Accordingly, in some embodiments, the disclosed systems may analyze more than one image portion together. For example, the system may analyze image portions before and after image portion 2730 to consider a greater portion of image 2630 while still narrowing the analysis based on audio timestamp 2614. In some embodiments, the system may calculate the number of audio samples associated with each image portion, which may improve computational efficiency in determining image portions associated with each audio sample.

Figure 28C:
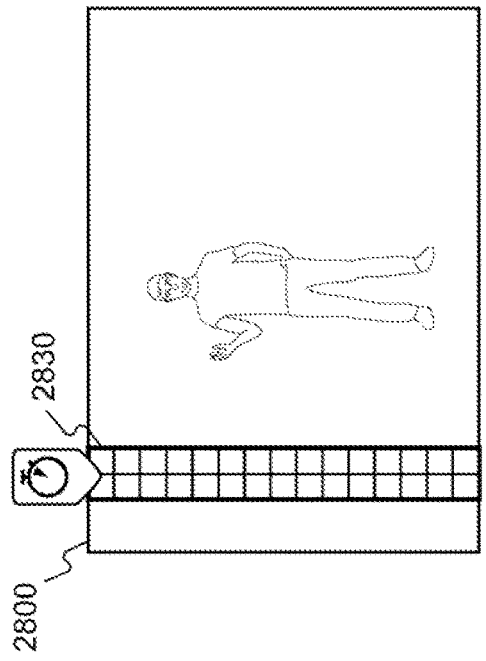
FIGS. 28A, 28B, 28C, and 28D illustrate example image portions that may be associated with an image, consistent with the disclosed embodiments.
Figure 28D:
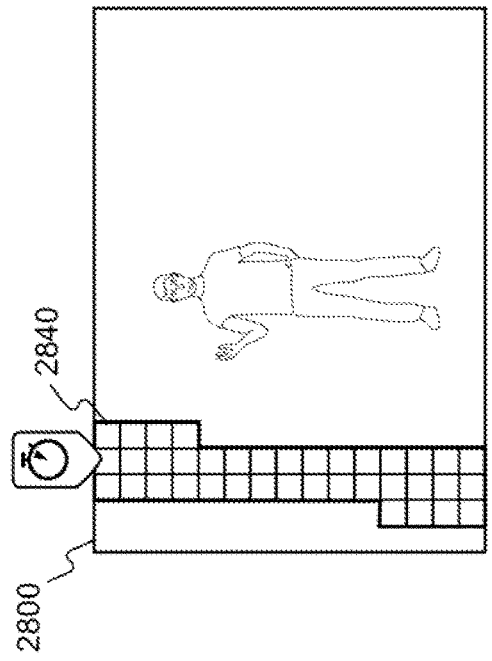
Figure 28A:
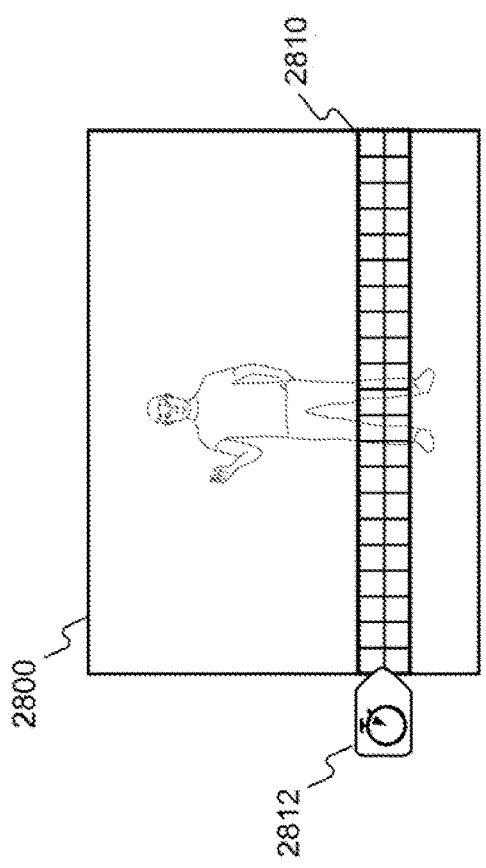
Figure 28B:
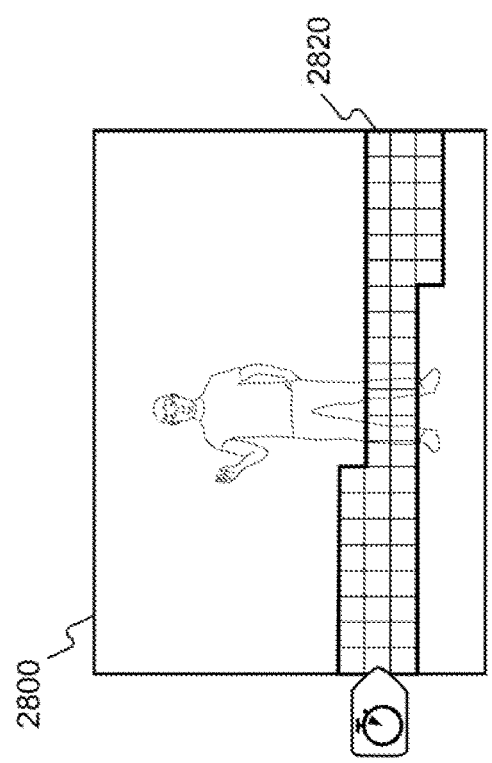

Each image portion may be defined in various ways. FIGS. 28A, 28B, 28C, and 28D illustrate example image portions that may be associated with an image 2800, consistent with the disclosed embodiments. As used herein, an image portion may refer to any subset of pixel information making up an image. The image portions may be defined, at least in part, based on how an image is captured by an image capture device. For example, an image sensor may comprise a number of rows and columns that are scanned sequentially to capture each image. An image portion may be associated with one or more rows or columns (or portions of rows and columns) as they are scanned. For example, as shown in FIG. 28A, an image portion 2810 may be based on one or more rows of pixels of image 2810. For example, each row may have its own image portion timestamp, or a group of rows may be associated with an image portion timestamp (e.g., image portion timestamp 2812). In some embodiments, an image portion may include partial rows rather than full rows of pixels. For example, image portion 2820 shown in FIG. 28B may include a combination of full and partial rows. Image portion 2820 may be defined based on a predetermined number of pixels that are scanned, based on a predetermined time interval, or various other criteria.

In some embodiments, image portions may be defined based on columns of pixels, rather than rows. For example, image portion 2830 may be defined based on columns of pixels within image 2800, as shown in FIG. 28C. Similar to image portion 2820, image portion 2840 may include partial columns, as shown in FIG. 28D. For example, image portion 2840 may be defined based on a predetermined number of pixels that are scanned, based on a predetermined time interval, or various other criteria. In some embodiments, the manner of defining image portions and image portion timestamps may be configurable. For example, a setting may be applied at a factory based on the particular image capture device being used and its capturing mode (e.g., whether the device captures images in rows or columns, etc.). In some embodiments, a user may modify one or more settings that may define how image portions are defined. In some embodiments, this may be a direct user setting, for example, allowing a user to specify a number of rows or columns, a number of pixels, a time interval, or other variables to define how image portions are timestamped. In some embodiments, this may be an indirect setting, for example, allowing a user to adjust processing time, audio processing quality, demand on battery life, selecting an operation mode, or other settings. In some embodiments, one or more variables defining how image portions are timestamped may be adjusted dynamically. For example, in embodiments where no individuals are detected or where no speech is detected, the disclosed systems may divide an image into fewer image portions or may use image timestamps rather than image portion timestamps. When an individual is detected in an image, or when speech is detected, the system may narrow the image portion timestamps to improve selective conditioning of speech. Various other criteria may be used for dynamically adjusting image portion timestamping, such as a GPS location, a time of day, an amount of battery life remaining, or any other suitable criteria.

Figure 29:
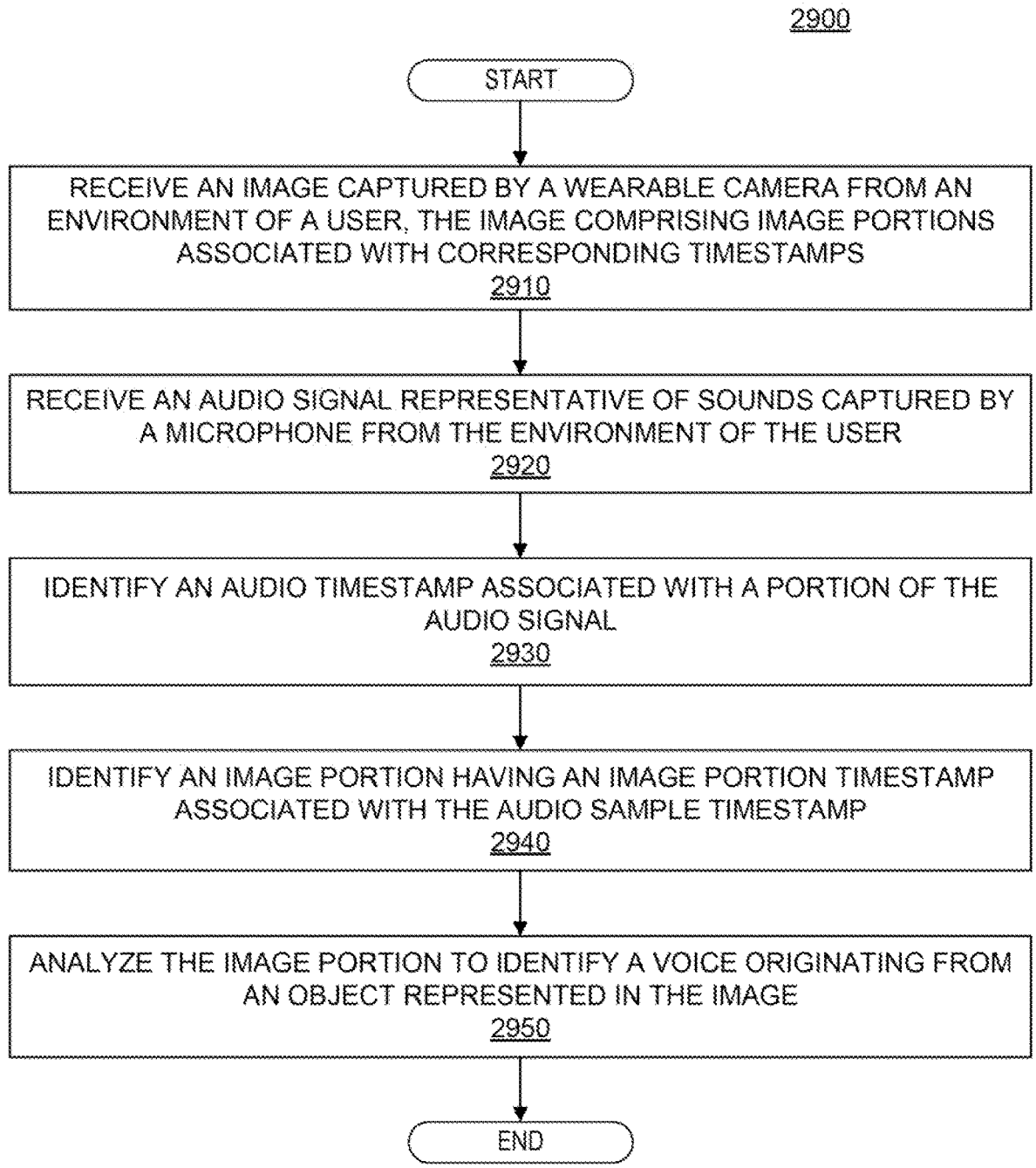
FIG. 29 is a flowchart showing an example process 2900 for processing audio signals, consistent with the disclosed embodiments.

FIG. 29 is a flowchart showing an example process 2900 for processing audio signals, consistent with the disclosed embodiments. Process 2900 may be performed by at least one processing device of a wearable apparatus, such as processor 210, as described above. In some embodiments, some or all of process 2900 may be performed by a different device, such as computing device 120. It is to be understood that throughout the present disclosure, the term "processor" is used as a shorthand for "at least one processor." In other words, a processor may include one or more structures that perform logic operations whether such structures are collocated, connected, or disbursed. In some embodiments, a non-transitory computer readable medium may contain instructions that when executed by a processor cause the processor to perform process 2900. Further, process 2900 is not necessarily limited to the steps shown in FIG. 29, and any steps or processes of the various embodiments described throughout the present disclosure may also be included in process 2900, including those described above with respect to FIGS. 26, 27, 28A, 28B, 28C, and 28D.

In step 2910, process 2900 may include receiving at least one image captured by a wearable camera from an environment of a user. For example, step 2910 may include receiving image 2630, which may have been captured by image sensor 220 of wearable apparatus 110. In some embodiments, the at least one image may comprise a plurality of image portions associated with corresponding image portion timestamps. For example, the at least one image may include image portion 2730, which may be associated with image portion timestamp 2724, as shown in FIG. 27. The image portions may be defined in various ways, as described above. For example, the image portions may be associated with groups of sensor rows or columns of a sensor of the wearable camera. In some embodiments, a size of the image portions may be based on a sample rate of the wearable camera. For example, the rate at which portions of an image are captured may define the size of each portion. The sample rate of the wearable camera may be less than a sample rate of a microphone such that more audio samples are collected than image portion samples. In some embodiments, the size of the image portions may be based on a predetermined number of pixels, rows or columns of pixels, time interval, or various other constraints. In some embodiments, the image portion timestamps may be associated with the plurality of image portions by the wearable camera. For example, the at least one image may comprise data identifying the plurality of image portions and correlating the plurality of image portions to the image portion timestamps. In some embodiments, the image portion timestamps may be associated with the image portions by another device, such as wearable apparatus 110.

In step 2920, process 2900 may include receiving at least one audio signal representative of sounds captured by at least one microphone from the environment of the user. For example, step 2920 may include receiving audio signal 2610 as described above. The audio signal may be captured by one or more microphones of wearable apparatus 110, such as microphones 443, 444, or 1720, as described above. In some embodiments, the audio signal may be received from multiple microphones, such as a microphone array. The audio signal may include voices from one or more individuals, background noise, music, and/or other sounds that may be processed by wearable apparatus 110 prior to presenting it to the user.

In step 2930, process 2900 may include identifying an audio timestamp associated with a portion of the audio signal. In some embodiments, the portion of the audio signal may comprise an audio sample included in the audio signal. A length of the audio sample may be defined by an audio sample rate of the microphone. For example, step 2930 may include identifying audio timestamp 2614 associated with audio sample 2912, as shown in FIG. 26. The audio timestamps may be represented in various formats, for example, based on an epoch date or other reference point in time, as described above.

In step 2940, process 2900 may include identifying an image portion corresponding to an audio timestamp, such as audio timestamp 2614, from among the plurality of image portions. The identified image portion may be associated with the portion of the audio signal. For example, the image portion may have an image portion timestamp associated with the audio timestamp. The image portion may be identified in various ways. In some embodiments, identifying the image portion may comprise determining the audio timestamp is later than the image portion timestamp, and before a subsequent image portion timestamp of a subsequent image portion captured after the image portion. For example, audio timestamp 2614 may be after image portion timestamp 2724 but before image portion timestamp 2726 and, accordingly, image portion 2730 may be associated with audio sample 2612. In some embodiments, identifying the image portion may comprise determining the audio timestamp is within a predetermined threshold of the image portion timestamp.

In step 2950, process 2900 may include analyzing the image portion to identify a voice or other sound originating from an object represented in the image. For example, the object may comprise an individual within the environment of the user. Accordingly, processing the image portion may comprise identifying a mouth of the individual represented in the image portion. Process 2900 may further include determining, based on the representation of the mouth in the image, whether the voice is associated with the individual based on the analysis of the image portion. For example, this may include various lip tracking and voice print techniques as described above. While lip movement is used by way of example throughout the present disclosure, it is to be understood that process 2900 may apply to other forms of image analysis that may be performed on an image portion, rather than an entire image. In some embodiments, step 2950 may further comprise analyzing the full image to which the image portion belongs to in addition to analyzing the image portion. For example, step 2950 may include analyzing the image as a whole or other portions of the image to identify the speaker or other objects in the environment.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, Net Compact Framework (and related languages, such as Visual Basic, C, etc.), Java, C++, Objective-C, HTML, HTMLA-JAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system for processing audio signals, the system comprising:
    a wearable camera configured to capture a plurality of images from an environment of a user;
    at least one microphone configured to capture sounds from the environment of the user; and
    at least one processor programmed to:
        receive at least one image of the plurality of images, the at least one image comprising a plurality of image portions associated with corresponding image portion timestamps, each image portion of the plurality of image portions comprising a group of consecutively captured pixels making up a portion of an image;
        receive at least one audio signal representative of the sounds captured by the at least one microphone;
        identify an audio timestamp associated with a portion of the audio signal;
        identify a specific image portion from among the plurality of image portions, the specific image portion having a specific image portion timestamp associated with the audio timestamp; and
        analyze the specific image portion to identify a voice originating from an object represented in the at least one image.

2. The system of claim 1, wherein identifying the specific image portion comprises determining the audio timestamp is later than the specific image portion timestamp, and before a subsequent image portion timestamp of a subsequent image portion captured after the specific image portion.

3. The system of claim 1, wherein identifying the specific image portion comprises determining the audio timestamp is within a predetermined threshold of the specific image portion timestamp.

4. The system of claim 1, wherein the wearable camera comprises a sensor and the plurality of image portions are associated with groups of sensor rows of the sensor.

5. The system of claim 1, wherein the wearable camera comprises a sensor and the plurality of image portions are associated with groups of sensor columns of the sensor.

6. The system of claim 1, wherein a size of the plurality of image portions is based on a sample rate of the wearable camera.

7. The system of claim 6, wherein the sample rate of the wearable camera is less than a sample rate of the at least one microphone.

8. The system of claim 1, wherein the object comprises an individual and wherein processing the specific image portion comprises identifying a mouth of the individual represented in the specific image portion.

9. The system of claim 1, wherein the image portion timestamps are associated with the plurality of image portions by the wearable camera.

10. The system of claim 1, wherein the at least one image comprises data identifying the plurality of image portions and correlating the plurality of image portions to the image portion timestamps.

11. A method for processing audio signals, the method comprising:
  receiving at least one image captured by a wearable camera from an environment of a user, the at least one image comprising a plurality of image portions associated with corresponding image portion timestamps each image portion of the plurality of image portions comprising a group of consecutively captured pixels making up a portion of an image;
  receiving at least one audio signal representative of sounds captured by at least one microphone from the environment of the user;
  identifying an audio timestamp associated with a portion of the audio signal;
  identifying a specific image portion from among the plurality of image portions, the specific image portion having a specific image portion timestamp associated with the audio timestamp; and
  analyzing the specific image portion to identify a voice originating from an object represented in the at least one image.

12. The method of claim 11, wherein identifying the specific image portion comprises determining the audio timestamp is later than the specific image portion timestamp, and before a subsequent image portion timestamp of a subsequent image portion captured after the specific image portion.

13. The method of claim 11, wherein identifying the specific image portion comprises determining the audio timestamp is within a predetermined threshold of the specific image portion timestamp.

14. The method of claim 11, wherein the plurality of image portions are associated with groups of sensor rows of a sensor of the wearable camera.

15. The method of claim 11, wherein the plurality of image portions are associated with groups of sensor columns of a sensor of the wearable camera.

16. The method of claim 11, wherein a size of the plurality of image portions is based on a sample rate of the wearable camera.

17. The method of claim 16, wherein the sample rate of the wearable camera is less than a sample rate of the at least one microphone.

18. The method of claim 11, wherein the object comprises an individual and wherein processing the specific image portion comprises identifying a mouth of the individual represented in the specific image portion.

19. The method of claim 11, wherein the image portion timestamps are associated with the plurality of image portions by the wearable camera.

20. The method of claim 11, wherein the at least one image comprises data identifying the plurality of image portions and correlating the plurality of image portions to the image portion timestamps.

21. The method of claim 11, wherein the method further comprises analyzing the at least one image.

* * * * *